US010039293B2

(12) United States Patent
Fogarty

(10) Patent No.: US 10,039,293 B2
(45) Date of Patent: Aug. 7, 2018

(54) METHOD AND APPARATUS FOR PROCESSING CRUSTACEAN BODY PARTS AND PROCESSED CRUSTACEAN BODY PARTS

(71) Applicant: Tim Fogarty, Moncton (CA)

(72) Inventor: Tim Fogarty, Moncton (CA)

(*) Notice: Subject to any disclaimer, the term of this patent is extended or adjusted under 35 U.S.C. 154(b) by 559 days.

(21) Appl. No.: 14/790,689

(22) Filed: Jul. 2, 2015

(65) Prior Publication Data

US 2016/0183542 A1    Jun. 30, 2016

Related U.S. Application Data

(60) Provisional application No. 62/097,263, filed on Dec. 29, 2014, provisional application No. 62/108,767, filed on Jan. 28, 2015.

(51) Int. Cl.
*A22C 29/00* (2006.01)
*A22C 29/02* (2006.01)

(52) U.S. Cl.
CPC ................. *A22C 29/025* (2013.01)

(58) Field of Classification Search
CPC .................................. A22C 29/025
USPC ..................................... 452/1–12
See application file for complete search history.

(56) References Cited

U.S. PATENT DOCUMENTS

| 3,135,992 A | 6/1964 | Fredrickson |
| 4,019,224 A | 4/1977 | Amaria et al. |
| 4,021,886 A | 5/1977 | Crepeau |
| 4,104,764 A | 8/1978 | Coast |
| 4,393,545 A | 7/1983 | O'Donnell |
| 4,503,586 A * | 3/1985 | Lockerby ............ A22C 29/025 452/1 |
| 4,535,507 A * | 8/1985 | Reinke ............... A22C 29/025 452/1 |
| 4,617,734 A | 10/1986 | Parkinson |
| 4,715,093 A * | 12/1987 | Lapeyre ............. A22C 29/025 452/10 |

(Continued)

FOREIGN PATENT DOCUMENTS

| CA | 2743747 | 12/2012 |
| JP | 9-19260 | 1/1997 |

OTHER PUBLICATIONS

Highland Bay Seafoods, "Large Wild Scottish Crab Claws—Pre-Cracked", Document Retrieved from Internet [Sep. 19, 2014]: http://www.highlandbayseafoods.co.uk/shop-by-category/scottish-scallops . . . .

(Continued)

*Primary Examiner* — Richard Thomas Price, Jr.
(74) *Attorney, Agent, or Firm* — Bereskin & Parr LLP

(57) ABSTRACT

An apparatus for processing a crustacean body part is disclosed. The apparatus includes a conveyor, a first blade, and a first fluidic device. The conveyor has a downstream direction and a first region for supporting a crustacean body part. The first fluidic device is drivingly coupled to the first blade, and actuation of the first fluidic device moves the first blade into the first region. Methods of processing a crustacean body part, methods and apparatus for cracking a crustacean shell, controllers for directing processing of a crustacean body part, and pre-cut seafood items are also disclosed.

23 Claims, 37 Drawing Sheets

(56) References Cited

U.S. PATENT DOCUMENTS

| | | | | |
|---|---|---|---|---|
| 5,320,575 A | * | 6/1994 | Fukamoto | A22C 29/025 452/1 |
| 6,099,399 A | * | 8/2000 | Hearn | A22C 29/00 452/1 |
| 7,066,802 B1 | * | 6/2006 | Girton | A22C 29/024 452/1 |

OTHER PUBLICATIONS

Maine Lobster S.A., "Maine Lobster Products", Document Retrieved from Internet [Sep. 19, 2014]: http://www.mainelobsterpanama.com/products.shtml.

Royal Star Foods, "Scored Lobster Claws", Document Retrieved from Internet [Sep. 19, 2014]: http://royalstarfoods.com/wholesale-products/scored-lobster-claws/.

Odyssey, "Treasure-a-Peel—Pre-Cut Red King Crab Legs & Claws". Retrieved on Sep. 19, 2014.

\* cited by examiner

METHOD AND APPARATUS FOR PROCESSING CRUSTACEAN BODY PARTS AND PROCESSED CRUSTACEAN BODY PARTS

FIELD

The field of the invention relates to apparatus and methods for processing crustacean body parts, and to processed crustacean body parts.

INTRODUCTION

Crustaceans, such as lobsters and crabs, are often processed by scores of workers that manually fracture or score the shell of the crustacean with a knife, to separate the shell from the meat inside. This processing method however is labor intensive and increasingly expensive. Accordingly, it may be desirable to provide an apparatus that can automate and improve upon the processing of crustaceans.

SUMMARY

In one aspect, an apparatus for cracking a shell of a crustacean body part is provided. The apparatus may comprise a base, a clamp, and at least a first piercing member. The base for supporting a crustacean body part. The clamp may be positioned to secure the body part in a region on the base. The first piercing member may be movable toward the region for piercing a shell of the body part, and may be rotatable for cracking the pierced shell of the body part.

In another aspect, a method of cracking a shell of a crustacean body part is provided. The method may comprise piercing a shell of a crustacean body part with a first piercing member to form a first inceptive crack in the shell; and twisting the first piercing member to propagate the first inceptive crack laterally about at least a first portion of a circumference of the shell.

In another aspect, a method of processing a crustacean body part is provided. The method may comprise actuating a first fluidic device drivingly coupled to a first blade, driving the first blade to penetrate a first shell side of a shell of a crustacean body part; cutting a first lengthwise incision in the first shell side with the first blade; actuating a second fluidic device drivingly coupled to a second blade, driving the second blade to penetrate a second shell side of the shell; and cutting a second lengthwise incision in the second shell side with the second blade.

In another aspect, a method of processing a crustacean body part is provided. The method may comprise penetrating a first shell portion of a shell of a crustacean body part with a first blade to a first cutting depth; cutting a first lengthwise incision in the first shell portion with the first blade; penetrating a second shell portion of the shell with a second blade to a second cutting depth different from the first cutting depth; and cutting a second lengthwise incision in the second shell portion with the second blade.

In another aspect, a method of processing a crustacean body part is provided, the method performed by an apparatus for processing crustacean body parts. The method may comprise conveying the crustacean body part in a downstream direction; measuring size information of the crustacean body part; and determining one or more operational parameters of a shell cutting assembly based at least in part on the size information.

In another aspect, a controller for directing processing a crustacean body part by an apparatus for processing a crustacean body part is provided. The controller may comprise a memory, and one or more processors. The memory storing computer readable instructions. The one or more processors collectively configured to execute the computer readable instructions. The computer readable instructions configuring the one or more processors to collectively receive size information of a crustacean body part from a sensor; and determine one or more operational parameters of a shell cutting assembly of the apparatus based at least in part on the size information.

In another aspect, an apparatus for processing a crustacean body part is provided. The apparatus may comprise a conveyor, a first blade, and a first fluidic device. The conveyor having a first region for supporting a crustacean body part. The first fluidic device may be drivingly coupled to the first blade. Actuation of the first fluidic device may move the first blade toward the first region for cutting into a first side of a shell of the crustacean body part supported on the conveyor.

In another aspect, a pre-cut seafood item is provided. The seafood item may comprise a crustacean limb. The limb may include an organically connected claw and knuckle, an exterior shell, and meat inside the shell. The limb may extend in length from a proximal severed end of the knuckle to a distal end of the claw. The limb may include a crack in the shell circumscribing the claw. The crack may divide the shell into a distal shell portion and a proximal shell portion. The limb may also include at least a first cut in the proximal shell portion, the first cut extending lengthwise from the crack toward the proximal end of the knuckle.

DRAWINGS

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

Figure 1:
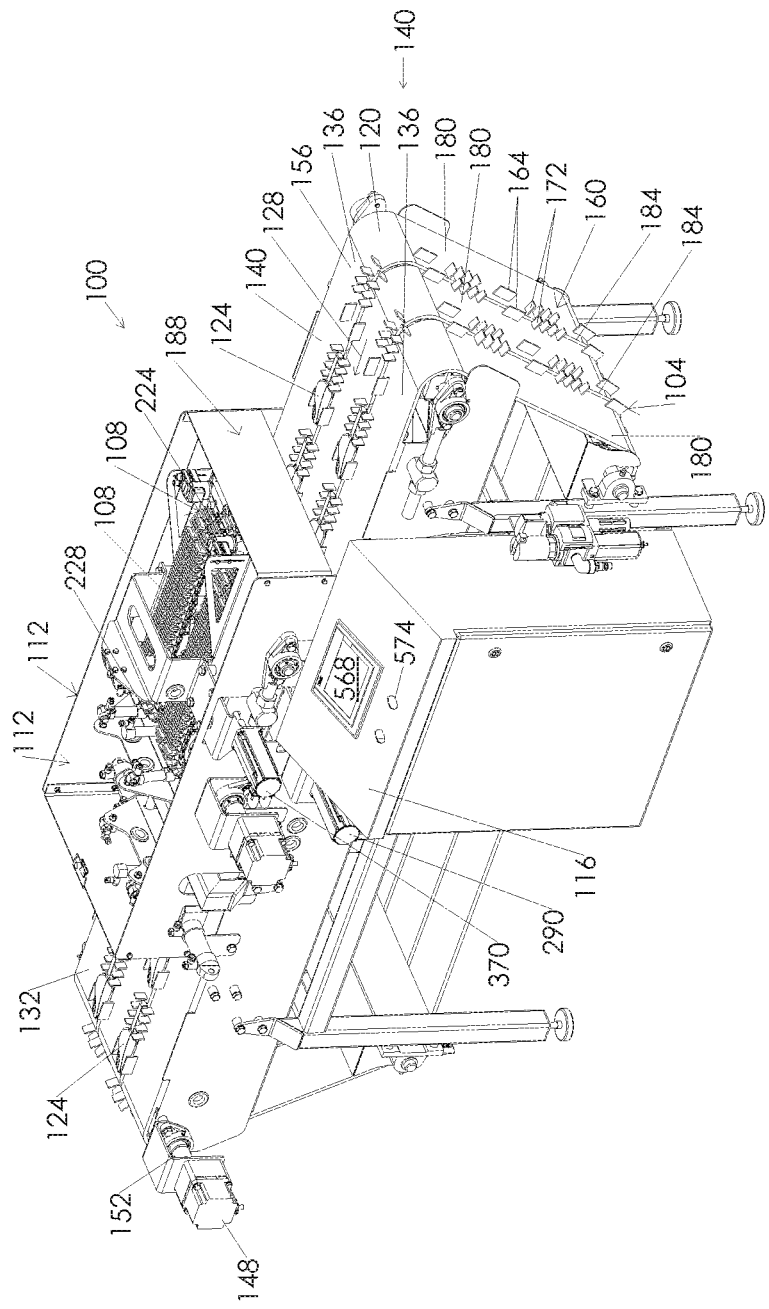
FIG. 1 is a perspective view of an apparatus for processing crustaceans, in accordance with at least one embodiment.
Figure 2:
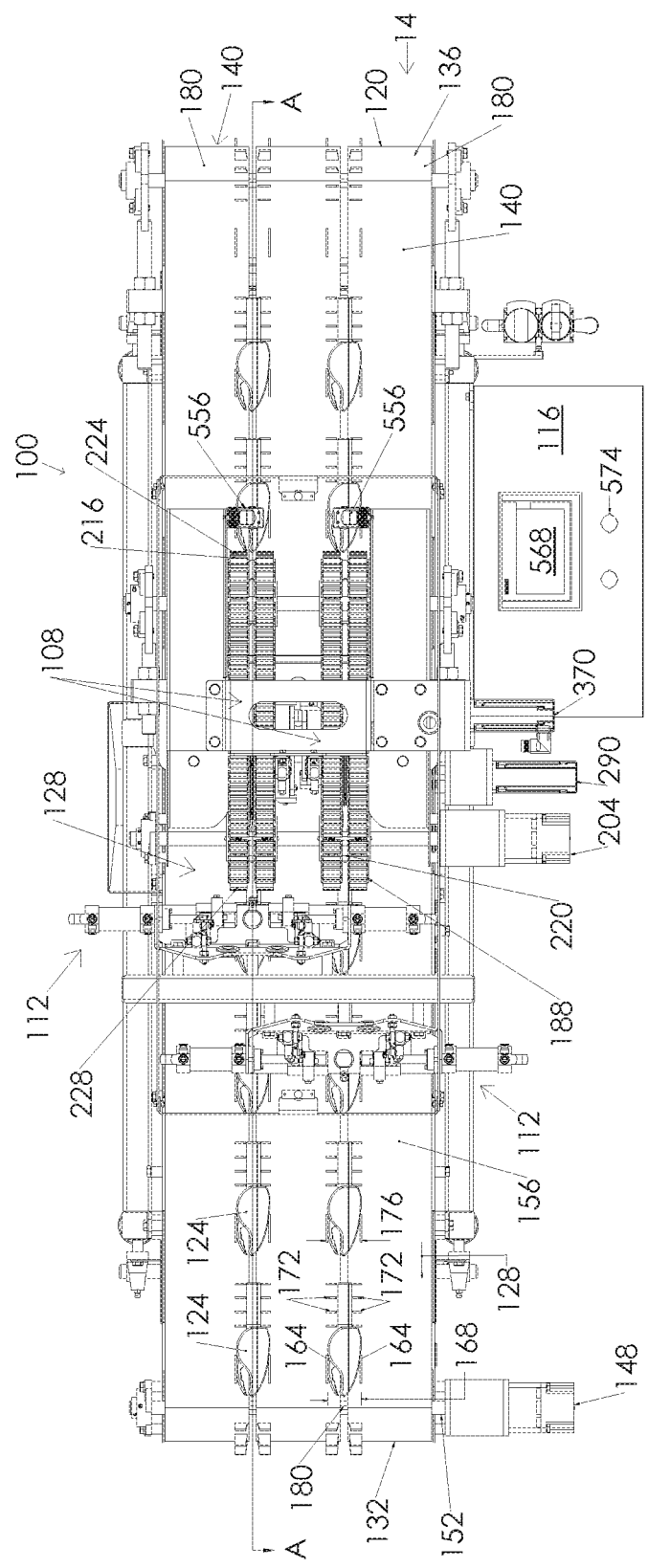
FIG. 2 is a top plan view of the apparatus of FIG. 1.

FIGS. 1 and 2 show a crustacean processing apparatus 100 in accordance with at least one embodiment. As shown, the apparatus 100 may include one or more of a conveyor 104, a shell cutting assembly 108, and a shell cracking assembly 112. For example, various embodiments of apparatus 100 may include cutting assembly 108; or cracking assembly 112; or conveyor 104 and cutting assembly 108; or conveyor 104 and cracking assembly 112; or conveyor 104, cutting assembly 108, and cracking assembly 112. Furthermore, apparatus 100 may include more than one conveyor 104, more than one cutting assembly 108, and/or more than one cracking assembly 112. For example, apparatus 100 as shown includes two conveyors 104, two cutting assemblies 108, and two cracking assemblies 112. Apparatus 100 may further include a controller 116 for operating one or more of conveyor 104, cutting assembly 108, and cracking assembly 112.

In use, a user may place a crustacean body part 124 (e.g. limb, such as a claw and knuckle) on a rear end 120 of conveyor 104. Conveyor 104 may then convey the body part 124 in a downstream direction 128 across the blades of cutting assembly 108 which may cut lengthwise incisions through the shell of the body part 124. Alternatively, or in addition, conveyor 104 may convey the body part 124 to cracking assembly 112 which may crack the shell of body part 124 circumferentially. The cut and cracked body part 124 may be discharged at the front end 132 of conveyor 104. Preferably, the meat of body part 124 can be easily removed from the cut and cracked shell. In use a user can orientate the claw on the conveyor knuckle first, claw first, crab leg open joint first or crab leg foot first. The user may run just knuckles, knuckles with horn (horn is half claw shell still attached to knuckle), crab legs, full lobster claws, or full lobster tails for example.

Conveyor

Figure 3:
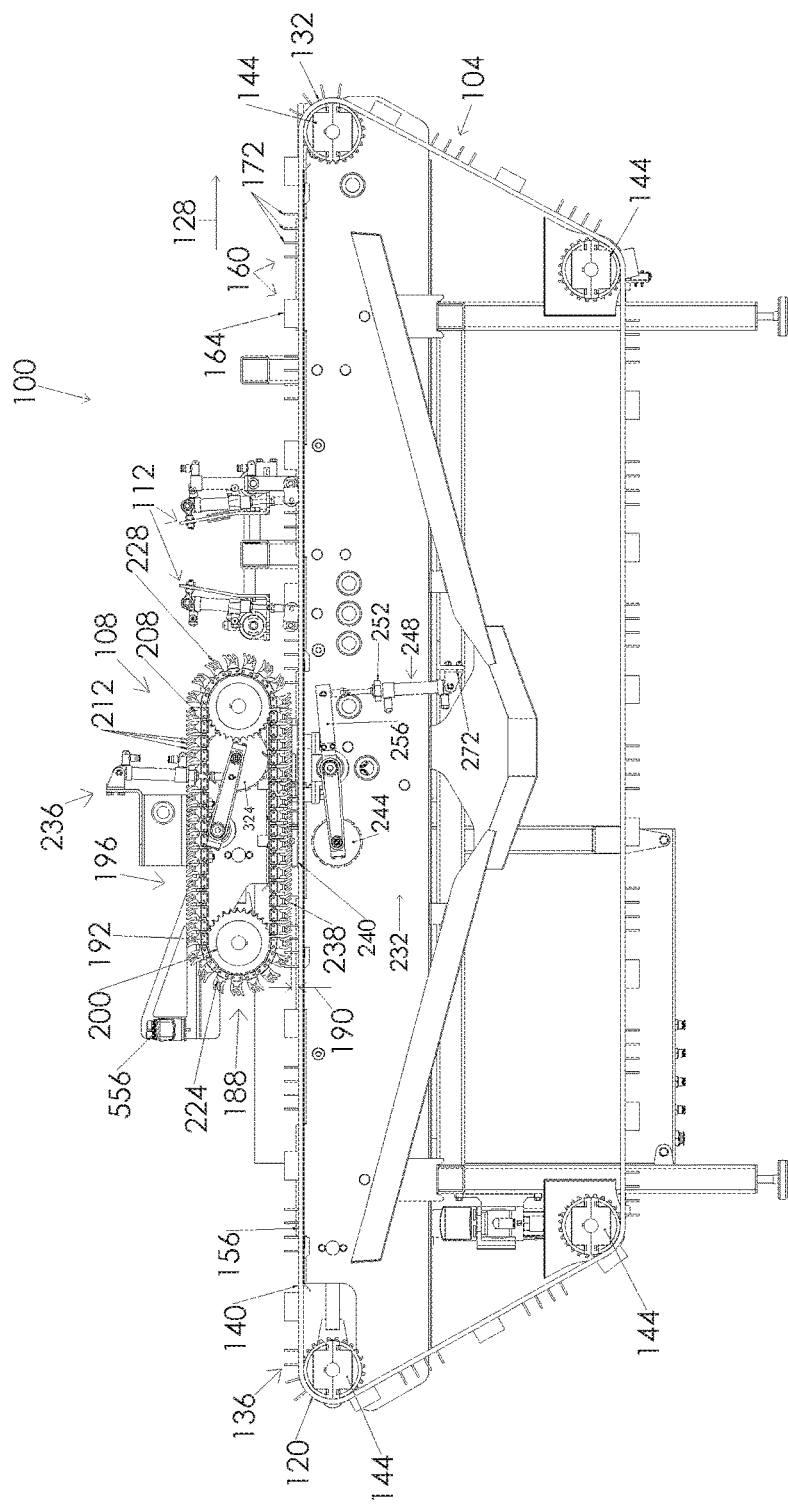
FIG. 3 is a cross-sectional view taken along line A-A in FIG. 1, with upper and lower cutting subassemblies in storage positions.

Reference is now made to FIGS. 1-3. Conveyor 104 may be any suitable conveyor for transporting a crustacean body part 124 to cutting and cracking assemblies 108 and 112. In the illustrated example, conveyor 104 includes a lower conveyor 136 for supporting and transporting a crustacean body part 124. As shown, lower conveyor 136 may be a belt conveyor including a continuous belt 140 which extends about a plurality of pulleys 144. Although the embodiment shown includes four pulleys 144, lower conveyor 136 may include any suitable number of pulleys (e.g. 2 to 20 pulleys). Any one or more of pulleys 144 may be driven to circulate belt 140 in an endless loop. A pulley 144 may be driven in any suitable fashion. As exemplified, belt conveyor 136 may include a motor 148 having a drive shaft 152 connected to one of pulleys 144 for driving belt 140 to circulate in an endless loop.

Preferably, conveyor 104 includes one or more alignment members for positioning and orienting a body part transported by conveyor 104. The alignment members may provide the body part with a consistent position and orientation during processing by the cutting and cracking assemblies. In the illustrated example, belt 140 of lower conveyor 136 includes an upper surface 156 for supporting a crustacean body part 124, and a plurality of alignment members 160 extending from upper surface 156 to assist with positioning and orienting the body part 124.

Alignment members 160 may take any form suitable for the particular body part to be processed by apparatus 100. In the illustrated embodiment, alignment members 160 include two upstanding panels 164 extending longitudinally downstream, and which are laterally spaced apart by a distance 168 sufficient to accommodate a crustacean claw, and two rows of upstanding panels 172, each panel extending laterally, and the two rows being laterally spaced apart a distance 176 sufficient to accommodate a crustacean knuckle. Preferably, distance 168 is between 25 mm and 100 mm, and more preferably between 50 mm and 80 mm. Preferably, distance 176 is between 1 mm and 30 mm, and more preferably 10 mm and 25 mm. In use, a claw and knuckle (still integrally formed as unitary limb severed from a crustacean) may be placed on upper surface 156 of belt conveyor 136 with the claw positioned between panels 164 and the knuckle extending rearwardly in between rows of panels 172. Alignment members 160 may help to straighten a supported body part on upper surface 156, which may be helpful for crustacean body parts, such as claws and knuckles, that may be naturally curved. Moreover, alignment members 160 may help to support body part in position against rotation during processing by cutting assembly 108 and cracking assembly 112 for consistent results.

In alternative embodiments, alignment members 160 may have a different structure. For example, each row of upstanding laterally extending panels 172 may be substituted by one longitudinally extending panel (such as panel 164). Further, alignment members 160 may be formed of any suitable material. For example, alignment members 160 may be rigid, or resiliently flexible. Preferably, alignment members 160 protrude from upper surface 156 of belt 140. For example, alignment members 160 may extend normal to upper surface 156 as shown, or at a (non-zero) angle to normal.

Conveyor 104 may provide one or more openings (e.g. slots) cooperable with cutting assembly 108 and/or cracking assembly 112 to facilitate cutting and/or cracking, respectively. In the illustrated example, belt 140 of belt conveyor 136 is formed of discrete belt segments 180 positioned laterally side-by-side. As shown, belt segments 180 may be laterally spaced apart to define a longitudinal slot 184 therebetween. Slot 184 may provide clearance for a blade or other element of cutting assembly 108 or cracking assembly 112 to protrude. As exemplified, alignment members 160 may be laterally spaced apart on opposite sides of slot 184, for retaining a crustacean body part 124 over the slot 184. This may make a body part 124 accessible through slot 184 to a blade or other element of cutting assembly 108 or cracking assembly 112.

In alternative embodiments (not shown), belt 140 may be formed by a single belt segment 180 with discrete openings provided where a crustacean body part 124 is intended to be placed. For example, belt 140 may include a plurality of discrete slots positioned between alignment members 160. In further embodiments, conveyor 104 may not include any openings or slots providing access to a crustacean body part 124 through conveyor 104. For example, one or more of cutting assembly 108 and cracking assembly 112 may engage with a crustacean body part 124 carried on conveyor 104 from the side or above without having to pass any element(s) through a slot in the conveyor 104.

Crustacean processing apparatus 100 may include more than one conveyor 104. In the illustrate example, apparatus 100 includes two conveyors 104. Each conveyor 104 is shown including a belt conveyor 136. Together, the two belt conveyors 136 as shown include three belt segments 180 arranged laterally side-by-side and laterally spaced apart to define two slots 184. Preferably, belt conveyors 136 operate in synchronicity at the same speed so that the alignment members 160 on the common central belt segment 180 stay aligned with the alignment members 160 on the two outer belt segments 180. This may also permit the two belt conveyors 136 to be driven by a common motor 148.

In alternative embodiments, belt conveyors 136 may operate independently. For example, belt conveyors 136 may not share a common belt segment 180 and instead each belt conveyor 136 may include a different pair of belt segments 180 (e.g. four belt segments 180 in total). In this case, each belt conveyor 136 may be optionally driven by separate motors, which may permit one belt conveyor 136 to be taken offline for repair or replacement while the other belt conveyor 136 continues operating normally.

In some embodiments, a conveyor 104 may include upper and lower conveyors which cooperate to carry a crustacean body part 124 from the rear end 120 of conveyor 104 to the front end 132 of conveyor 104. The upper conveyor may extend along the full length of the lower conveyor 132 or along a portion less than the full length of the lower conveyor 132. In the illustrated example, each conveyor 104 includes a lower conveyor 136 and an upper conveyor 188. The upper conveyor 188 may be aligned directed above the lower conveyor 136 as shown, or laterally offset. Preferably, the lower and upper conveyors 136 and 188 share a common downstream direction 128 of conveyance.

As exemplified, the upper conveyor 188 may be vertically spaced apart from the lower conveyor 136 by a distance 190 that can accommodate a crustacean body part 124. Distance 190 is preferably between 1 mm and 100 mm, and more preferably between 1 mm and 50 mm. In operation, the upper conveyor 188 may bear down on a crustacean body part 124 supported on the lower conveyor 136, effectively clamping the crustacean body part 124 between the lower and upper conveyors 136 and 188. This may help to prevent the crustacean body part 124 from moving during cutting. For example, upper conveyor 188 may prevent crustacean body part 124 from lifting off of lower conveyor 136 when cutting the into the crustacean body part 124 from below.

Upper conveyor 188 may take any suitable form. In the illustrate example, upper conveyor 188 is a chain conveyor including a plurality of links 192 that are interconnected to form a continuous chain loop 196. The chain loop 196 is held in tension between two or more pulleys 200, and driven to rotate. Any one or more of pulleys 200 may be driven by a motor 204 to circulate the chain loop 196. In some embodiments, links 192 of chain loop 196 may directly contact crustacean body parts 124 supported on lower conveyor 136. Alternatively, the embodiment shown includes a plurality of engagement members 208, where each engagement member 208 extends outwardly from a respective link 192 of chain loop 196. In this case, engagement members 208 may contact crustacean body parts 124 instead of links 192.

Optionally, engagement members 208 may be resiliently deformable. This may permit engagement members 208 to conform to the variable surface profile of a crustacean body part 124. In turn, this may increase the contact surface area between upper conveyor 188 and the crustacean body part 124. In the illustrated example, each engagement member 208 is formed by a plurality of outwardly extending fingers 212. Fingers 212 may extend substantially normal to an outside surface of the chain loop 196 or at angle to normal as shown. In alternative embodiments, an engagement member 208 may be formed by a deformable elastomeric (e.g. rubber) pad.

Upper conveyor 188 may include one or more openings (e.g. slots) to permit a blade or other element of cutting or cracking assemblies 108 and 112 to pass through the upper conveyor 188 for operating on a crustacean body part 124 below. For example, upper conveyor 188 may be formed from two or more chain loop segments 216 positioned laterally side-by-side. In this case, chain loop segments 216 may be laterally spaced apart as shown to define a longitudinally extending slot 220. As illustrated, slot 220 may extend from rear end 224 of upper conveyor 188 to front end 228 of upper conveyor 188.

Figure 34:
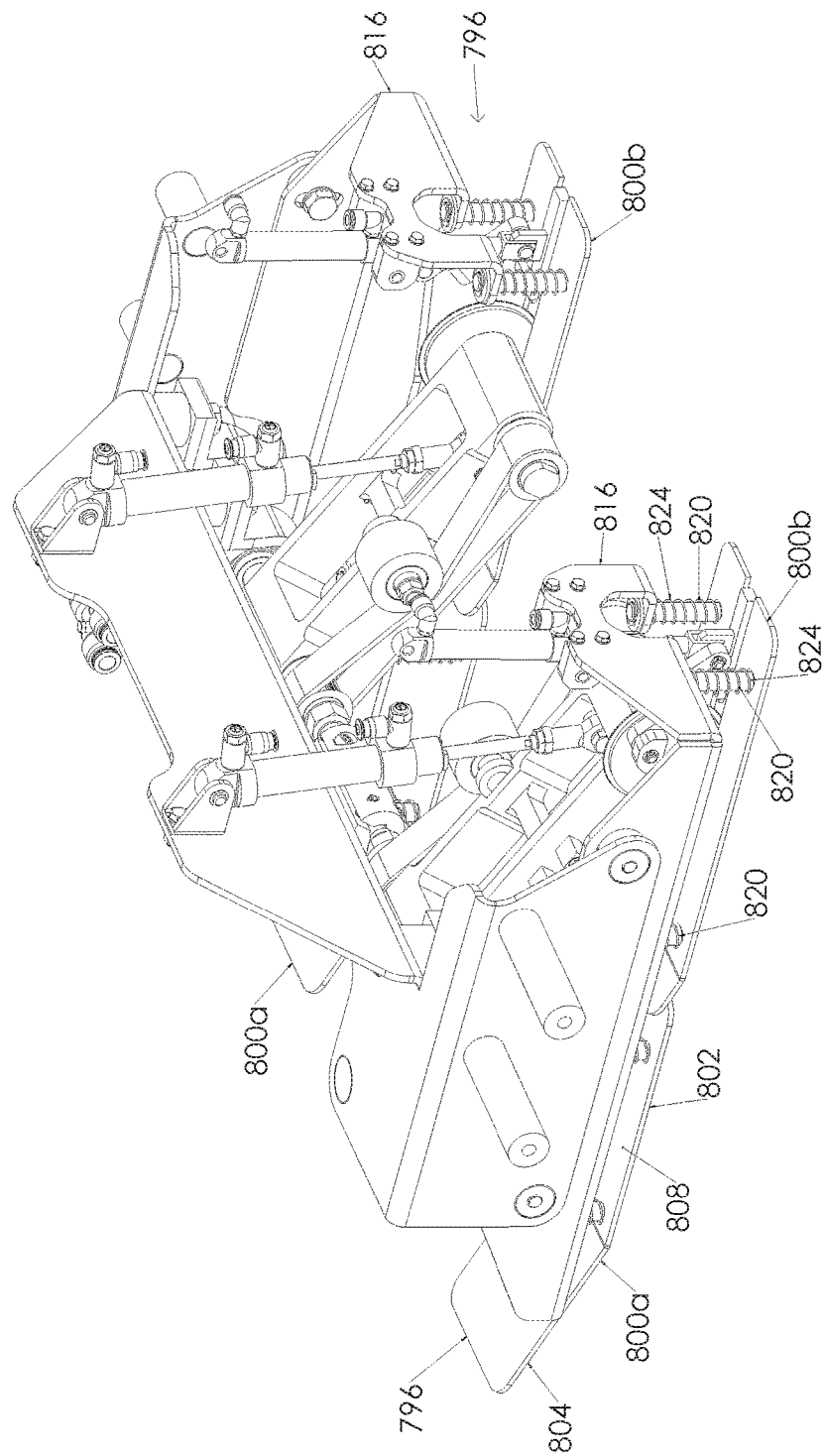
FIG. 34 is a perspective view of an upper cutting subassembly, in accordance with another embodiment.
Figure 35:
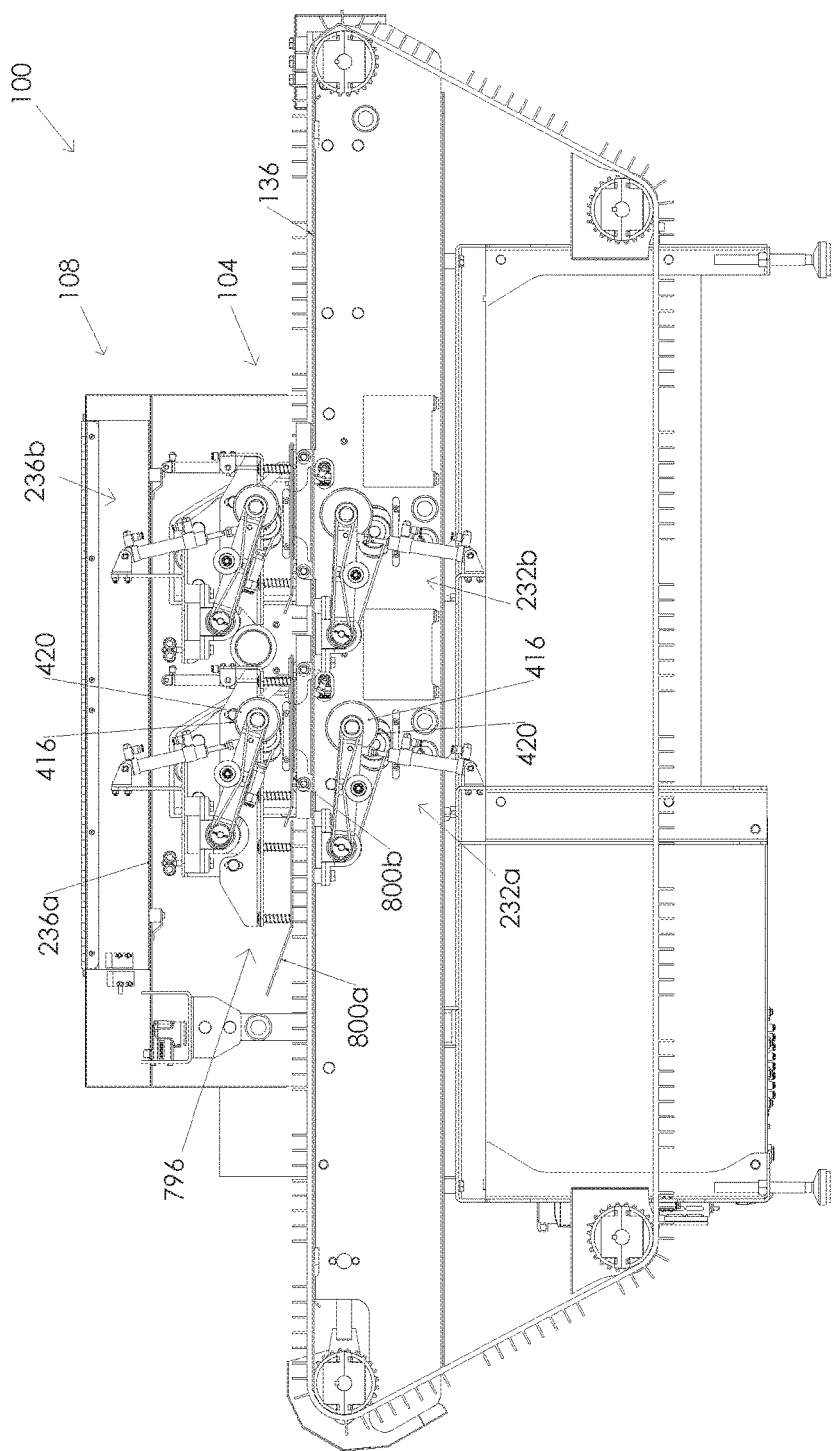
FIG. 35 is a side elevation view of a crustacean processing apparatus including the upper cutting subassembly of FIG. 34 with blades in a storage position.

Turning now to FIGS. 34 and 35, in alternative embodiments the upper conveyor 188 of conveyor 104 may be substituted by an upper press plate assembly 796. As shown, upper press plate assembly 796 may include one or more upper press plates 800. A press plate 800 may be formed as a flat plate having a smooth, low friction lower surface 802 positioned in spaced apart relation to lower cutting subassembly 232. Upper press plate assembly 796 may bear down onto crustacean body parts with upper press plate(s) 800 as the body parts move along conveyor 104. The low friction lower surface 804 of upper press plate(s) 800 may be made of any suitable material(s) such as stainless steel, which may be optionally treated or coated to further reduce frictional resistance to the sliding of crustacean body parts below.

Still referring to FIGS. 34 and 35, conveyor 104 may include a plurality of upper press plates 800 arranged in series. In the illustrated embodiment, conveyor 104 includes a first upper press plate 800a positioned upstream a second upper press plate 800b. In alternative embodiments, conveyor 104 may include just one upper press plate 800, or conveyor 104 may include three or more press plates 800. Upper press plate 800 may be vertically movable and biased downwardly for holding a crustacean body part moving along conveyor 104. Upper press plate 800 may be biased downwardly in any suitable manner. In the illustrated example, upper press plate 800 is connected to an upper frame 816 by guides 820. Guides 820 may be slidable vertically relative to upper frame 816 to permit vertical movement of upper press plate 800 relative to upper frame 816. Linear coil springs 824 may be interposed between upper frame 816 and upper press plate 800 to resiliently bias the upper press plate 800 downwardly toward lower conveyor 136. For example, coil spring 824 may be positioned collinearly with guides 820.

Upper press plate 800 includes an upstream portion 804 and a downstream portion 808. Downstream press plate portion 808 may be oriented substantially in parallel with lower conveyor 136 (e.g. horizontally). This may permit a crustacean body part held below the upper press plate 800 to slide along the upper press plate 800 as the lower conveyor 136 moves the crustacean body part downstream. Upstream press plate portion 804 may be formed as a ramp angled away from lower conveyor 136. In use, upstream press plate portion 804 may ride a crustacean body part as the body part moves downstream, whereby the upper press plate 800 may be urged to move vertically against the bias of spring 824. This may permit upper press plate 800 to accommodate crustacean body parts of different sizes.

Cutting Assembly

Figure 4:
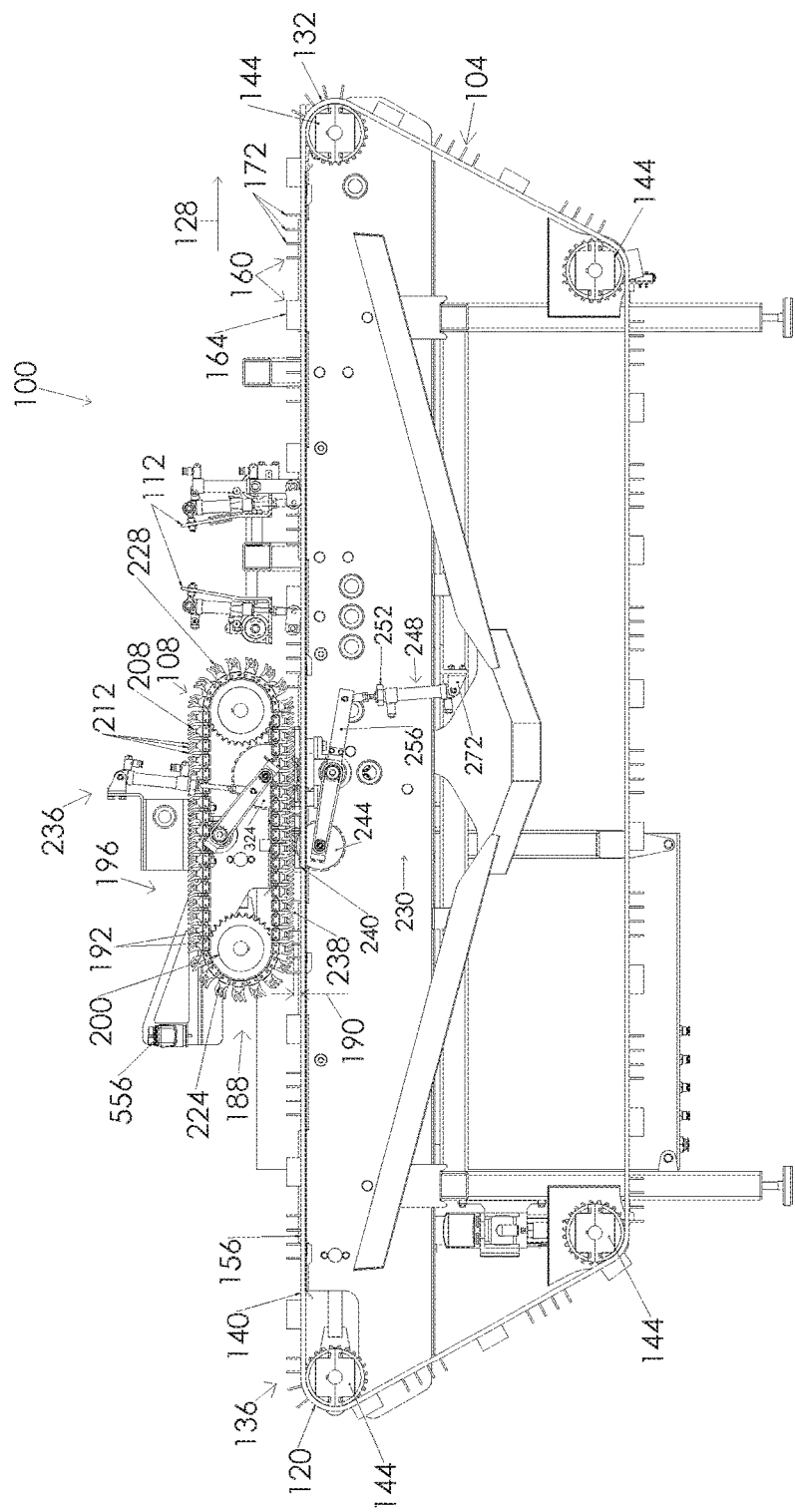
FIG. 4 is a cross-sectional view taken along line A-A in FIG. 1, with the upper and lower cutting subassemblies in engaged positions.

Reference is now made to FIGS. 3 and 4. In some embodiments, processing apparatus 100 may include a cutting assembly 108 for cutting lengthwise cuts (i.e. incisions) through the shell of a crustacean body part 124. Preferably, the cutting assembly 108 controls the cutting depth to avoid cutting too far into the meat below the shell. Cutting assembly 108 may form cuts along any portion of the crustacean body part 124. For example, cutting assembly 108 may form lengthwise cuts along the lateral sides, the upper, and/or the lower sides of a crustacean body part 124.

In the illustrated example, cutting assembly 108 includes lower and upper cutting subassemblies 232 and 236. As shown, lower cutting subassembly 232 may be positioned below upper surface 156 of lower conveyor 136 for cutting a lower side of a crustacean body part 124, and upper cutting subassembly 232 may be positioned above a lower surface 238 of upper conveyor 188 for cutting an upper side of the crustacean body part 124. As used herein and in the claims, "lower side" and "upper side" of a crustacean body part 124 mean the side of the crustacean body part 124 that is facing downwardly or upwardly, respectively, when the crustacean body part 124 is supported on the conveyor 104. For clarity, these terms do not refer to any specific physiology of the crustacean body part 124.

Figure 5:
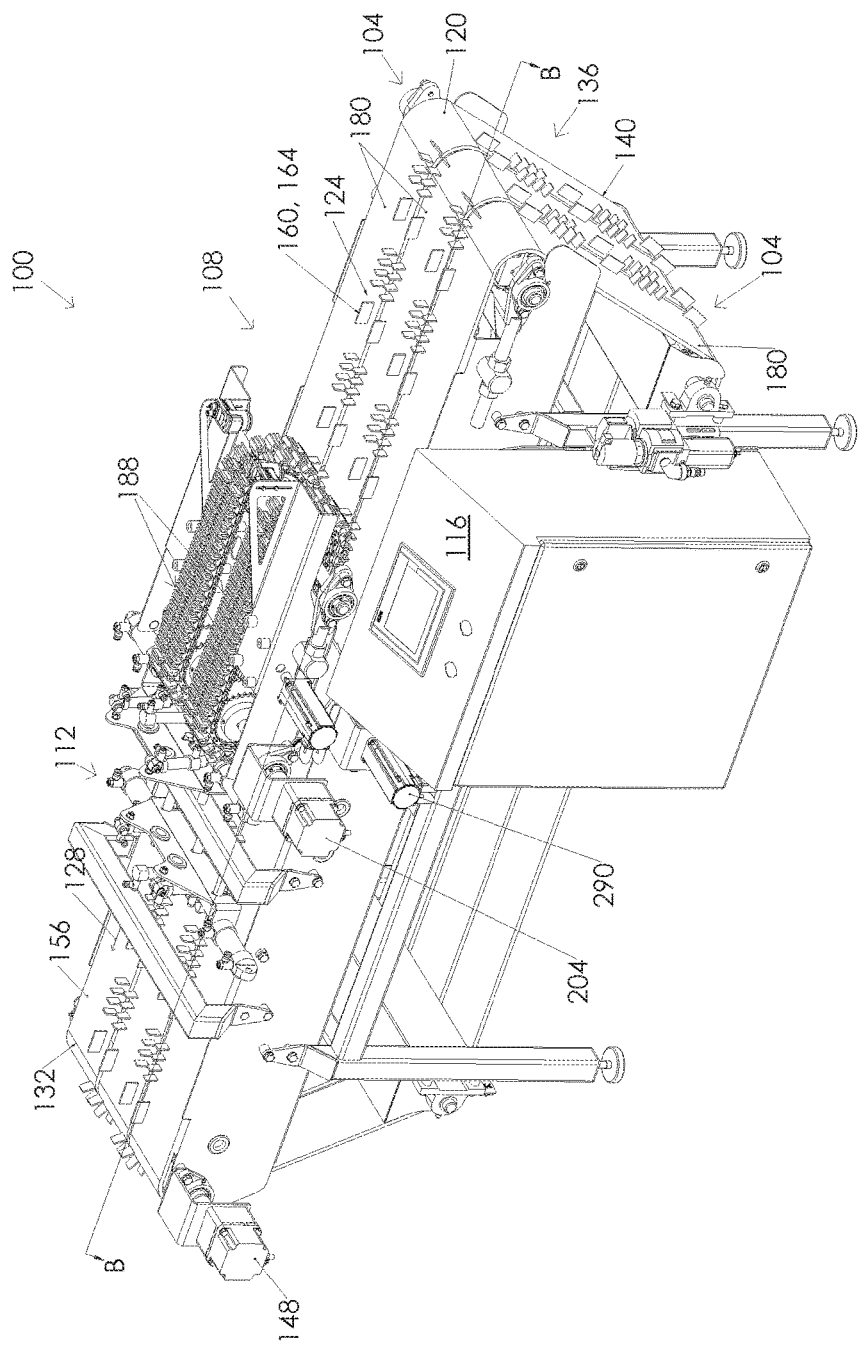
FIG. 5 is a perspective view of an apparatus for processing crustaceans, in accordance with another embodiment.
Figure 6:
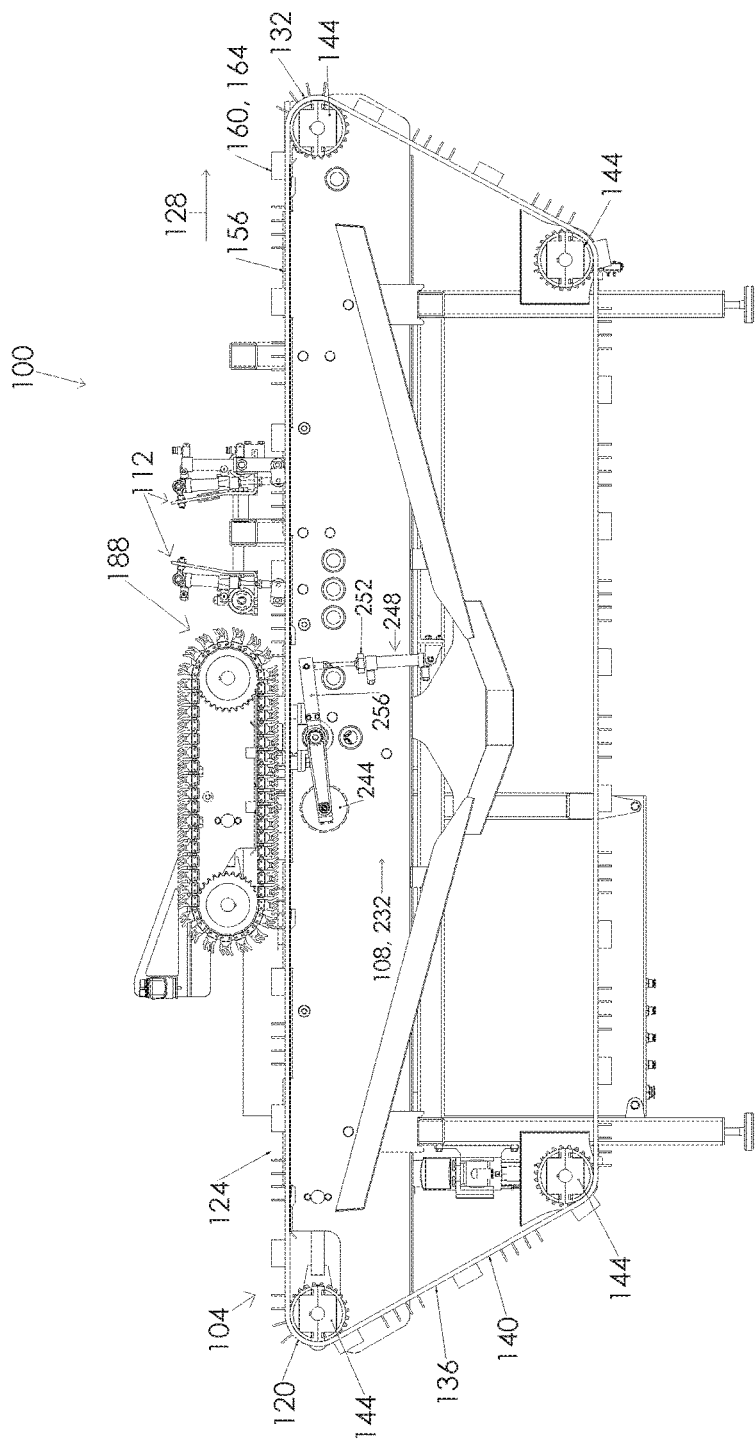
FIG. 6 is a cross-sectional view taken along line B-B in FIG. 1.
Figure 7:
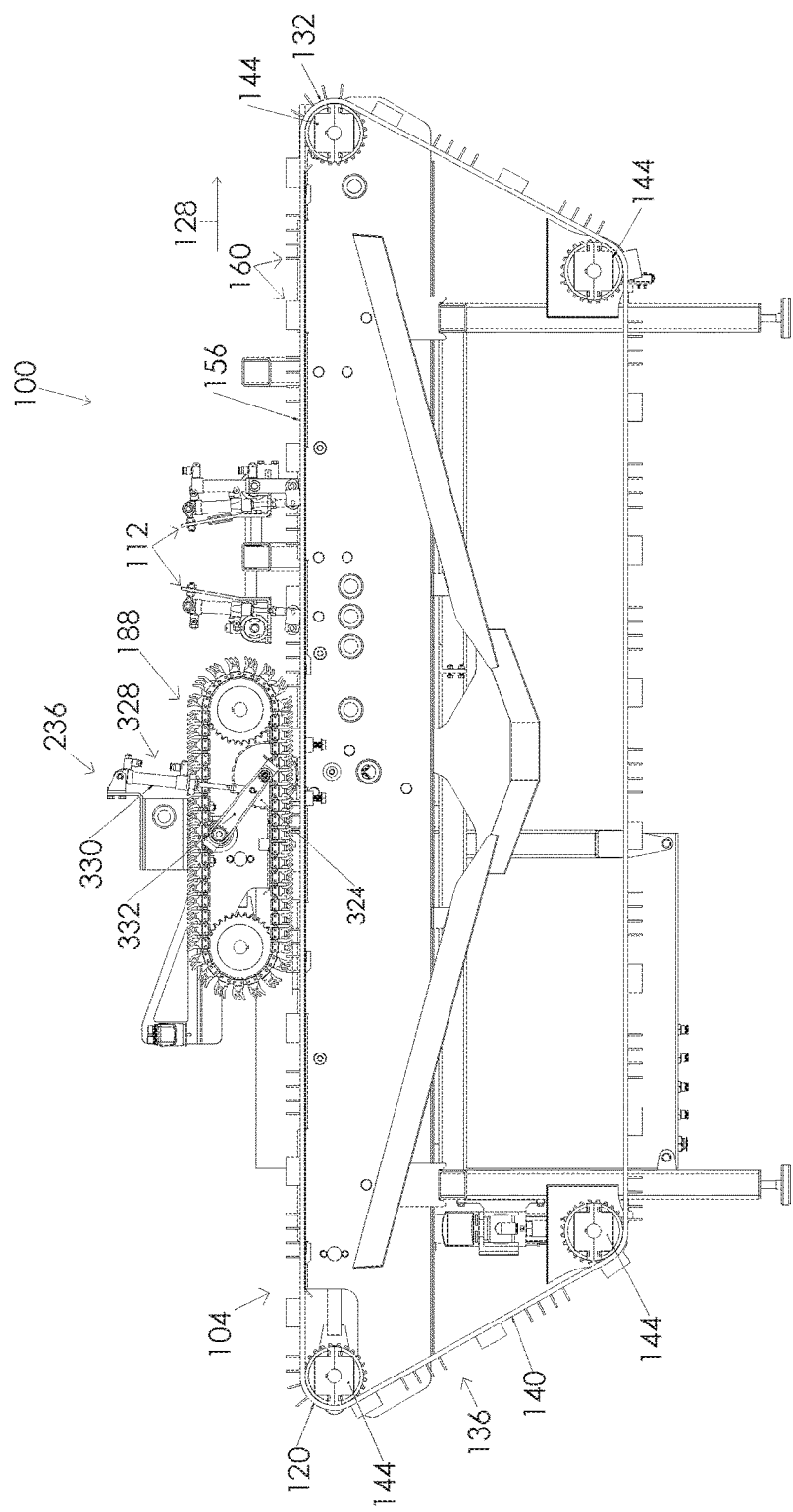
FIG. 7 is a cross-sectional view taken along line A-A in FIG. 1, in accordance with another embodiment, in which an upper cutting subassembly in an engaged position.
Figure 8:
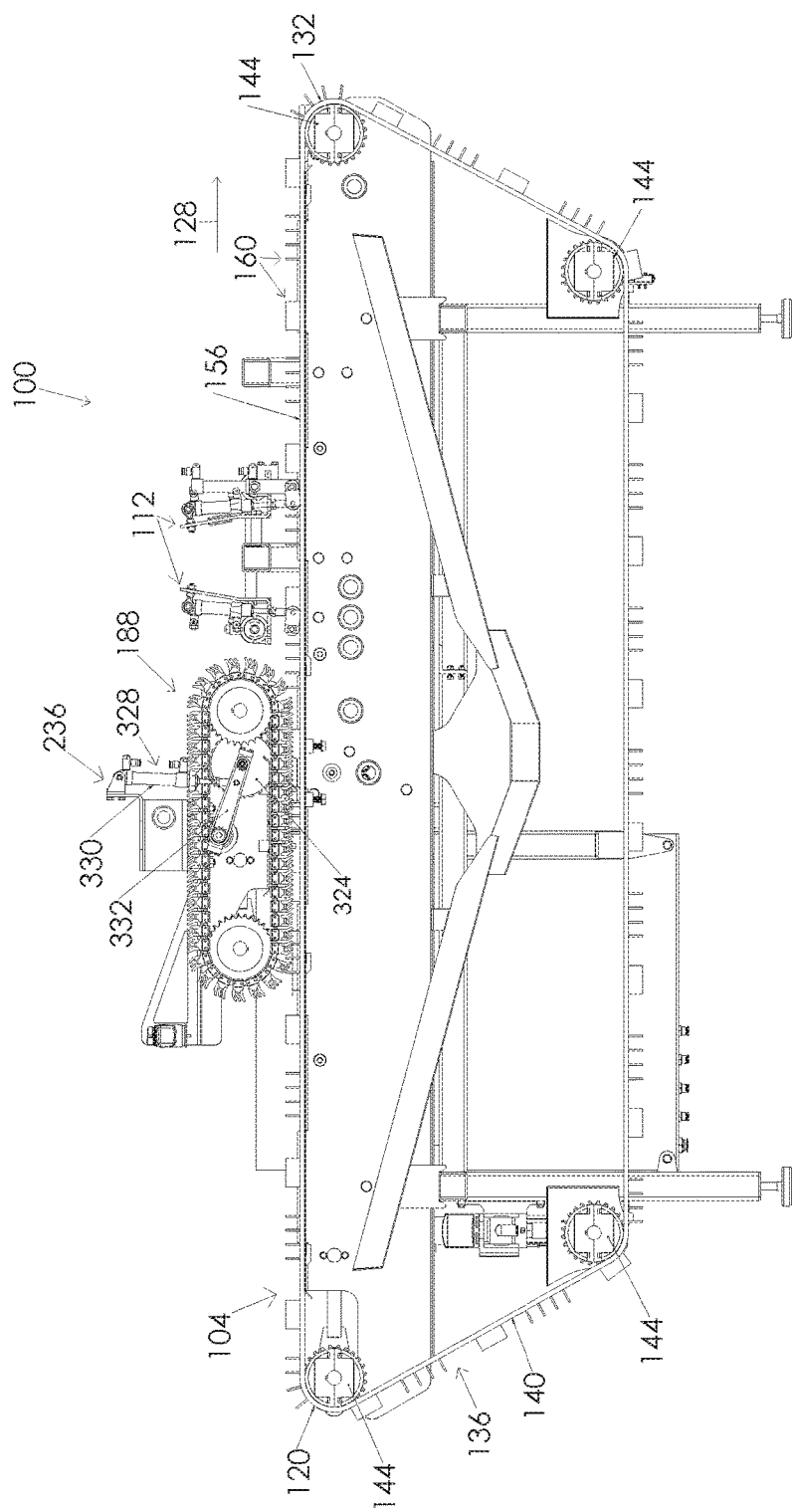
FIG. 8 is the cross-sectional view of FIG. 7 with the upper cutting subassembly in a storage position.

In some embodiments, cutting assembly 108 may include lower cutting subassembly 232 (see FIGS. 5 and 6), or upper cutting subassembly 236 (see FIGS. 7 and 8), or both lower and upper cutting subassemblies 232 and 236. Alternatively or in addition, cutting assembly 108 may include one or more cutting subassemblies positioned laterally of conveyors 136 and 188 for cutting lateral side(s) of the crustacean body part 124. In some embodiments, cutting assembly 108 may include a plurality of upper cutting subassemblies 236, a plurality of lower cutting assemblies 232, or both.

Still referring to FIGS. 3 and 4, conveyor 104 may include a region 240 for supporting a crustacean body part 124. Region 240 is a volume of space, which can be occupied by a crustacean body part 124 supported on conveyor 104, where the crustacean body part 124 can be cut by cutting assembly 108.

Lower Cutting Subassembly

Reference is now made to FIGS. 3 and 4. In some embodiments, cutting assembly 108 may include a lower cutting subassembly 232. As shown, lower cutting subassembly 232 may include a blade 244 for cutting the shell of a crustacean body part 124. Blade 244 may be movable between a storage position (see FIG. 3) in which the blade 244 is withdrawn from (i.e. positioned outside of) the region 240, and an engaged position (FIG. 4) in which the blade 244 is positioned inside the region 240 for cutting the shell of a crustacean body part 124 supported on the conveyor 104. As exemplified, blade 244 may be wholly positioned below upper surface 156 in the storage position, and a portion of blade 244 may extend above upper surface 156 in the engaged position.

Blade 244 may be movable between the storage position and the engaged position in any suitable manner. Preferably, lower cutting subassembly 232 provides selective (i.e. active) control over the position of blade 244. For example, lower cutting subassembly 108 may include one or more of a motor, or piston cylinder coupled to blade 244 and which may be actuated to extend or retract blade 244 into or out of the region 240. This may permit blade 244 to be moved into the engaged position extending above upper surface 156 when a crustacean body part 124 has moved into region 240, and withdrawn below upper surface 156 into the storage position in between crustacean body parts 124. This may also permit blade 244 to be moved into the engaged position for cutting only a predetermined portion of a crustacean body part 124 (e.g. only the knuckle of a body part 124 containing a knuckle and claw), and afterwards withdrawn to the storage position.

In the illustrated example, lower cutting subassembly 232 includes an actuator 248 drivingly coupled to blade 244. Actuator 248 may be an electric device, hydraulic device, or more preferably a pneumatic device for providing active control over the position of blade 244, and over the pressure (and/or force) exerted by blade 244 against the shell of a crustacean body part 124.

Preferably, actuator 248 is a fluidic device (e.g. hydraulic or pneumatic) and more preferably a pneumatic device. A pneumatic device may provide a resilient spring effect on account of the compressibility of the gas actuating the pneumatic control element in the device. This may help to mitigate the risk of actuator 248 exerting blade 244 against the shell of body part 124 with an excess of pressure (and/or force) (e.g. which may cut too far into the meat of the body part 124 thus compromising the integrity of the meat). In effect, this may help to improve the resolution of the pressure (and/or force) control over blade 244.

In some embodiments, actuator 248 may include a piston cylinder 252 directly or indirectly coupled to blade 244 for moving the blade 244 between the storage and engaged positions. Hereafter, actuator 248 will be referred to as pneumatic device 248, however, it will be appreciated that a hydraulic or electric device can also be used.

Reference is now made to FIGS. 9-12. As exemplified, pneumatic device 248 may include a lever arm 256 pivotably mounted about a pivot axis of rotation 260. As shown, lever arm 256 may connect piston cylinder 252 to blade 244. In use, piston cylinder 252 may be selectively extended and retracted to pivot the lever arm 256 about pivot axis 260 for moving blade 244 between the storage and engaged positions. In the illustrated example, axis 260 is substantially horizontal, such that lever arm 256 moves in a substantially vertical plane. In alternative embodiments, axis 260 may extend at a (non-zero) angle to horizontal, such that lever arm 256 moves in a plane angled to vertical.

Piston cylinder 252 and blade 244 may be connected to lever arm 256 in any suitable fashion. As exemplified, piston cylinder 252 may include a first end 264 pivotally connected (e.g. by a pin joint as shown or another suitable articulating connection) to lever arm 256, and a second end 268 pivotably connected (e.g. by a pin joint as shown or another suitable articulating connection) to a fixed-position mounting bracket 272 (or another fixed support of apparatus 100).

Blade 244 may be any suitable cutting blade, such as a rotary blade (as shown), or a reciprocating blade for example. As illustrated, blade 244 may be mounted to lever arm 256 by a blade axle 276 for rotation about a blade axis of rotation 280. In use, lower cutting subassembly 232 may drive blade 244 to rotate with blade axle 276 about blade axis 280. Blade axis 280 and blade axle 276 may be substantially horizontally aligned as shown such that blade 244 is substantially vertically oriented and rotatable in a substantially vertical plane. In alternative embodiments (not shown), blade axis of rotation 280 and blade axle 276 may be aligned at a (non-zero) angle to horizontal such that blade 244 is aligned at a (non-zero) angle to vertical and rotatable in a plane at a (non-zero) angle to vertical.

Lever arm 256 may be pivotally mounted for rotation about pivot axis 260 in any suitable manner. In the illustrated example, lever arm 256 includes bearings 284 rotationally mounted to a drive shaft 288 for rotation about pivot axis 260. As illustrated, pivot axis 260 may be co-extensive with drive shaft 288. Piston cylinder 252 and blade 244 may be connected to lever arm 256 on opposite sides of pivot axis 260 as shown, or on the same side of pivot axis 260. Further, piston cylinder 252 may be positioned below lever arm 256 as shown such that extending piston cylinder 252 raises the connected portion of lever arm 256, or above lever arm 256 such that retracting piston cylinder 252 raises the connected portion of lever arm 256.

Blade 244 may be driven to rotate about blade axis 280 in any suitable fashion. In the illustrated example, drive shaft 288 is drivingly coupled to blade 244 for driving blade 244 to rotate. As shown, an indirect drive belt 292 may connect drive shaft 288 to blade axle 276. A motor 290 may rotate drive shaft 288 for rotating drive belt 292, which rotates blade axle 276 and blade 244. Drive belt 292 may be any suitable drive belt or chain, and may be connected to drive shaft 288 and blade axle 276 in any suitable fashion. As exemplified, drive belt 292 may be mounted to a first drive gear 296 on drive shaft 288, and to a second drive gear 300 on blade axle 276. In alternative embodiments, blade 244 may be directly driven by motor 290.

In one aspect, using a pivotally mounted lever arm 256 to connect piston cylinder 252 to blade 244 as shown may simplify the drive connection to blade 244. Lever arm 256 may provide a constant distance between drive shaft 288 and blade axle 276, for connection by a drive belt 292. Further, this configuration may permit a plurality of pneumatic devices 248 to share a common drive shaft 288 as shown. This may permit multiple blades 244 to be driven by a common motor 290. As illustrated, the lever arm 256 of each pneumatic device 248 may be pivoted independently of the other pneumatic device 248.

In the illustrated example, apparatus 100 includes two lower cutting subassemblies 232 which share a common drive shaft 288. Each lower cutting subassembly 232 as shown includes a blade 244 that is positionable independently of the blade 244 of the other lower cutting subassembly 232. In alternative embodiments, apparatus 100 may include just one lower cutting subassembly 232, or three or more lower cutting subassemblies 232. Further, any two or more lower cutting subassemblies 232 may share a common drive shaft 288 driven by a common motor 290, or different subassemblies 232 may be mounted to different drive shafts 288 driven by different motors 290. The former case may provide a simpler and more compact design, whereas the latter case may permit one subassembly 232 to be taken offline (e.g. for repair or replacement) without interrupting the operation of the other subassembly 232.

Lower cutting subassemblies 232 may be secured in place in any suitable manner. For example, mounting brackets 304 may join drive shaft 288 to a support element of apparatus 100.

Figure 9:
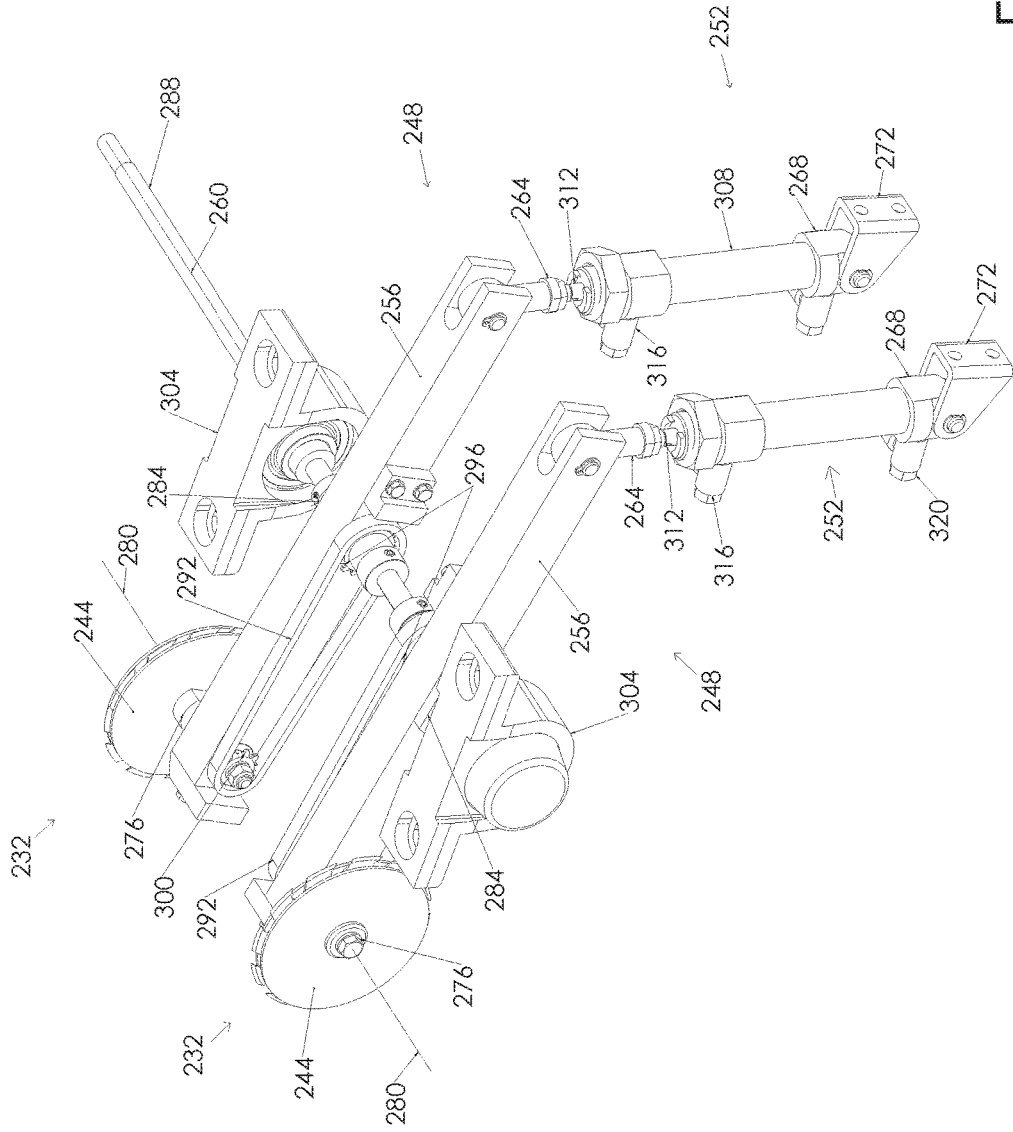
FIG. 9 is a perspective view of two lower cutting subassemblies, each including a blade in an engaged position, in accordance with at least one embodiment.
Figure 10:
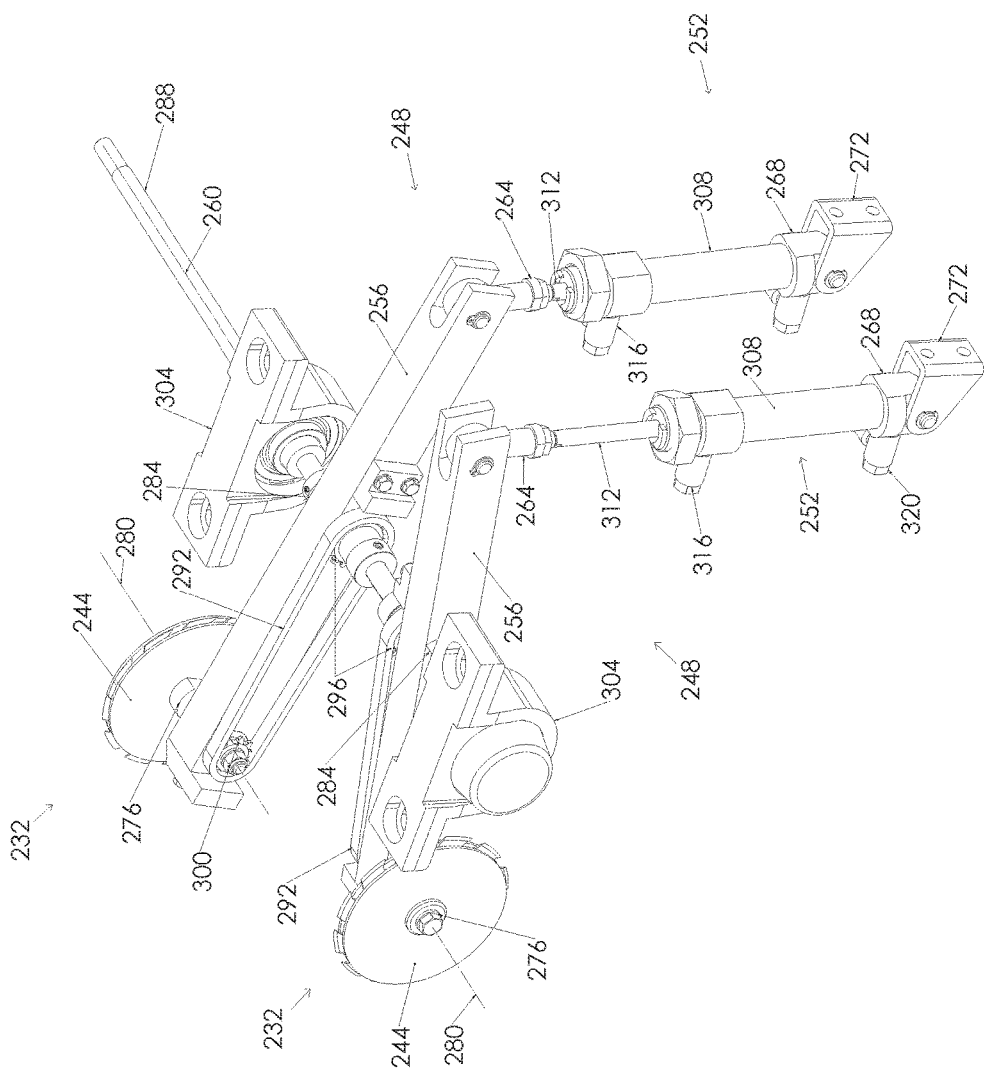
FIG. 10 is the perspective view of FIG. 9, with the blade of one of the lower cutting subassemblies in the storage position, in accordance with at least one embodiment.
Figure 11:
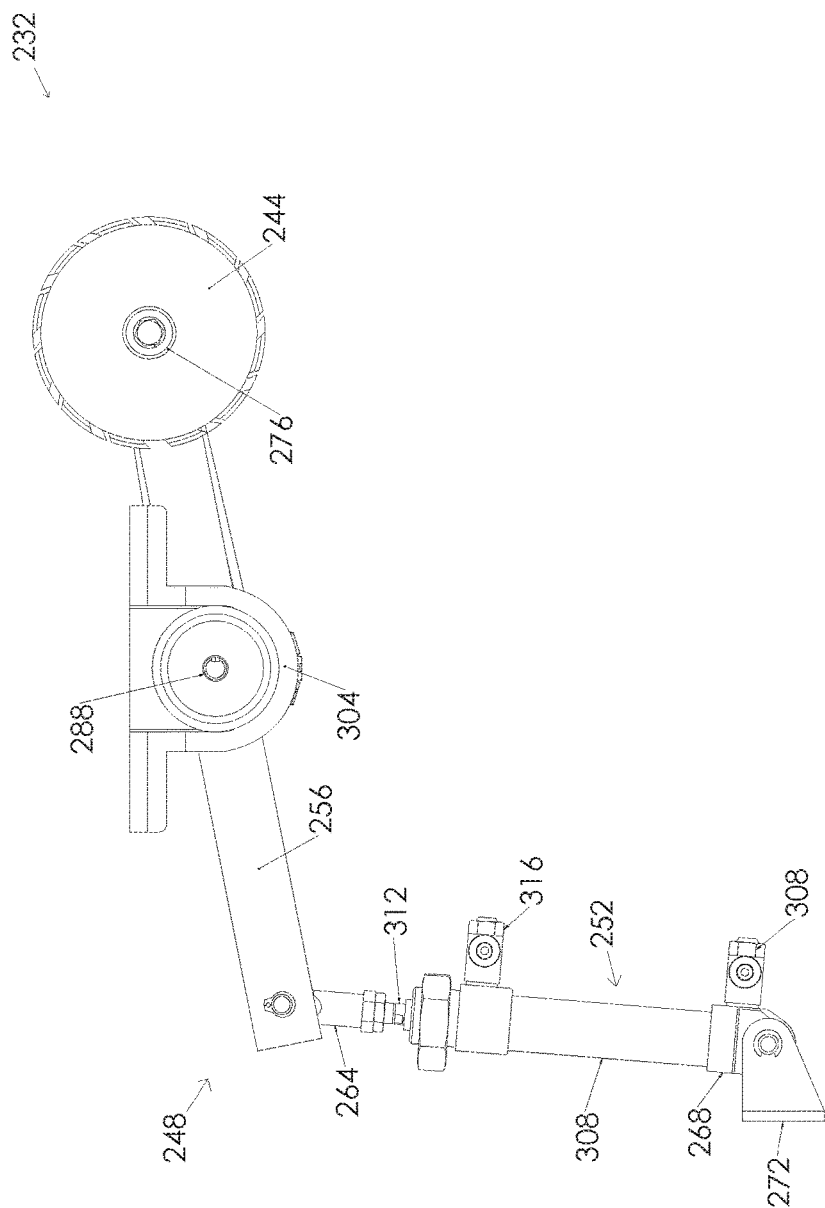
FIG. 11 is a side elevation view of the two lower cutting subassemblies of FIG. 9.
Figure 12:
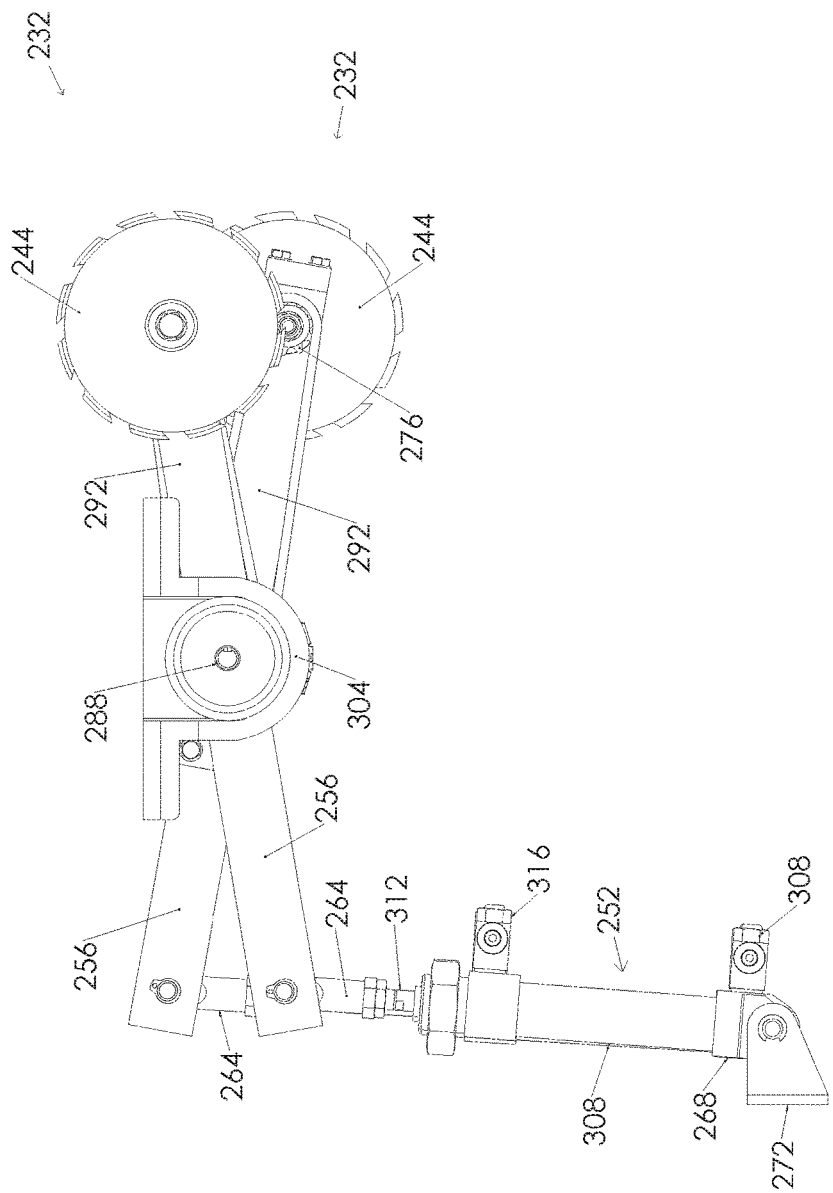
FIG. 12 is a side elevation view of the two lower cutting subassemblies of FIG. 10.
Figure 13:
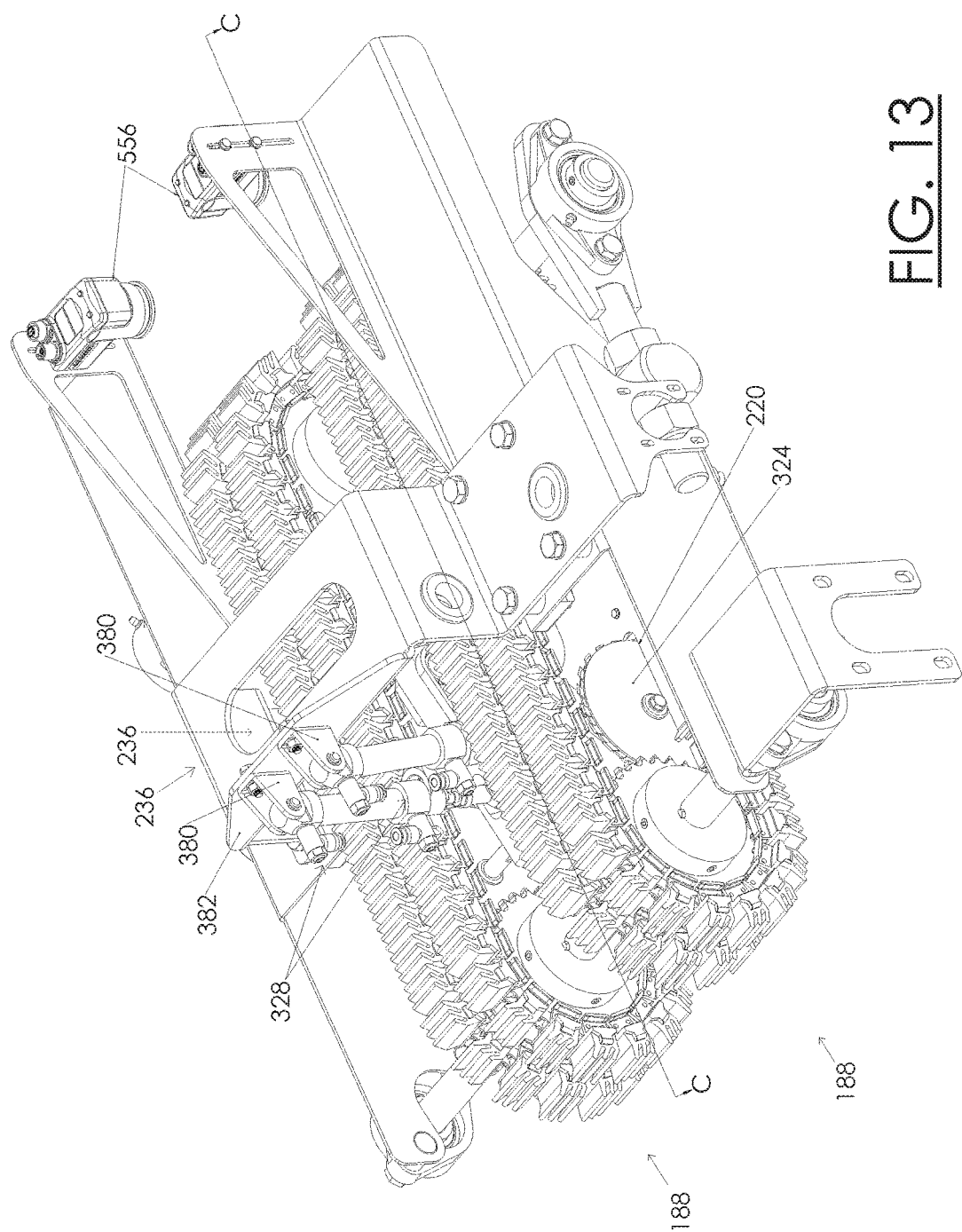
FIG. 13 is a perspective view of two upper conveyors, and two upper cutting subassemblies, in accordance with at least one embodiment.

Piston cylinder 252 may be any suitable piston cylinder known in the art. In the illustrated example, piston cylinder 252 includes a cylinder 308 and a rod 312 which can be selectively extended and retracted from cylinder 308. Cylinder 308 is shown including first and second valves 316 and 320, which may be fluidly connected (e.g. by hoses, not shown) to a pressurized gas supply (not shown). In use, controller 116 (see FIG. 1) may selectively direct air from the pressurized air supply into valve 316 to retract rod 312 into cylinder 308 (as shown in FIGS. 3 and 9) or into valve 320 to extend rod 312 out of cylinder 308 (as shown in FIGS. 4 and 10).

Controller 116 may control the movement of blade 244 between the engaged position and the storage position. Preferably, controller 116 controls the extension and retraction of piston cylinder 252 for moving blade 244 between the engaged and storage positions. In the illustrated example, retracting piston cylinder 252 (i.e. retracting rod 312 into cylinder 308) may move blade 244 through slot 184 into the engaged position (i.e. into region 240) for cutting into the shell of a crustacean body part 124 supported on conveyor 104 in region 240 (see FIGS. 1 and 3). Similarly, extending piston cylinder 252 (i.e. extending rod 312 out of cylinder 308) may withdraw blade 244 from region 240 into the storage position (see FIG. 4).

Upper Cutting Subassembly

Reference is now made to FIGS. 13-19. In some embodiments, cutting assembly 108 may include an upper cutting subassembly 236. As shown, upper cutting subassembly 236 may include a blade 324 for cutting the shell of a crustacean body part 124. Blade 324 may be movable between a storage position (see FIGS. 14, 16, and 18) in which the blade 324 is withdrawn from (i.e. positioned outside of) the region 240 (see FIG. 16), and an engaged position (see FIGS. 15, 17, and 19) in which the blade 324 is positioned inside the region 240 (see FIG. 17) for cutting the shell of a crustacean body part 124 supported on conveyor 104. As exemplified, blade 324 may be wholly positioned above lower surface 238 in the storage position, and a portion of blade 324 may extend below lower surface 238 in the engaged position.

Blade 324 may be movable between the storage position and the engaged position in any suitable manner. Preferably, upper cutting subassembly 236 provides selective (i.e. active) control over the position of blade 324. For example, upper cutting subassembly 108 may include one or more of a motor, or piston cylinder coupled to blade 324 and which may be actuated to extend or retract blade 324 into or out of the region 240. This may permit blade 324 to be moved into the engaged position when a crustacean body part 124 has moved into region 240, and withdrawn to the storage position in between crustacean body parts 124. This may also permit blade 324 to be moved into the engaged position for cutting only a predetermined portion of a crustacean body part 124 (e.g. only the knuckle of a body part 124 containing a knuckle and claw), and afterwards withdrawn to the storage position.

In the illustrated example, upper cutting subassembly 236 includes an actuator 328 drivingly coupled to blade 324. Actuator 328 may be an electric device, hydraulic device, or more preferably a pneumatic device for providing active control over the position of blade 324, and over the pressure (and/or force) exerted by blade 324 against the shell of a crustacean body part 124.

Preferably, actuator 328 is a fluidic device (e.g. hydraulic or pneumatic) and more preferably a pneumatic device. A pneumatic device may provide a resilient spring effect on account of the compressibility of the gas actuating the pneumatic control element in the device. This may help to mitigate the risk of actuator 328 exerting blade 324 against the shell of body part 124 with an excess of pressure (and/or force) (e.g. which may cut into the meat of the body part 124). In effect, this may help to improve the resolution of the pressure (and/or force) control over blade 324.

In some embodiments, actuator 328 may include a piston cylinder 330 directly or indirectly coupled to blade 324 for moving the blade 324 between the storage and engaged positions. Hereafter, actuator 328 will be referred to as pneumatic device 328, however, it will be appreciated that a hydraulic or electric device can also be used.

Reference is now made to FIGS. 14-19. As exemplified, pneumatic device 328 may include a lever arm 332 pivotably mounted about a pivot axis of rotation 336. As shown, lever arm 332 may connect piston cylinder 330 to blade 324. In use, piston cylinder 330 may be selectively extended and retracted to pivot the lever arm 332 about pivot axis 336 for moving blade 324 between the storage and engaged positions. In the illustrated example, axis 336 is substantially horizontal, such that lever arm 332 moves in a substantially vertical plane. In alternative embodiments, axis 336 may extend at a (non-zero) angle to horizontal, such that lever arm 332 moves in a plane angled to vertical.

Piston cylinder 330 and blade 324 may be connected to lever arm 332 in any suitable fashion. As exemplified, piston cylinder 330 may include a first end 340 pivotally connected (e.g. by a pin joint as shown or another suitable articulating connection) to lever arm 332, and a second end 344 pivotally connected (e.g. by a pin joint as shown or another suitable articulating connection) to a fixed-position mounting bracket 348 (or another fixed support of apparatus 100).

Blade 324 may be any suitable cutting blade, such as a rotary blade (as shown), or a reciprocating blade for example. As illustrated, blade 324 may be mounted to lever arm 332 by a blade axle 352 for rotation about a blade axis of rotation 356. In use, upper cutting subassembly 236 may drive blade 324 to rotate with blade axle 352 about blade axis 356. Blade axis 356 and blade axle 352 may be substantially horizontally aligned as shown such that blade 324 is substantially vertically oriented and rotatable in a substantially vertical plane. In alternative embodiments (not shown), blade axis of rotation 356 and blade axle 352 may be aligned at a (non-zero) angle to horizontal such that blade 324 is aligned at a (non-zero) angle to vertical and rotatable in a plane at a (non-zero) angle to vertical.

Lever arm 332 may be pivotally mounted for rotation about pivot axis 336 in any suitable manner. In the illustrated example, lever arm 332 is bearings 360 rotationally mounted to a drive shaft 364 for rotation about pivot axis 336. As illustrated, pivot axis 336 may be co-extensive with drive shaft 364. Piston cylinder 330 and blade 324 may be connected to lever arm 332 on the same side of pivot axis 336 as shown, or on opposite sides of pivot axis 336. Further, piston cylinder 330 may be positioned above lever arm 332 as shown such that extending piston cylinder 330 lowers the connected portion of lever arm 332, or below lever arm 332 such that retracting piston cylinder 330 lowers the connected portion of lever arm 332.

Blade 324 may be driven to rotate about blade axis 356 in any suitable fashion. In the illustrated example, drive shaft 364 is drivingly coupled to blade 324 for driving blade 324 to rotate. As shown, an indirect drive belt 368 may connect drive shaft 364 to blade axle 352. A motor 370 may rotate drive shaft 364 for rotating drive belt 368, which rotates blade axle 352 and blade 324. Drive belt 368 may be any suitable drive belt or chain, and may be connected to drive shaft 364 and blade axle 352 in any suitable fashion. As exemplified, drive belt 368 may be mounted to a first drive gear 372 on drive shaft 364, and to a second drive gear 376 on blade axle 352. In alternative embodiments, blade 324 may be directly driven by motor 370.

In one aspect, using a pivotally mounted lever arm 332 to connect piston cylinder 330 to blade 324 as shown may simplify the drive connection to blade 324. Lever arm 332 may provide a constant distance between drive shaft 364 and blade axle 352, for connection by a drive belt 368. Further, this configuration may permit a plurality of pneumatic devices 328 to share a common drive shaft 364 as shown. This may permit multiple blades 324 to be driven by a common motor 370. As illustrated, the lever arm 332 of each pneumatic device 328 may be pivoted independently of the other pneumatic device 328.

In the illustrated example, apparatus 100 includes two upper cutting subassemblies 236 which share a common drive shaft 364. Each upper cutting subassembly 236 as shown includes a blade 324 that is positionable independently of the blade 324 of the other upper cutting subassembly 236. In alternative embodiments, apparatus 100 may include just one upper cutting subassembly 236, or three or more upper cutting subassemblies 236. Further, any two or more upper cutting subassemblies 236 may share a common drive shaft 364 driven by a common motor 370, or different subassemblies 236 may be mounted to different drive shafts 364 driven by different motors 370. The former case may provide a simpler and more compact design, whereas the latter case may permit one subassembly 236 to be taken offline (e.g. for repair or replacement) without interrupting the operation of the other subassembly 236.

Upper cutting subassemblies 236 may be secured in place in any suitable manner. For example, mounting brackets 380 may join drive shaft 364 to a support element 382 of apparatus 100.

Figure 14:
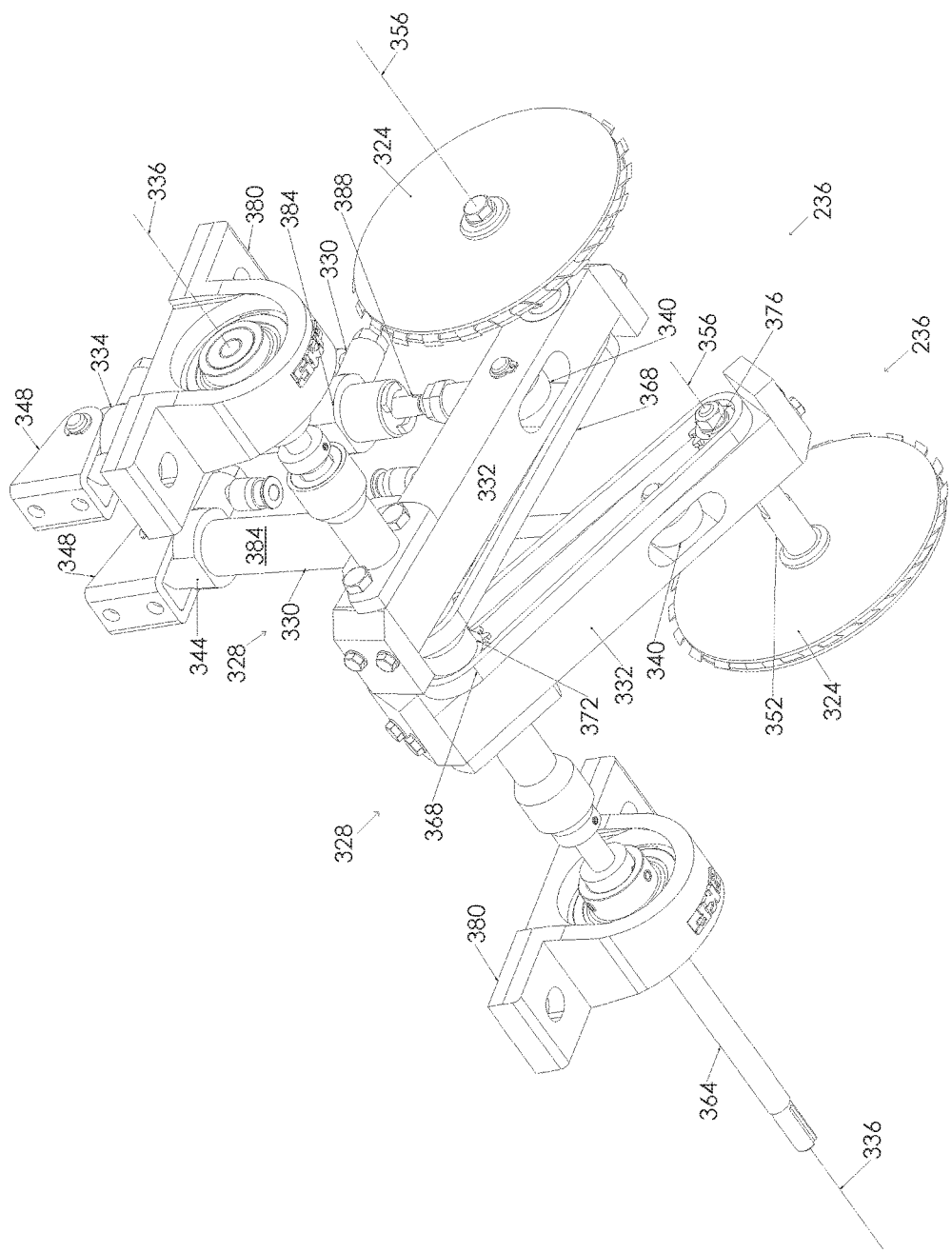
FIG. 14 is a perspective view of the two upper cutting subassemblies of FIG. 13, with a blade of one upper cutting subassembly in a storage position, and a blade of another upper cutting subassembly in an engaged position.
Figure 15:
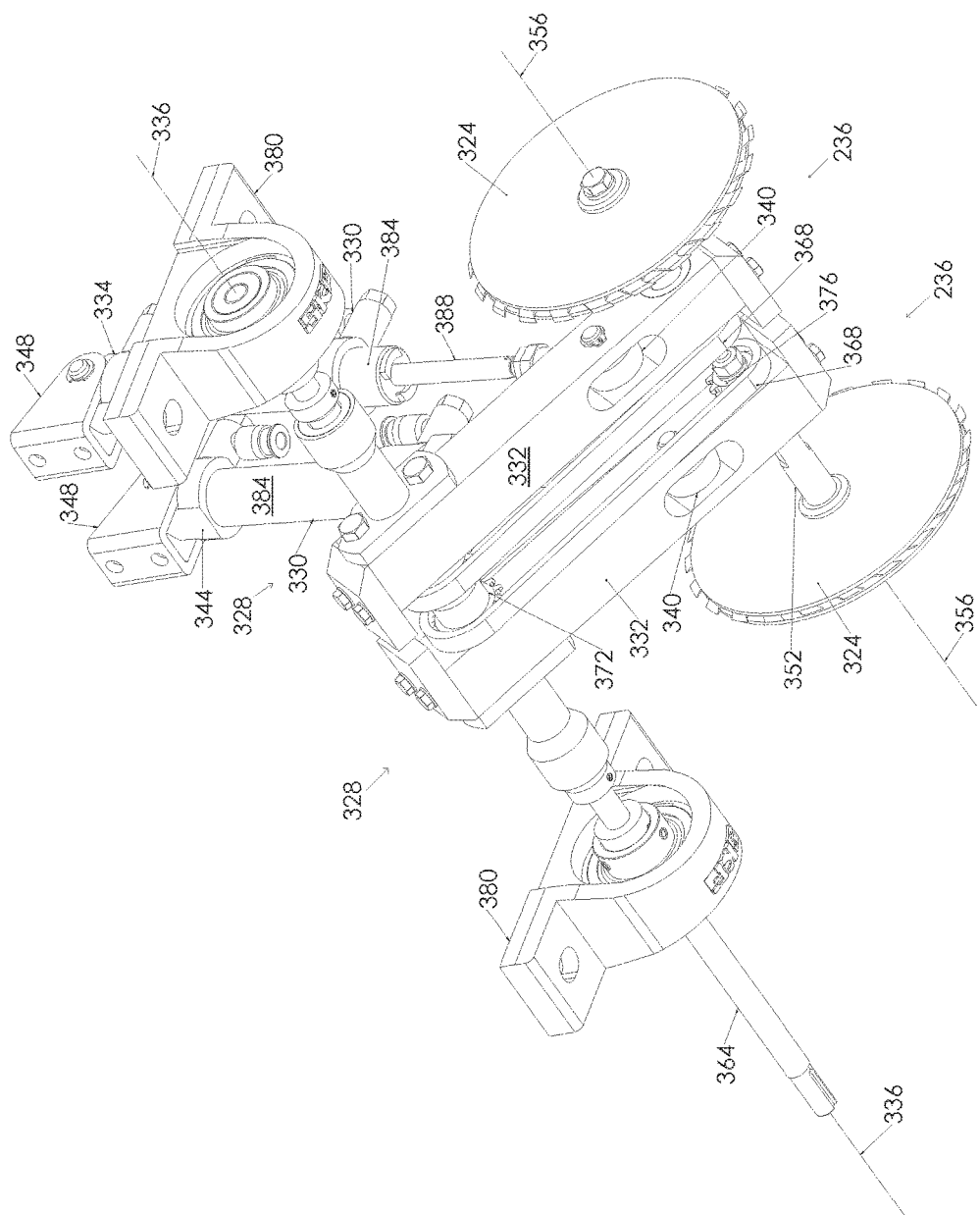
FIG. 15 is a perspective view of the two upper cutting subassemblies of FIG. 13, with the blade of each upper cutting subassembly in an engaged position.
Figure 16:
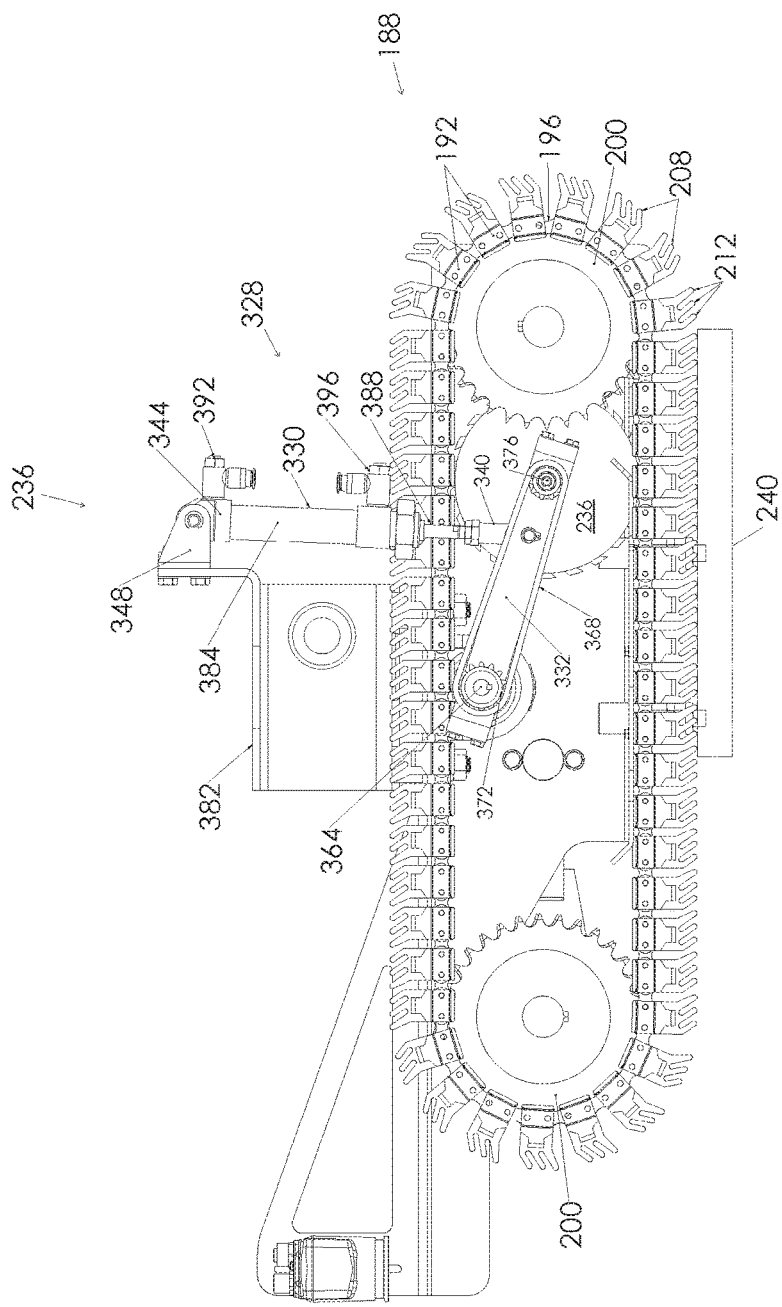
FIG. 16 is a cross-sectional view taken along line C-C in FIG. 13, with the blade of the upper cutting subassembly in a storage position.
Figure 17:
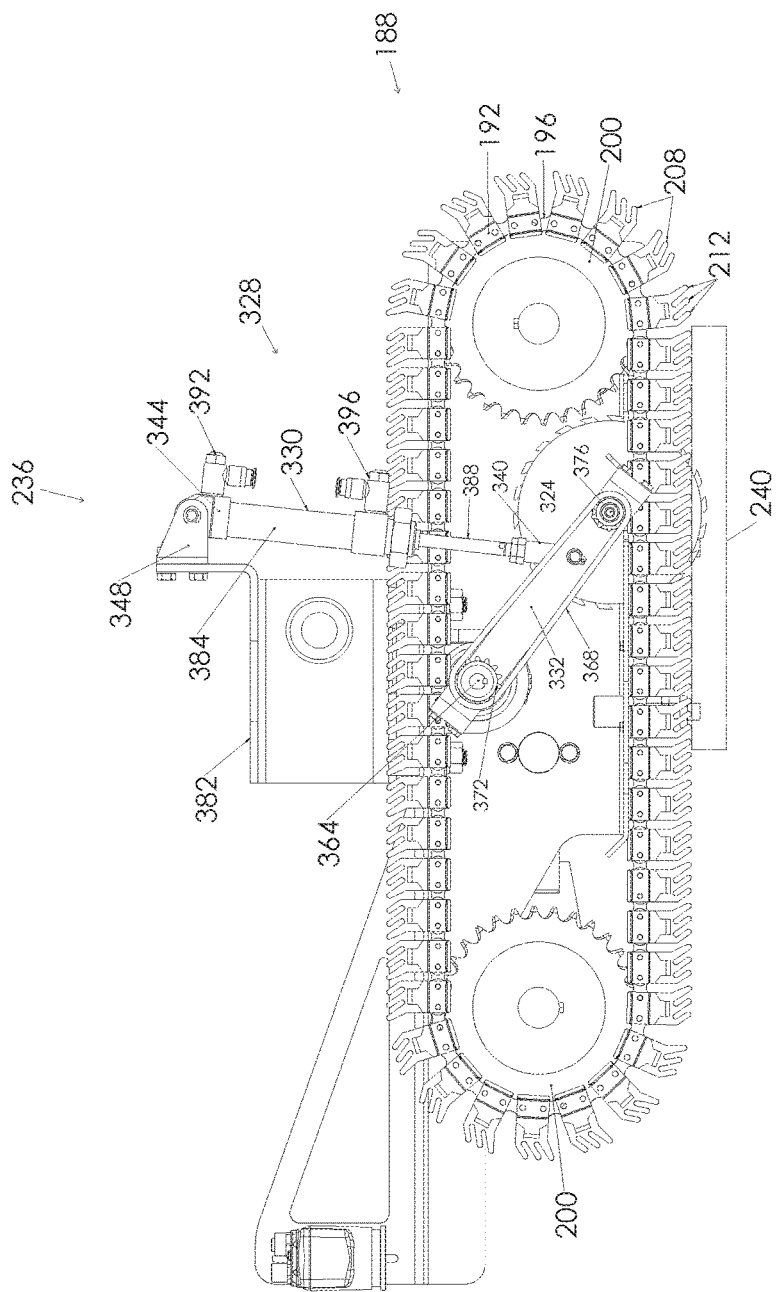
FIG. 17 is the cross-sectional view of FIG. 16, with the blade of the upper cutting subassembly in an engaged position.
Figure 18:
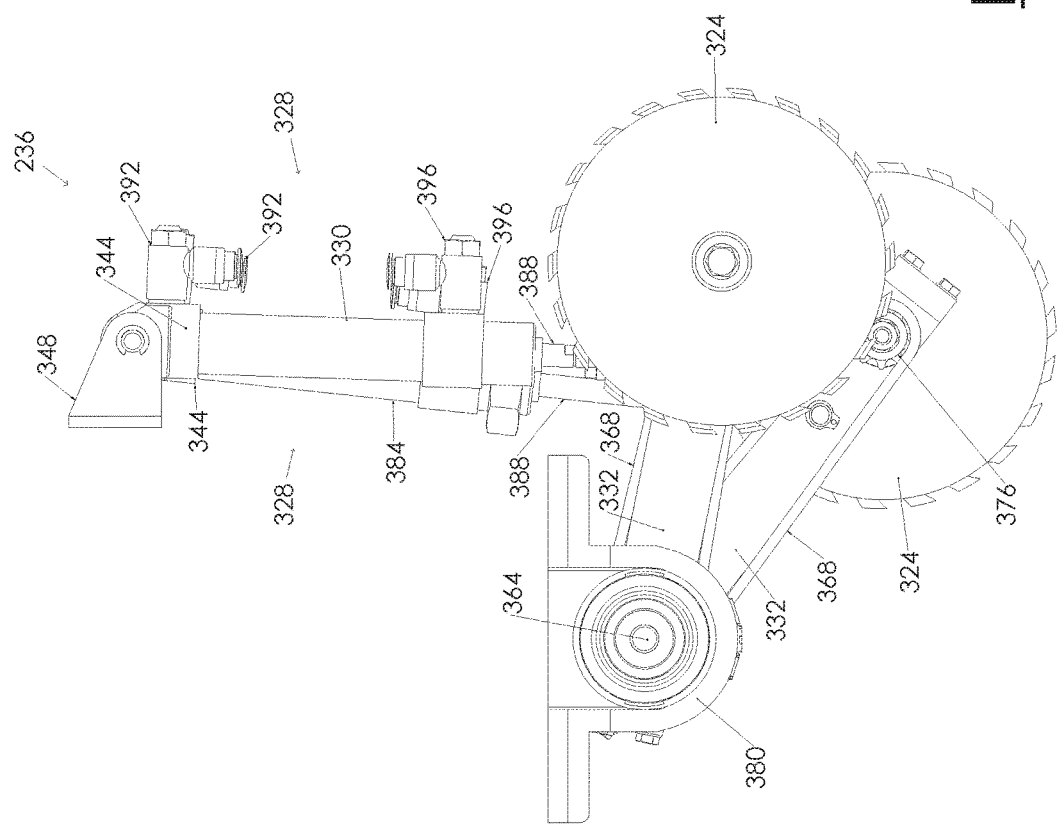
FIG. 18 is a side elevation view of the two upper cutting subassemblies of FIG. 14.
Figure 19:
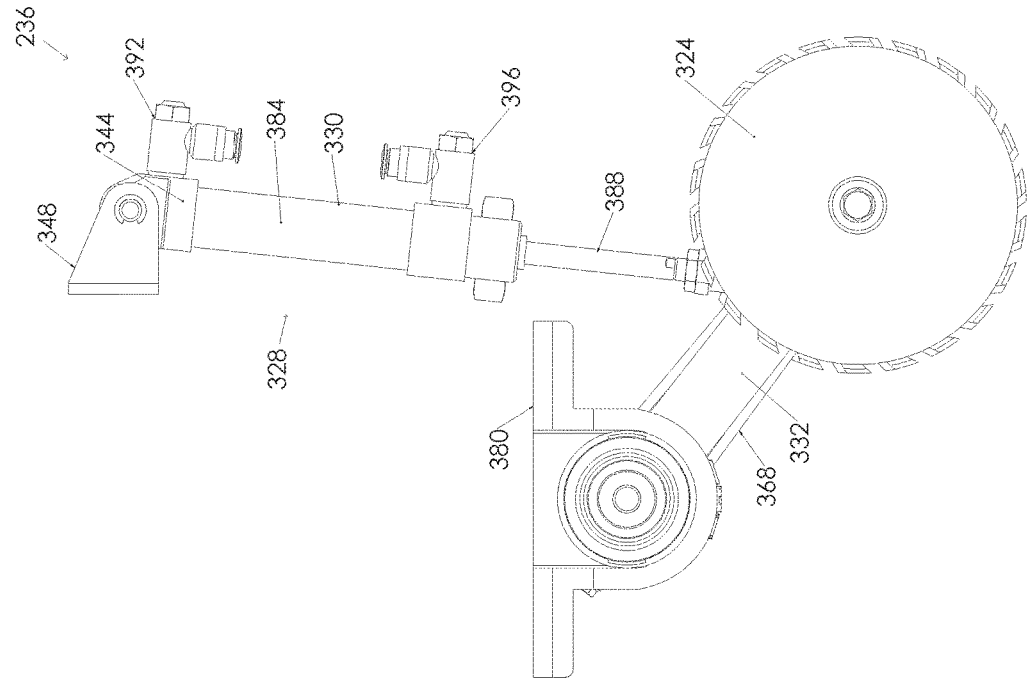
FIG. 19 is a side elevation view of the two upper cutting subassemblies of FIG. 15.

Piston cylinder 330 may be any suitable piston cylinder known in the art. In the illustrated example, piston cylinder 330 includes a cylinder 384 and a rod 388 which can be selectively extended and retracted from cylinder 384. Cylinder 384 is shown including first and second valves 392 and 396, which may be fluidly connected (e.g. by hoses, not shown) to a pressurized gas supply (e.g. a pump, not shown). In use, controller 116 (see FIG. 1) may selectively direct air from the pressurized gas supply into valve 392 to retract rod 388 into cylinder 384 (as shown in FIGS. 14, 16, and 18) or into valve 396 to extend rod 388 out of cylinder 384 (as shown in FIGS. 15, 17, and 19).

Controller 116 may control the movement of blade 324 between the engaged position and the storage position. Preferably, controller 116 controls the extension and retraction of piston cylinder 330 for moving blade 324 between the engaged and storage positions. In the illustrated example, retracting piston cylinder 330 (i.e. retracting rod 388 into cylinder 384) may move blade 324 through slot 220 (see FIG. 13) into the engaged position (i.e. into region 240) for cutting into the shell of a crustacean body part 124 supported on conveyor 104 in region 240 (see FIGS. 15, 17, and 19). Similarly, extending piston cylinder 330 (i.e. extending rod 388 out of cylinder 384) may withdraw blade 324 from region 240 into the storage position (see FIGS. 14, 16, and 18).

Cutting Depth

Figure 20:
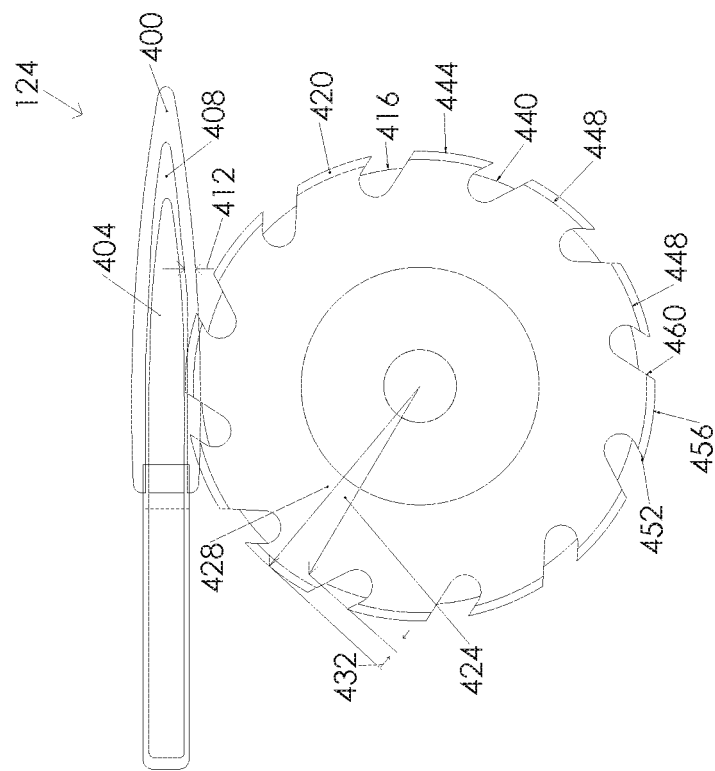
FIG. 20 is a side view of a crustacean body part in cross-section, and a cutting blade, in accordance with at least one embodiment.

Reference is now made to FIG. 20. A crustacean body part 124 may consist in relevant part a shell 400 surrounding meat 404 contained inside the shell 400. In some areas, the meat 404 may be bonded to the shell 400 by natural musculature adhesion, and in other areas there may be a gap 408 between the shell 400 and the meat 404.

In some embodiment, cutting assembly 108 may be configured to form one or more cuts through the shell 400 of a crustacean body part 124. Preferably, the cutting depth is greater than or equal to the shell thickness, and yet sufficiently shallow to avoid cutting too far into the meat 404 below the shell 400. This may require precise control over the cutting depth of blade 244 into the shell 400 of the crustacean body part 124.

The cutting depth of blade 244 may depend on a number of factors including shell properties and operating parameters. Shell properties may include shell hardness and shell thickness. Operating parameters may include conveyance speed, blade speed, and blade force. Preferably, one or more operating parameters of apparatus 100 is controlled by controller 116 to achieve a cutting depth of at least the thickness 412 of shell 400, so that blade 244 cuts clean through the shell 400 without cutting too far into the meat 404.

All else being equal, hard shells may be more difficult to cut through than soft shells. Similarly, thick shells may be more difficult to cut through than thin shells, all else being equal. Accordingly, shells with high hardness and/or high thickness may require one or more of a slower conveyance speed, a higher blade speed, or higher blade force to cut clean through the shell.

Shell hardness and thickness may vary across different crustacean species (e.g. crabs, or lobsters), different exoskeletal status (e.g. hard-shell, or soft-shell), different body parts (e.g. claws or knuckles), different seasons (e.g. winter or summer), different source locations (e.g. PEI or Maine), and different crustacean sizes (e.g. market, or canners). In some embodiments, apparatus 100 may accommodate a plurality of different shell thicknesses and hardnesses.

It will be appreciated that for a given shell thickness and hardness, there is small range of operational parameters (conveyance speed, blade speed, and blade force) that will cut clean through thickness 412 of the shell 400 without cutting too far into the meat 404. For example, for a given conveyance speed and blade speed, there exists a small range of blade forces that will provide a cutting depth of equal to or slightly greater than shell thickness 412. Any less, and the blade 244 or 324 will not cut clean through the shell 400. Any more, and the blade 244 or 324 may cut too far into the meat 404 which may compromise the integrity of the meat inside. A small margin for error may be provided where there is a gap 408 between the shell 400 and the meat 404. However, because crustaceans are organic creatures, there will always be some variance in the shell hardness, even among similar products (species, exoskeletal status, body part, season, source location, and crustacean size). Accordingly, it may be difficult to consistently cut clean through the shell 400 without cutting too far into the meat 404 for a given batch of crustacean body parts 124.

In some cases, it may be desirable to score the shell to a depth less than the thickness of the shell.

Blade Guards

Figure 21:
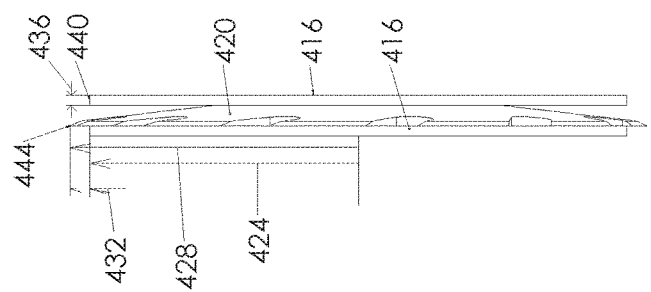
FIG. 21 is a front elevation view of the cutting blade of FIG. 20.
Figure 22:
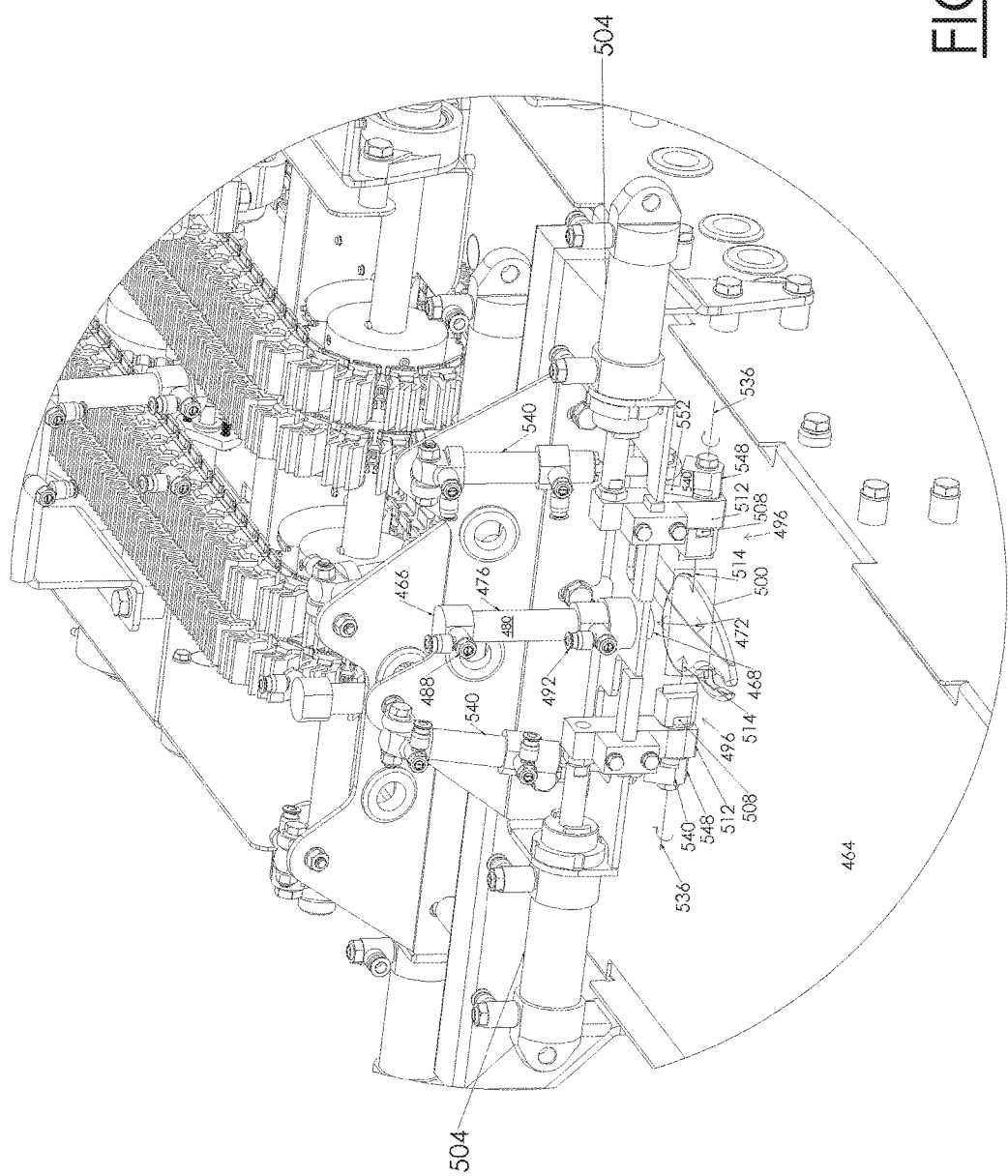
FIG. 22 is partial perspective view of the apparatus of FIG. 1, showing a cracking assembly with a clamp and piercing members in storage positions.

Reference is now made to FIGS. 20 and 21. In some embodiments, one or more blade guards 416 may be attached to a blade 420 of cutting assembly 108 (e.g. blade 244 of an upper cutting subassembly 236, or blade 324 of a lower cutting subassembly 236). The blade guard(s) 416 may increase the margin for error in the processing parameters (conveyance speed, blade speed, and blade force) that will cut clean through thickness 412 of the shell 400 without cutting too far into the meat 404. Blade guards 416 may provide an abutment surface which contacts shell 400 when blade 420 reaches a predetermined cutting depth to resist deeper penetration into the body part 124. This may mitigate the risk of shell 400 cutting too far into the meat 404, thus permitting cutting assembly 108 to accommodate some variance in shell hardness.

Blade guard 416 may take any suitable form. In the illustrated example, blade guard 416 is formed as a disk coaxially mounted to a lateral side of blade 420 for movement with blade 420. Blade guard 416 may rotate synchronously with blade 420, may rotate at a different speed than blade 420, or may not rotate at all. As exemplified, a radius 424 of blade guard 416 is less than a radius 428 of blade 420. The difference between radius 424 and 428 is the cutting depth 432. For scoring the shell, the cutting depth 432 may be as little as 0.1 mm. For cutting the body part right in half, the cutting depth 432 may be up to 50 mm or more. For cutting the shell, cutting depth 432 is preferably between 1 mm and 13 mm, and more preferably between 2 mm and 10 mm. Blade 420 may be urged against shell 400 of a crustacean body part 124 until cutting depth 432 is obtained whereby blade guard 416 may abut shell 400 to resist further penetration. In this regard, the cutting depth 432 may be maintained in spite of some excess in operational parameters (e.g. excess blade rotary speed or blade force). Thus, some variation in shell hardness may be accommodated by selecting operational parameters that can accommodate the hardest expected shell of a given batch of crustacean body parts 124, even though these parameters exceed that required for the softest expected shell.

As exemplified, blade guard 416 has a peripheral thickness 436. Thickness 436 may provide an abutment surface 440 spaced radially inboard of the peripheral edge 444 of blade 420 by cutting depth 432. Abutment surface 440 may contact shell 400 to resist shell penetration greater than cutting depth 432. It will be appreciated that the resistance that blade guard 416 can provide depends in part on the strength of the shell 400. Any excess blade force is supported by blade guard 416 on shell 400. Too much excess blade force will cause shell 400 to crack below blade guard 416. The magnitude of excess blade force that can be supported by blade guard 416 before shell 400 cracks may depend on the thickness 436 of abutment surface 440. However, because the surface profile of shell 400 is variable, a thick blade assembly (e.g. blade 420 in combination with blade guard 416) may produce inconsistent cutting depths. Accordingly, it is preferable to use the thickest possible blade guard(s) 416 that can produce consistent cutting depths for a given batch of crustacean body parts 124.

In the illustrated example, two blade guards 416 are coupled to blade 420. Preferably, each blade guard 416 has a thickness 412 of between 1 mm and 10 mm, and more preferably between 3 mm and 6 mm. In other embodiments, only one blade guard 416 may be coupled to blade 420. In still other embodiments, there may be no blade guards coupled to blade 420.

Preferably, blade guard 416 is removably mounted beside blade 420. This may permit blade guards of different radial dimensions to be selectively mounted beside blade 420 for cutting to a particular cutting depth. The blade assembly (i.e. blade 420 and one or more blade guards 416) may thus be customized for a particular batch of crustacean body parts 124, which share a common shell thickness.

Multiple Cutting Subassemblies

Figure 36:
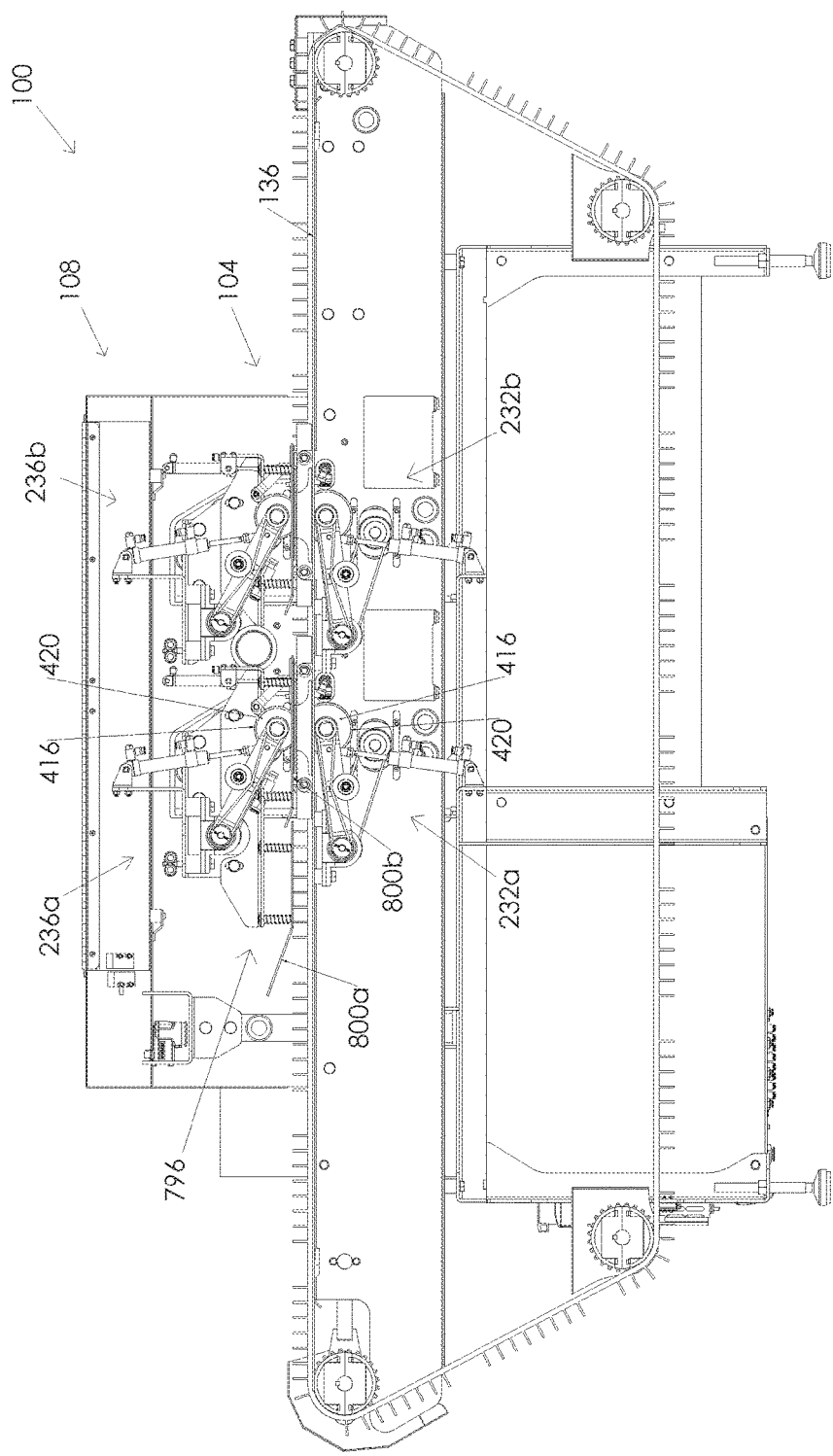
FIG. 36 is a side elevation view of the crustacean processing apparatus of FIG. 35 with blades in an engage position.

Reference is now made to FIGS. 35 and 36. In some embodiments, cutting assembly 108 may include a plurality of lower cutting subassemblies 232, a plurality of upper cutting subassemblies 236, or both. In the illustrated embodiment, cutting assembly 108 includes a pair of upstream lower and upper cutting subassemblies 232a and 236a, and a pair of downstream lower and upper cutting subassemblies 232b and 236b. This may permit a crustacean body part to be cut with multiple passes. For example, a crustacean body part may be cut first by the upstream cutting subassemblies 232a and 236a, and second by the downstream subassemblies 232b and 236b.

It will be appreciated that the blades 420 and associated blade guards 416 of the upstream cutting subassemblies 232a and 236a may be the same or different (i.e. same or different diameter) from the blades 420 and associated blade guards 416 of the downstream cutting subassemblies 232b and 236b. For example, a crustacean body part may be a limb including a claw connected to a knuckle. The blades 420 of the upstream cutting subassemblies 232a and 236a may have blade guards 416 that define a first cutting depth that is greater than a second cutting depth of downstream blades 420 defined by the blade guards 416 of the downstream cutting subassemblies 232b and 236b (or vice versa). This may permit the upstream cutting subassemblies 232a and 236a to cut to a different depth than the downstream cutting subassemblies 232b and 236b (e.g. more or less deeply).

For example, the upstream cutting subassemblies 232a and 236a may have a greater cutting depth and apply low cutting pressure to the claw of the body part (e.g. to cut only the elastic holding the claw shut and not through the shell), and apply high cutting pressure to the knuckle to cut deep through the knuckle shell. Next, the downstream cutting subassemblies 232b and 236b may make a shallow cut through the claw shell, and retract to avoid cutting the knuckle shell (which was already cut by the upstream cutting subassemblies 232a and 236a).

In some embodiments, the upstream cutting subassemblies 232a and 236a, and the downstream cutting subassemblies 232b and 236b may be configured to cut different crustacean body parts and/or crustacean body parts of different sizes. For example, the upstream cutting subassemblies 232a and 236a may be activated only to cut crustacean body parts of a first type (e.g. claws) or size (e.g. by weight and/or dimensional measurement), and the downstream cutting subassemblies 232b and 236b may be activated only to cut crustacean body parts of a second type (e.g. knuckles) or size. This may permit apparatus 100 to process a batch of crustacean body parts that includes a mixture of different body part types or sizes, where the different body part types or sizes have different shell densities and/or thickness.

For example, the upstream cutting subassemblies 232a and 236a may be configured with blades 420 and blade guards 416 that define cutting depths suitable for the first body part type or size, and the downstream subassemblies 232b and 236b may be configured with blades 420 and blade guards 416 that define different cutting depths suitable for the second body part types or sizes. Alternatively, or in addition, the upstream and downstream cutting subassemblies 232 and 236 may be configured to operate with different operational parameters (e.g. cutting speed, cutting force, etc.) suitable for the respective types and/or sizes of crustacean body parts cut by those particular cutting subassemblies.

Blade Geometry

Reference is now made to FIG. 20. In some embodiments, cutting assembly 108 may include one or more circular rotary blades 420 (e.g. blade 244 of lower cutting subassembly 232, or blade 324 of upper cutting subassembly 232) having a plurality of teeth 448. Preferably, teeth 448 of such blade(s) 420 are shaped to mitigate the embedding of shell shards into meat 404 of the crustacean body part 124 during cutting.

As exemplified, blade 420 may include a plurality of teeth 448, each tooth 448 extending from a leading edge 452 across an arcuate outer edge 456 to a trailing edge 460. In use, leading edge 452 may make first contact with shell 400 as crustacean body part 124 is carried in a downstream direction 128. As illustrated, leading edge 452 preferably forms an acute angle with outer edge 456 to face away from body part 124 during cutting. Preferably, the angle between leading edge 452 and outer edge 456 is between 30 degrees and 60 degrees, and more preferably between 40 degrees and 50 degrees. This may permit leading edge 452 to drive shards of shell 400 away from body part 124 and meat 404 during cutting. In turn, this may help mitigate against embedding shell shards and other debris into meat 404.

Blade 420 may have any suitable number of teeth 448. In the illustrated example, blade 420 includes 12 teeth 448. In alternative embodiments, blade 420 may include between 5 and 50 teeth.

Blade 420 may have a small edge thickness to minimize meat damage if the blade 420 cuts into the meat. Preferably, blade 420 has an edge thickness of less than 0.125 inches, more preferably less than 0.050 inches, and most preferably less than 0.035 inches.

Cracking Assembly

Reference is now made to FIGS. 22-25. In some embodiments, apparatus 100 may include a shell cracking assembly 112. Shell cracking assembly 112 may be positioned downstream of cutting assembly 108 as shown (see FIG. 1), or upstream of cutting assembly 108. Cracking assembly 112 may be operable to form a lateral crack in a shell, which circumscribes at least a portion of the body part 124. This may be especially preferred for crustacean claws, the meat inside which may be easily accessed after forming a circumscribing crack in the shell.

Cracking assembly 112 may include a retaining member for securing the crustacean body part 124 in position during processing, and one or more piercing members for creating and propagating cracks in the shell of the body part 124.

The crustacean body part 124 is preferable secured in position during cracking. Cracking assembly 112 may include any suitable retaining member. Preferably, the retaining member is controllable for selectively securing the body part 124 during processing and afterwards releasing the body part 124. In the illustrated example, cracking assembly 112 includes a clamp 466 for clamping body part 124 against a base 464. Base 464 may be any surface for supporting body part 124. For example, base 464 may be a stationary table, or may be lower conveyor 136.

Figure 23:
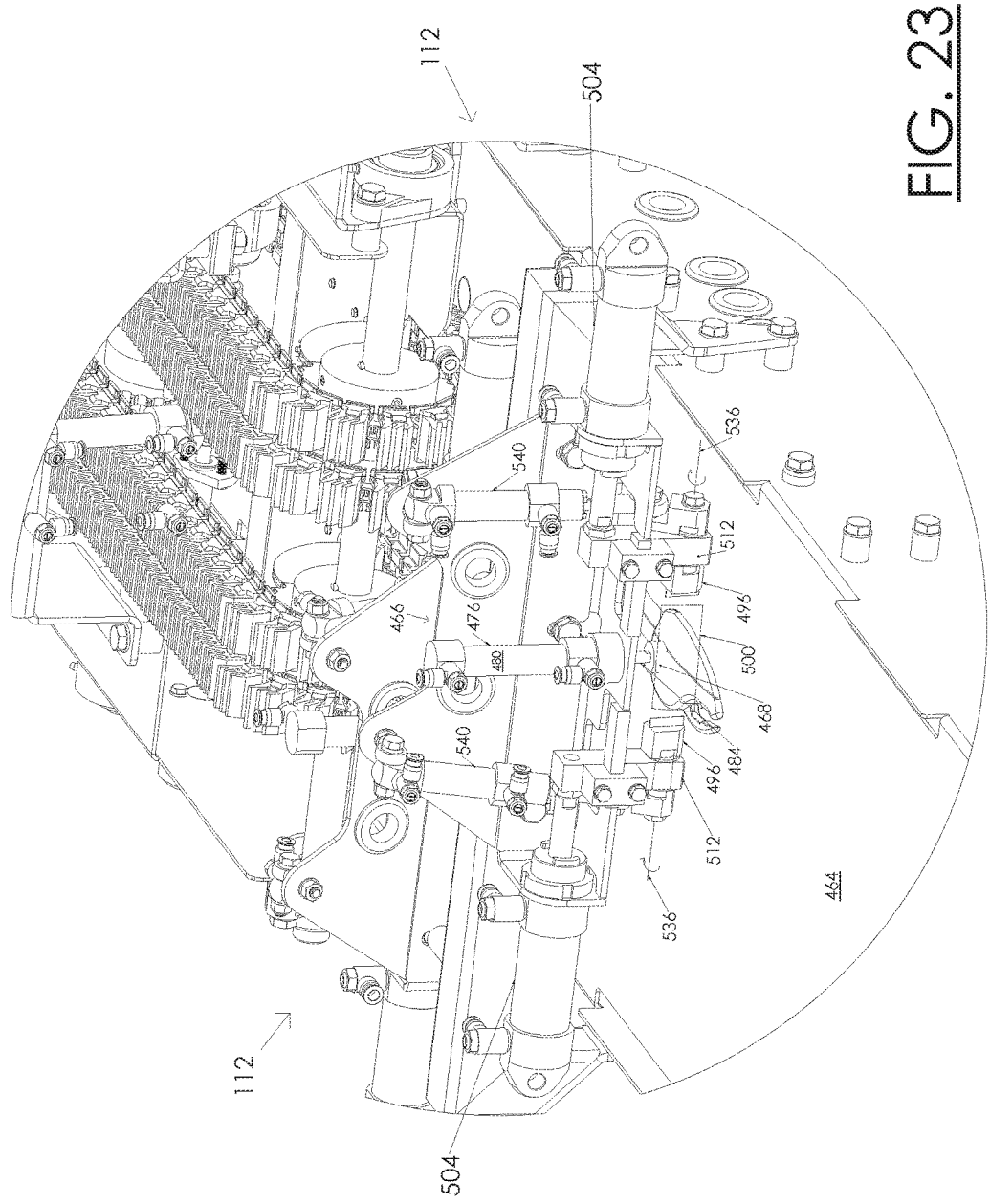
FIG. 23 is the partial perspective view of FIG. 22, with the clamp in an engaged position, and the piercing members in storage positions.
Figure 24:
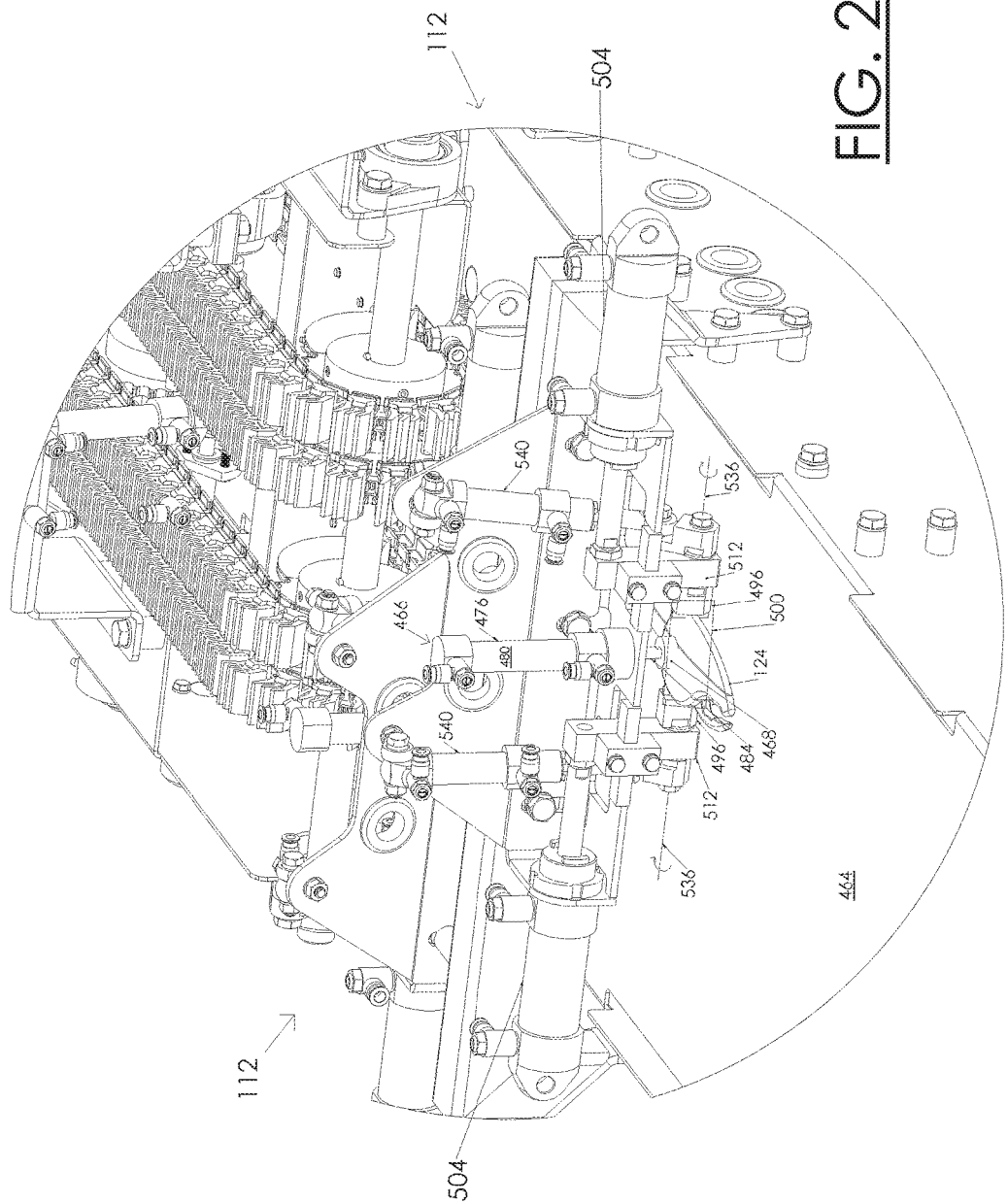
FIG. 24 is the partial perspective view of FIG. 22, with the clamp and piercing members in engaged positions.
Figure 25:
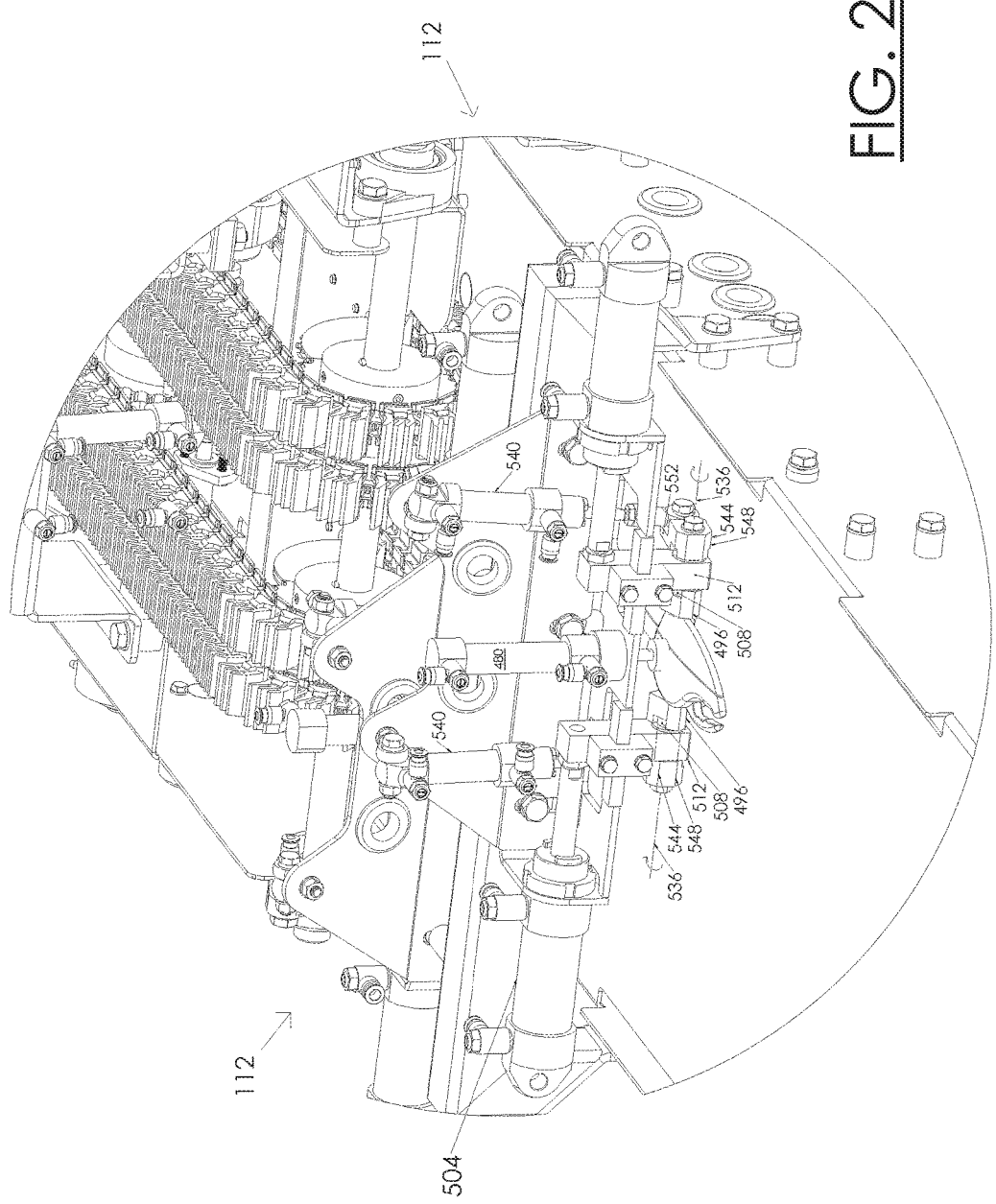
FIG. 25 is the partial perspective view of FIG. 22, with the clamp and piercing members in engaged positions, and the piercing members rotated.

As exemplified, clamp 466 includes a ram head 468 movable between a storage position (FIG. 22), and an engaged position (FIGS. 23-25). In the storage position, ram head 468 is vertically spaced apart from base 464 by a distance 472 providing clearance for a body part 124 to be moved in between ram head 468 and base 464. In the engaged position, ram head 468 bears down on the body part 124 clamping the body part 124 between the ram head 468 and the base 464.

Ram head 468 may be movable between the storage position and the engaged position by any suitable device. For example, ram head 468 may be drivingly coupled to a motor or piston cylinder controllable by controller 116. In the illustrated embodiment, ram head 468 is directly connected to a piston cylinder 476. Piston cylinder 476 may be a pneumatic or hydraulic cylinder. As exemplified, piston cylinder 476 includes a cylinder 480 and a piston rod 484. Ram head 468 may be connected to a distal end of piston rod 484. As shown, cylinder 480 may include first and second valves 488 and 492. Valves 488 and 492 may each be connected to a fluid source (not shown, e.g. hydraulic oil tank, or pneumatic pump). Controller 116 may selectively direct fluid from the fluid source to one of valves 488 or 492 for extending and retracting piston cylinder 480 between the storage and engaged positions. Ram head 468 may be rigid or resiliently deformable.

Cracking assembly 112 may include one or more piercing members 496 for piercing the shell 400 of body part 124 to form an inceptive (i.e. initial) crack in the shell 400, and then rotated to widen the crack causing the crack to propagate about the circumference of the shell 400.

In the illustrated example, cracking assembly 112 includes two piercing members 496, one to pierce each lateral side of the shell 400. In alternative embodiments, cracking assembly 112 may include just one piercing member 496 for piercing any side of shell 400, or three or more (e.g. 4, 5, or 6) piercing members 496 for piercing a plurality of different sides of the shell 400.

Base 466 may include a region 500 for supporting a crustacean body part 124. Region 500 is a volume of space, which can be occupied by a crustacean body part 124 supported on base 466, where the crustacean body part 124 can be cracked by cracking assembly 112.

Piercing member 496 may be movable between a storage position in which piercing member 496 is withdrawn (i.e. spaced apart) from region 500 (FIGS. 22 and 23), and an engaged position in which piercing member 496 is moved into region 500 for piercing the shell 400 of the crustacean body part 124. In the illustrated example, cracking assembly 112 includes two laterally opposed piercing members 496. Piercing members 496 may be movable from the storage position toward each other to the engaged position, and from the engaged position away from each other to the storage position.

Piercing members 496 may be movable between the storage position and the engaged position by any suitable device. For example, each piercing member may be drivingly coupled to a motor or piston cylinder controllable by controller 116. In the illustrated embodiment, piercing member 496 may be indirectly connected to a piston cylinder 504. Piston cylinder 504 may be a pneumatic or hydraulic cylinder of any suitable type. As shown, piercing member 496 may be supported on a rotary shaft 508 which extends through a drive block 512. Piston cylinder 504 may be connected to drive block 512 for moving drive block 512 with rotary shaft 508 and piercing member 496 in direction 514 toward region 500. Piston cylinder 504 is preferably controllable by controller 116 for moving piercing member 496 between the storage and engaged positions.

Figure 25A:
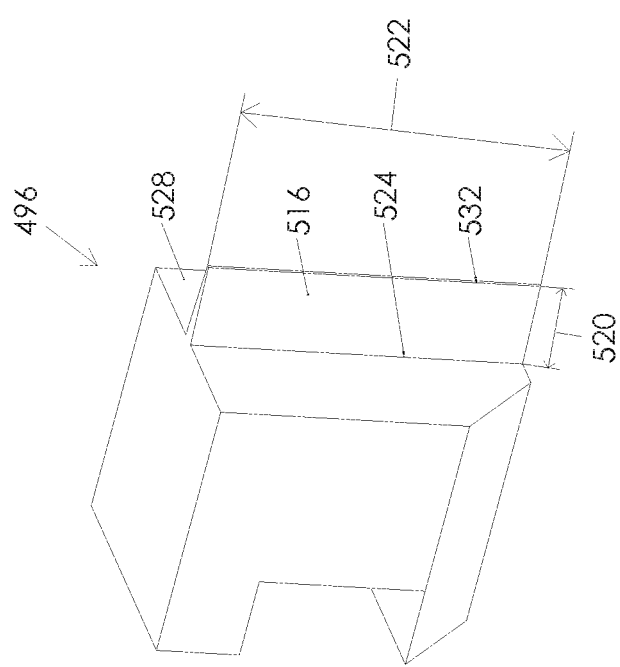
FIG. 25A is a perspective view of a piercing member, in accordance with at least one embodiment.

Referring to FIG. 25A, each piercing member 496 may include a piercing edge 516 for penetrating the shell 400 of body part 124 in the engaged position. Piercing edge 516 may have any suitable shape and size. As illustrated, piercing edge 516 may be a substantially linear edge having a depth 520 and a length 522. Depth 520 is preferably at least the thickness of the shell 400 where piercing edge 516 will penetrate shell 400. This may permit piercing edge 516 to penetrate the full thickness of the shell 400. Preferably, depth 520 is between 5 mm and 50 mm, and more preferably between 5 mm and 26 mm. Length 522 is preferably between 12 mm and 100 mm, and more preferably between 12 mm and 70 mm. Piercing edge 516, or piercing member 496 may be removable for replacement with a different piercing edge 516 or piercing member 496 having a different depth 520 and/or length 522 better suited for a particular crustacean body part 124.

In some embodiments, piercing edge 516 may be sharpened. This may help piercing edge 516 to cleanly pierce through shell 400. In alternative embodiments, piercing edge 516 may be dull. This may help prevent piercing edge 516 from cutting into the meat below the shell 400. For example, a dull edge 516 may be able to contact the meat below shell 400 without cutting into the meat.

As shown, piercing edge 516 may extend in depth from a proximal end 524 connected to a support surface 528 of piercing member 496, to a distal end 532 which makes first contact with shell 400. In the illustrated example, piercing edge 516 has a thin cross-sectional profile between proximal end 524 and distal end 532. In alternative embodiments, piercing edge 516 may have a wedge shaped cross-sectional profile that is wider at proximal end 524 and transition to a narrow distal end 532. This may permit piercing edge 516 to spread the crack formed by piercing edge 516 as piercing edge 516 is driven through shell 400.

Referring again to FIGS. 22-25, piercing member 496 is preferably configured to propagate the inceptive crack formed from penetrating shell 400 with piercing member 496. In some embodiments, piercing member 496 may be rotatable from the engaged position after piercing shell 400 to widen the inceptive crack formed from the penetration. This may cause the crack to propagate about the circumference of the shell 400.

Piercing member 496 may be rotatable in any suitable manner. In the illustrated example, piercing member 496 is rotatable on a rotary shaft 508 about a twist axis 536 parallel to rotary shaft 508. Axis 536 may be substantially parallel to direction 514. In alternative embodiments, twist axis 536 may extend at a (non-zero) angle to parallel with direction 514.

Piercing member 496 may be rotated by any suitable device. For example, piercing member 496 may be drivingly coupled to a motor or piston cylinder controllable by controller 116 for rotating piercing member 496 about twist axis 536. As exemplified, piercing member 496 may be indirectly coupled to a piston cylinder 540 by a lever 544. Piston cylinder 540 may be a hydraulic or pneumatic piston cylinder. Rotary shaft 508 may be connected to a first end 548 of lever 544 for rotation therewith, and piston cylinder 540 may be rotationally coupled to a second end 552 of lever 544. In use, piston cylinder 540 may extend or retract to move second end 552 of lever 544 about first end 548, thereby rotating rotary shaft 508 and piercing member 496. This is illustrated by example in FIGS. 24 and 25.

FIGS. 22-25 illustrates steps of an exemplary method of cracking the shell 400 of a crustacean body part 124 with cracking assembly 112 in accordance with at least one embodiment. Beginning with FIG. 22, a crustacean body part 124 may be moved into region 500 of base 464 between clamp 466 and piercing members 496. At this point, clamp 466 and piercing members 496 may be in their storage positions.

Turning to FIG. 23, controller 116 may direct clamp 466 to move to the engaged position to secure crustacean body part 124 in position. For example, controller 116 may direct piston cylinder 476 to extend ram head 468 on to crustacean body part 124, thereby clamping crustacean body part 124 between ram head 468 and base 464.

As shown in FIG. 24, controller 116 may direct piercing member 496 to move to the engaged position to pierce the shell 400 of crustacean body part 124. For example, controller 116 may direct piston cylinders 504 to move piercing members 496 to move toward each other into region 500 from opposite lateral sides, and pierce opposite lateral sides of shell 400 of crustacean body part 124 to each form an inceptive crack in shell 400.

Next, in FIG. 25, controller 116 may direct piercing members 496 to rotate to widen the inceptive cracks formed from piercing the shell 400, to propagate the cracks laterally about the circumference of the shell 400. For example, controller 116 may direct piston cylinders 540 to extend to rotate piercing members 496 about twist axis 536.

Finally, clamp 466 and piercing members 496 may be withdrawn from region 500 to their storage positions, releasing the crustacean body part 124. For example, controller 116 may direct piston cylinders 476, 504, and 536 to retract.

Sensor

Reference is now made to FIGS. 1 and 2. In some embodiments, apparatus 100 may include one or more sensors (collectively "a sensor") for detecting a size of a crustacean body part 124 supported on conveyor 104. Each crustacean body part 124 carried by conveyor 104 may be measured by the sensor before passing through cutting and/or cracking assemblies 108 and 112, and the operational parameters of the cutting and/or cracking assemblies may be adjusted for each crustacean body part based at least in part on the sensor readings.

In some cases, the shell hardness and thickness of a crustacean body part 124 may vary according to size. Preferably, controller 116 is communicatively coupled to the sensor for processing the size information, and configured to direct cutting assembly 104 to operate according to one or more operational parameters (e.g. conveyor speed, blade speed, and blade force), and/or to direct cracking assembly 108 to operate according to one or more operational parameters (e.g. piercing member force) for that crustacean body part 124 based on the size information.

In the illustrated example, apparatus 100 includes a sensor 556 for measuring the size of crustacean body parts 124 carried on conveyor 104. Sensor 556 may be any suitable sensor positioned and directed according to the sensor specifications. As used herein and in the claims, the term "sensor" means one or more sensors for measuring the size of a crustacean body part. One suitable sensor may be a Cognex™ Checker Vision Sensor. Sensor 556 may measure any one or more dimensions of a crustacean body part 124, such as width, length, and height.

As exemplified, sensor 556 may be mounted on apparatus 100 facing downwardly toward conveyor 104 from above. In the illustrated example, sensor 556 is centrally aligned with lower conveyor 136. It will be appreciated that in alternative embodiments, sensor 556 may be differently mounted and positioned according to the sensor specifications. For example, sensor 556 may be instead positioned at a lateral side of conveyor 104 facing laterally across upper surface 156. Preferably, sensor 556 is positioned upstream of cutting and/or cracking assemblies 108 and 112 for providing measurement information to controller 116 in advance of processing the crustacean body part 124 at cutting and/or cracking assemblies 108 and 112. In some embodiments, apparatus 100 does not include any sensors 556.

Controller

Figure 26:
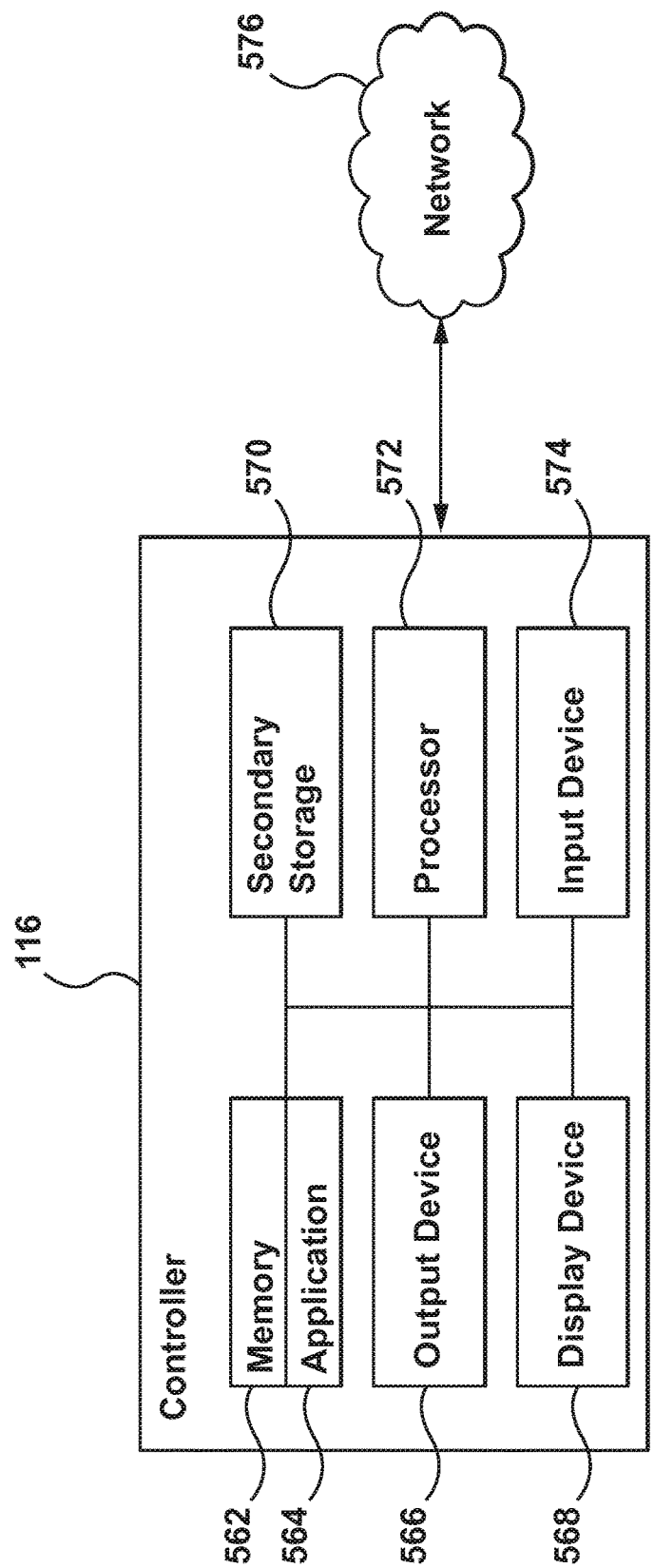
FIG. 26 is a schematic illustration of a controller, in accordance with at least one embodiment.

FIG. 26 shows an example schematic of a controller 116. Generally, controller 116 can be a server computer, desktop computer, notebook computer, tablet, PDA, smartphone, or another computing device. In at least one embodiment, controller 116 includes a connection with a network 576 such as a wired or wireless connection to the Internet or to a private network. In some cases, network 576 includes other types of computer or telecommunication networks.

In the example shown, controller 116 may include a memory 562, an application 564, an output device 566, a display device 568, a secondary storage device 570, a processor 572, and an input device 574. In some embodiments, controller 116 includes multiple of any one or more of memory 562, application 564, output device 566, display device 568, secondary storage device 570, processor 572, and input device 574. In some embodiments, controller 116 lacks one or more of applications 564, second storage devices 570, network connections, input devices 574, output devices 566, and display devices 568.

Memory 562 can include random access memory (RAM) or similar types of memory. Also, in some embodiments, memory 562 stores one or more applications 564 for execution by processor 572. Applications 564 correspond with software modules including computer executable instructions to perform processing for the functions and methods described herein for directing the operation of apparatus 100, and more particularly directing the operation of cutting assembly 108 and/or cracking assembly 112. Secondary storage device 570 can include a hard disk drive, floppy disk drive, CD drive, DVD drive, Blu-ray drive, solid state drive, flash memory or other types of non-volatile data storage.

In some embodiments, controller 116 stores information in a remote storage device, such as cloud storage, accessible across a network, such as network 576 or another network. In some embodiments, controller 116 stores information distributed across multiple storage devices, such as memory 562 and secondary storage device 570 (i.e. each of the multiple storage devices stores a portion of the information and collectively the multiple storage devices store all of the information). Accordingly, storing or retrieving data on a storage device as used herein and in the claims, means storing or retrieving that data in a local storage device, storing or retrieving that data in a remote storage device, or storing or retrieving that data distributed across multiple storage devices, each of which can be local or remote.

Generally, processor 572 can execute applications, computer readable instructions or programs. The applications, computer readable instructions or programs can be stored in memory 562 or in secondary storage 570, or can be received from remote storage accessible through network 576, for example. When executed, the applications, computer readable instructions or programs can configure the processor 572 (or multiple processors 572, collectively) to perform the acts described herein with reference to directing the operation of apparatus 100, for example.

Input device 574 can include any device for entering information into controller 116. For example, input device 574 can be a keyboard, key pad, cursor-control device, touch-screen, camera, or microphone. Input device 574 can also include input ports and wireless radios (e.g. Bluetooth®, or 802.11x) for making wired and wireless connections to external devices, such as sensors 556, cutting assembly 108, cracking assembly 112, motors, fluid sources, and/or valves, for example.

Display device 568 can include any type of device for presenting visual information. For example, display device 568 can be a computer monitor, a flat-screen display, a projector or a display panel.

Output device 566 can include any type of device for presenting a hard copy of information, such as a printer for example. Output device 566 can also include other types of output devices such as speakers, for example. In at least one embodiment, output device 566 includes one or more of output ports and wireless radios (e.g. Bluetooth®, or 802.11x) for making wired and wireless connections to external devices, such as sensors 556, cutting assembly 108, cracking assembly 112, motors, fluid sources, and/or valves, for example. In some embodiments, input device 574 also combines the functionality of an output device 566.

FIG. 26 illustrates one example hardware schematic of a controller 116. In alternative embodiments, controller 116 contains fewer, additional or different components. In addition, although aspects of an implementation of controller 116 are described as being stored in memory, one skilled in the art will appreciate that these aspects can also be stored on or read from other types of computer program products or computer-readable media, such as secondary storage devices, including hard disks, floppy disks, CDs, or DVDs; or other forms of RAM or ROM.

Figure 27:
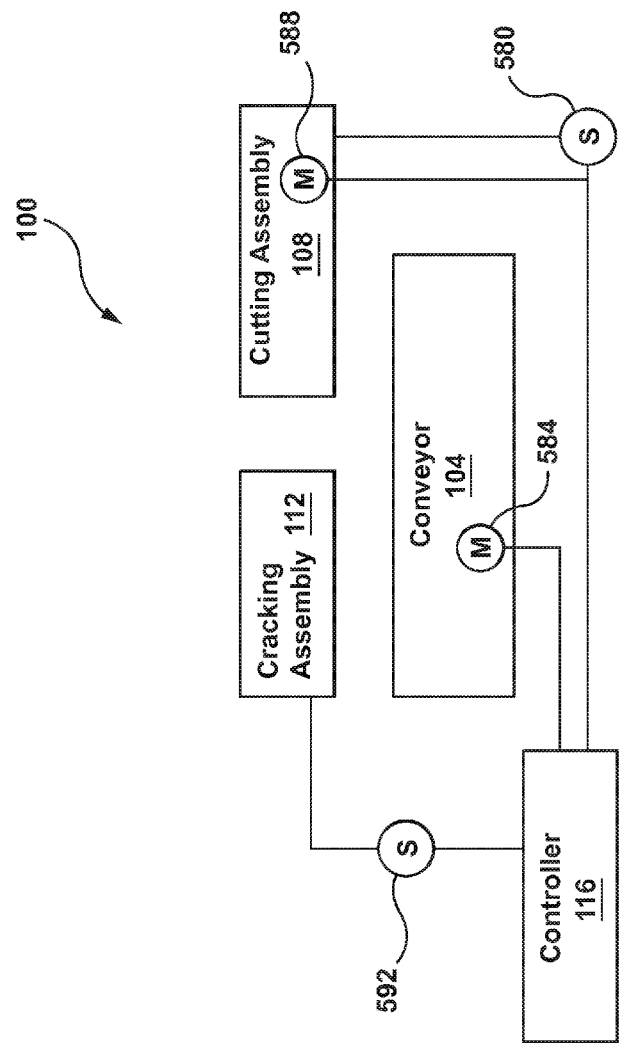
FIG. 27 is a schematic illustration of the apparatus of FIG. 1, in accordance with at least one embodiment.

Reference is now made to FIGS. 1, 26 and 27. FIG. 27 shows a schematic diagram of apparatus 100, in accordance with at least one embodiment. As illustrated, controller 116 may be communicatively coupled to one or more of conveyor 104, cutting assembly 108, and cracking assembly 112 for directing the operation of the same. For example, output device 566 of controller 116 may be connected to one or more motors 584 of conveyor 104 (e.g. motor 148 of lower conveyor 136, and/or motor 204 of upper conveyor 188) wirelessly or by wire for controlling the conveyance speed of conveyor 104 according to application(s) 564.

Alternatively, or in addition, controller 116 may be communicatively coupled to a fluid source 580 for directing the actuation of cutting assembly 108. For example, an output device 566 of controller 116 may be communicatively connected to one or more valves, or pumps by wire or wirelessly for controlling one or more of the volume and pressure of fluid directed to piston cylinders in cutting assembly 108. This may permit controller 116 to control actuation timing and blade force of cutting assembly 108. In some embodiments, controller 116 may be communicatively coupled to one or more motors 588 of cutting assembly 108 for controlling the timing and speed of the motors 588. This may permit controller 116 to control actuating timing and rotary blade speed of cutting assembly 108.

Alternatively, or in addition, controller 116 may be communicatively coupled to a fluid source 592 (which may be the same as fluid source 580 or a different fluid source) for directing the actuation of cracking assembly 112. For example, an output device 566 of controller 116 may be communicatively connected to one or more valves, or pumps by wire or wirelessly for controlling one or more of the volume and pressure of fluid directed to piston cylinders in cracking assembly 112. This may permit controller 116 to control actuation timing, clamping force, and piercing force of cracking assembly 112.

Figure 28:
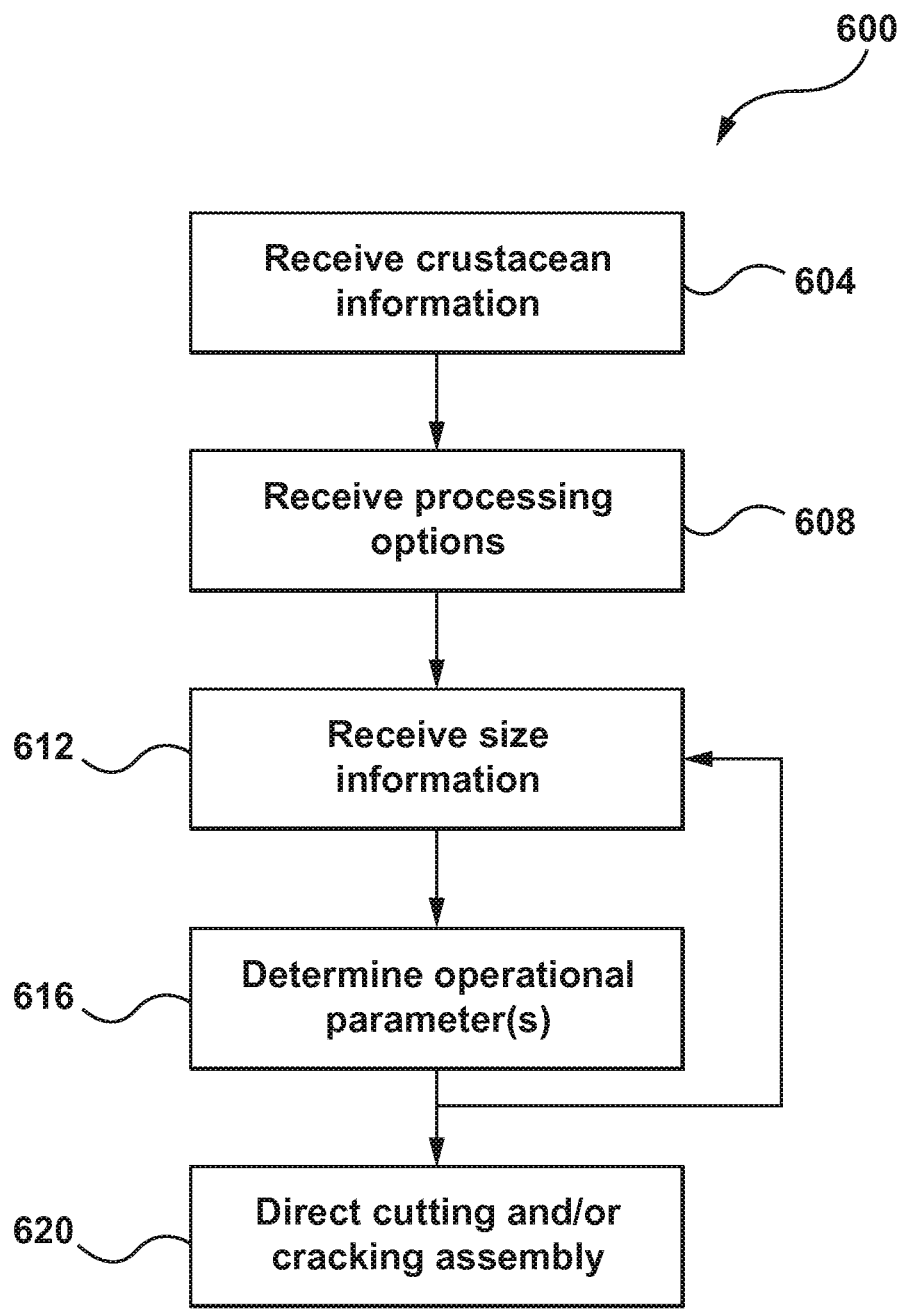
FIG. 28 is a flowchart illustrating a method of processing a crustacean body part.

Reference is now made to FIG. 28, which shows an exemplary method of processing a crustacean body part in accordance with at least one embodiment. At 604, controller 116 may receive or access crustacean information. The crustacean information preferably identifies characteristics or properties of the crustacean body parts to be processed. For example, crustacean information may include one or more of species, exoskeletal status (hard-shell, or soft-shell), body part, season, source location, and crustacean size. The crustacean information may be entered or selected with an input device 574 of controller 116. Alternatively, or in addition, some or all of the crustacean information may be retrieved from one or more of local storage (e.g. memory 562 or storage device 570), remote storage, or network 576.

Tables 1a-1f illustrate exemplary crustacean information:

TABLE 1a

| Crustacean Species |
| --- |
| Crustacean Species |
| Lobster (generic) |
| Crab (generic) |
| Clawed Lobster |
| Spiny Lobster |

TABLE 1b

| Exosckeletal Status |
| --- |
| Exoskeletal Status |
| Soft-shell |
| Hard-shell |

TABLE 1c

| Body Part |
| --- |
| Body Part |
| Claw |
| Knuckle |
| Knuckle with horn(horn is partial claw shell attached to knuckle) |
| Claw and Knuckle |
| Tail |
| Leg |

TABLE 1d

| Season |
| --- |
| Season |
| Summer |
| Winter |
| Spring/Fall |

TABLE 1e

| Source Location |
| --- |
| Source Location |
| Maine, USA |
| PEI, Canada |
| Novia Scotia, Canada |
| New Brunswick, Canada |
| Alaska, Seattle (Crab) |
| North Australia |
| Florida, Carolina's. |
| Portland, etc . . . all eastern seaboard! |
| Brazil |

TABLE 1e-continued

| Source Location |
| --- |
| Source Location |
| New Zealand |
| Pacific Coast region |
| Altantic Coast region |

TABLE 1f

| Crustacean Size |
| --- |
| Crustacean Size |
| Canner (175 g-450 g) |
| Market (>450 g) |
| Value - Average Weight (g) |
| Value - Average Length (mm) |

At 608, controller 116 may receive or access processing options. The processing options may identify one or more of whether to cut, cut length, side(s) to cut, and whether to crack.

For example, the processing options may identify that a lobster claw be cracked; cut along the top and/or bottom sides along the claw; or cracked and cut along the top and/or bottom sides of the knuckle. In another example, the processing options may identify that a crab leg be cut along the top and/or bottom sides, for the full length, and with varying depths along the length. In another example, the processing options may specify that a knuckle or knuckle with horn be cut on the top and/or bottom sides for the full length.

The processing options may be entered or selected with an input device 574 of controller 116. Alternatively, or in addition, some or all of the processing options may be retrieved from one or more of local storage (e.g. memory 562 or storage device 570), remote storage, or network 576.

Tables 2a-2d illustrate exemplary processing options:

TABLE 2a

| Whether To Cut |
| --- |
| Whether To Cut |
| Yes |
| No |

TABLE 2b

| Cut Length |
| --- |
| Cut Length |
| Full Length (end to end) |
| Value - length (% or mm) |
| Value - cut start (% or mm) and cut stop (% or mm) |
| Claw only of body part containing claw and knuckle |
| Knuckle only of body part containing claw and knuckle |
| Leg |
| Tails |
| Knuckles with Horn |

TABLE 2c

| Side(s) to Cut |
| --- |
| Side(s) to Cut |
| Bottom |
| Top |
| Bottom and Top |
| None |

TABLE 2d

| Whether to Crack |
| --- |
| Whether to Crack |
| Yes |
| No |

At 612, controller 116 may receive size information from sensor 556. The size information is preferably indicative of one or more size dimension of a crustacean body part 124, such as width(s), length(s), and/or height(s). The size information may be used as feedback for the controller 116 to dynamically change the operational parameters (e.g. blade force, blade speed, or conveyor speed) to produce the intended results.

In some embodiments, for each set or subset of crustacean information value combinations, controller 116 may store two or more size value ranges (e.g. small, medium large). Controller 116 may identify the set or subset of crustacean information value combinations to which the received crustacean information belongs, and then determine to which of the corresponding size value ranges the received size information belongs. In alternative embodiments, controller 116 does not receive size information. For example, apparatus 100 may not include any sensors 556, or apparatus 100 may include sensors 556 that do not provide size information.

At 616, controller 116 may determine one or more operational parameters for apparatus 100 based on one or more of the crustacean information, processing options, and size information. For example, operational parameters may include one or more of each of conveyor speed, blade actuation timing, blade speed, blade force, and piercing force. In some embodiments, operational parameters corresponding to sets or subsets of crustacean information values, processing option values, and size information values may be stored (e.g. in a database) in local storage at the controller 116 (e.g. memory 562 or storage device 570), in remote storage, and/or over network 576. In this case, controller 116 may look-up the stored operational parameters corresponding to a corresponding set or subset of crustacean information values, processing option values, and size information values.

In some embodiments, controller 116 may extrapolate or interpolate the stored operational parameters corresponding to the closest sets or subsets of crustacean information values, processing option values, and size information values. In other embodiments, controller 116 may apply a formula or algorithm for calculating operational parameters based on one or more of the crustacean information values, processing option values, and size information values. One or more of the operational parameters (e.g. conveyor speed, or blade speed) may be predetermined (e.g. fixed) and therefore not determined by controller 116 at 616.

It will be appreciated that the hardness of a shell of a crustacean body part 124 may vary along the length of the crustacean body part, and/or between different sides of the crustacean body part. For example, in a body part containing a claw and knuckle, the shell of the claw may be harder than the shell of knuckle. Also, the hardness of the knuckle shell may vary between the proximal end of the knuckle to the distal end of the knuckle (whether continuously, discontinuously, or stepwise). Further, the hardness of the shell of the claw and/or knuckle may differ from one lengthwise side to the other.

In some embodiments, controller 116 may determine a set of one or more operational parameters to apply for each of a plurality of shell portions of a crustacean body part (e.g. whether by formula/algorithm, or look-up in a database as described above). For example, controller 116 may calculate or retrieve a set of operational parameters for the cutting assembly 108 for each of a plurality of shell portions of the body part 124 to be cut by cutting assembly 108.

Figure 33:
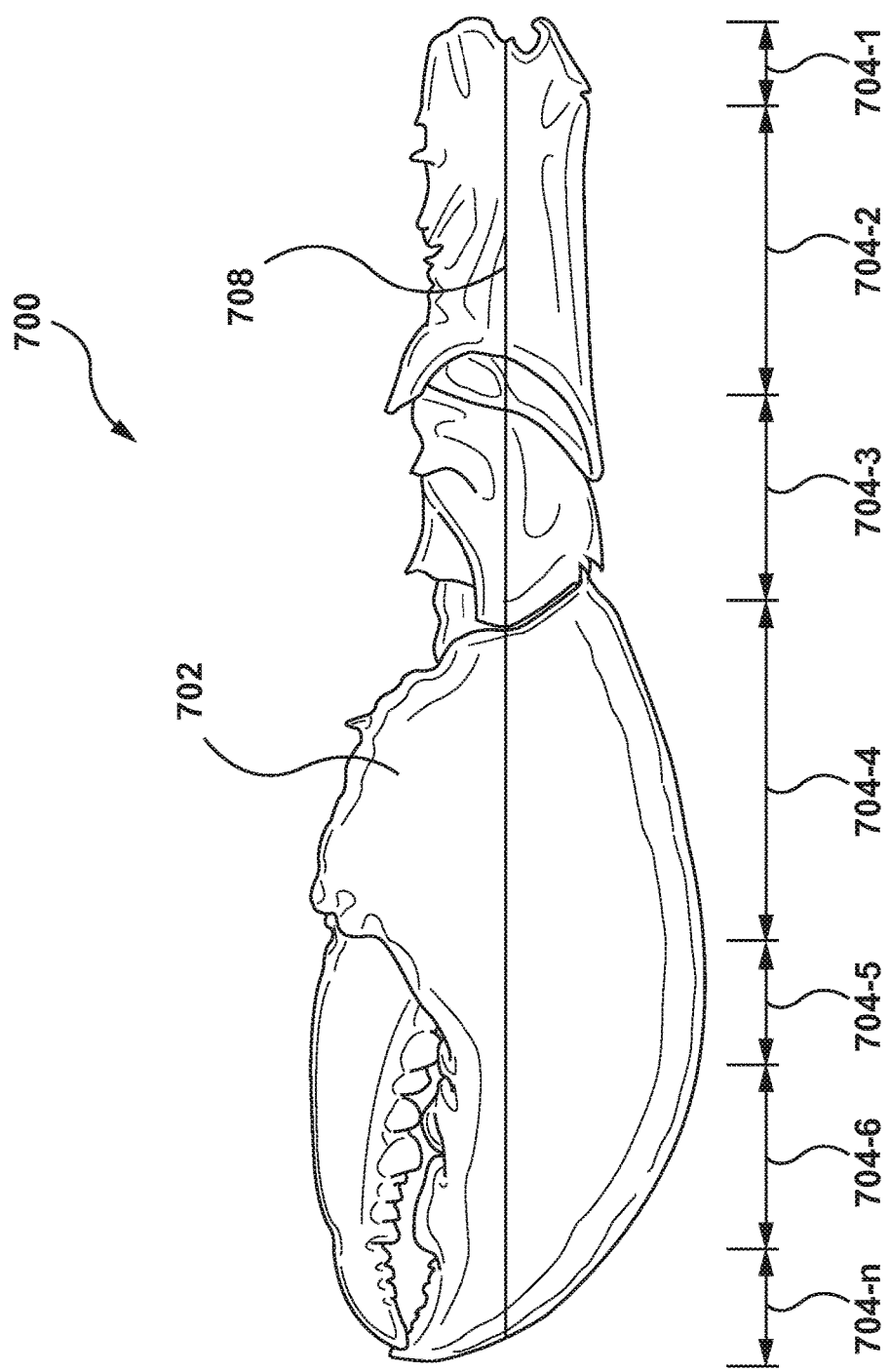
FIG. 33 is a side view of a crustacean body part having different shell portions, in accordance with at least one embodiment.

For example, FIG. 33 shows an exemplary crustacean body part 700. A lengthwise shell cutting path 708 may extend through a plurality of shell portions 704-1 to 704-*n*. Each shell portion 704 may be a predetermined portion (e.g. percentage length segment, fixed length segment, or visually identifiable segment) of the shell 702 of body part 700. The lengthwise size of each shell portion 704 may be the same or different from other shell portions 704. Controller 116 may retrieve, interpolate, extrapolate, or calculate by algorithm/formula (as described above) one or more operational parameters for each portion 704-1 to 704-*n*, which values may differ by portion 704. For example, controller 116 may retrieve operational parameters corresponding to sets or subsets of crustacean information values, processing option values, size information values, and shell portions, each of which may be stored in one or more of local storage at the controller 116 (e.g. memory 562 or storage device 570), in remote storage, and/or over network 576. It will be appreciated that different sides (e.g. upper, lower, and lateral sides) of the body part 700 may represent the same shell portion 704 or different shell portions 704.

Alternatively, or in addition, controller 116 may determine a continuous linear or non-linear variation in one or more of the operational parameters to be applied to cutting along the length of the crustacean body part, or some shell portion thereof.

It will be appreciated that the operational parameters may include different parameters for the lower cutting subassembly than for the upper cutting subassembly. Alternatively, or in addition, the operational parameters may include different parameters for upstream cutting subassemblies than for downstream cutting subassemblies. This may permit the upstream cutting subassemblies to be specially configured for cutting crustacean body parts of a first type or size, and the downstream cutting subassemblies to be specially configured for cutting crustacean body parts of a second type or size.

At 620, controller 116 may direct cutting assembly 108 and/or cracking assembly 112 to operate on the crustacean body part 124 for which size information was received at 612, according to the received processing options 608 and the determined (and/or predetermined) operational parameter(s). In the meantime, conveyor 104 may continue to convey a new crustacean body part 124, which may be measured by sensor 556 at 612 to provide controller 116 with size information to use at 616 for determining operational parameters specific to the new crustacean body part 124. Method 600 may continue until no new crustacean body parts 124 are placed onto conveyor 104.

Although process steps, method steps, algorithms or the like may be described (in the disclosure and/or in the claims)

in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

For example, receiving processing options at 608 may precede receiving crustacean information at 604 in some embodiments. In some cases, receiving crustacean information and processing options at 604 and 608 may occur simultaneously. For example, controller 116 may provide a user-interface with selectable pre-compiled sets of crustacean information and processing options. This may be convenient where a facility operates apparatus 100 to frequently perform similar processing on similar crustacean body parts.

Processed Product Examples

Figure 29:
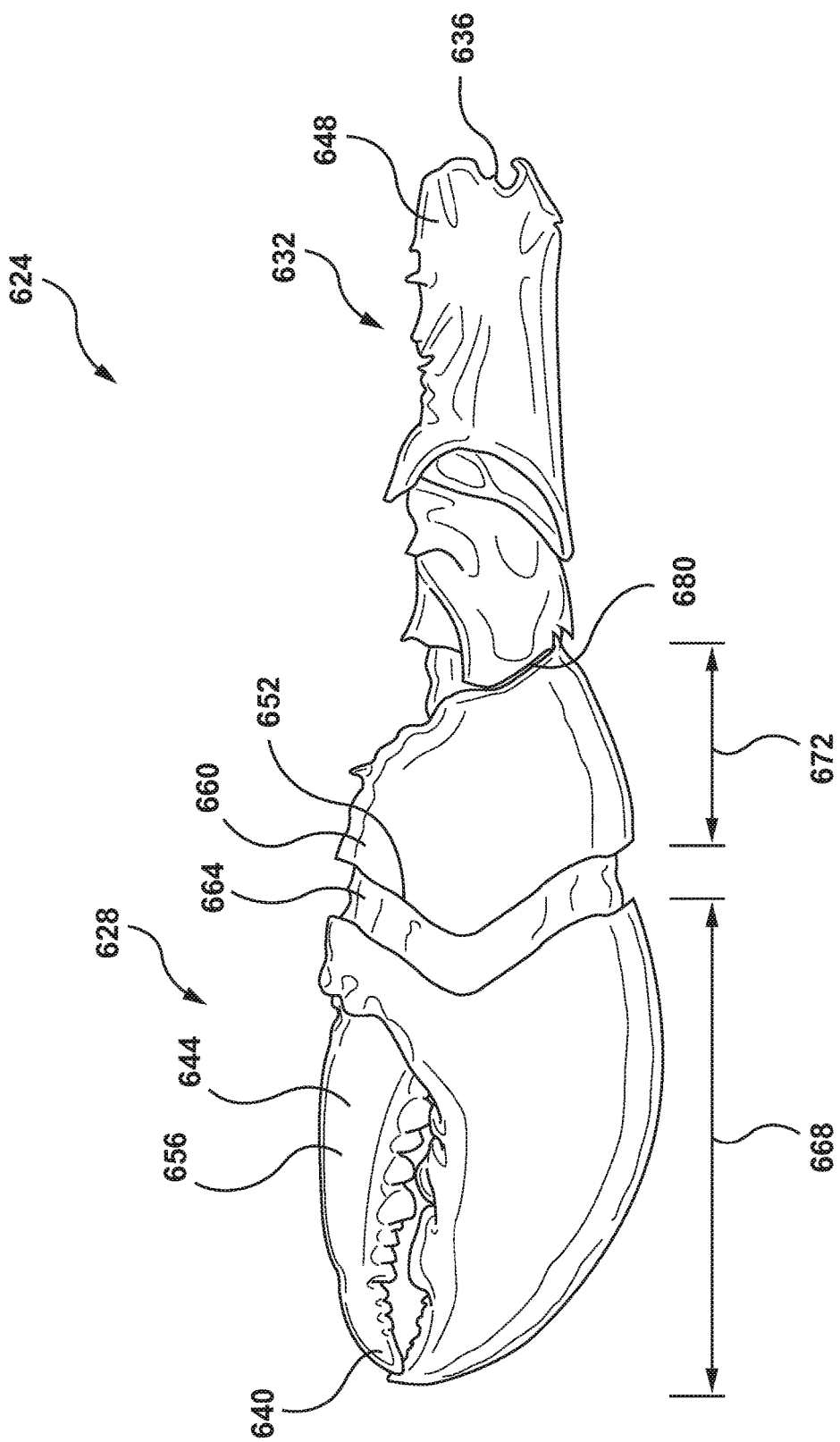
FIG. 29 is a side view of a claw and knuckle, with a crack formed in the shell of the claw, in accordance with at least one embodiment.
Figure 30:
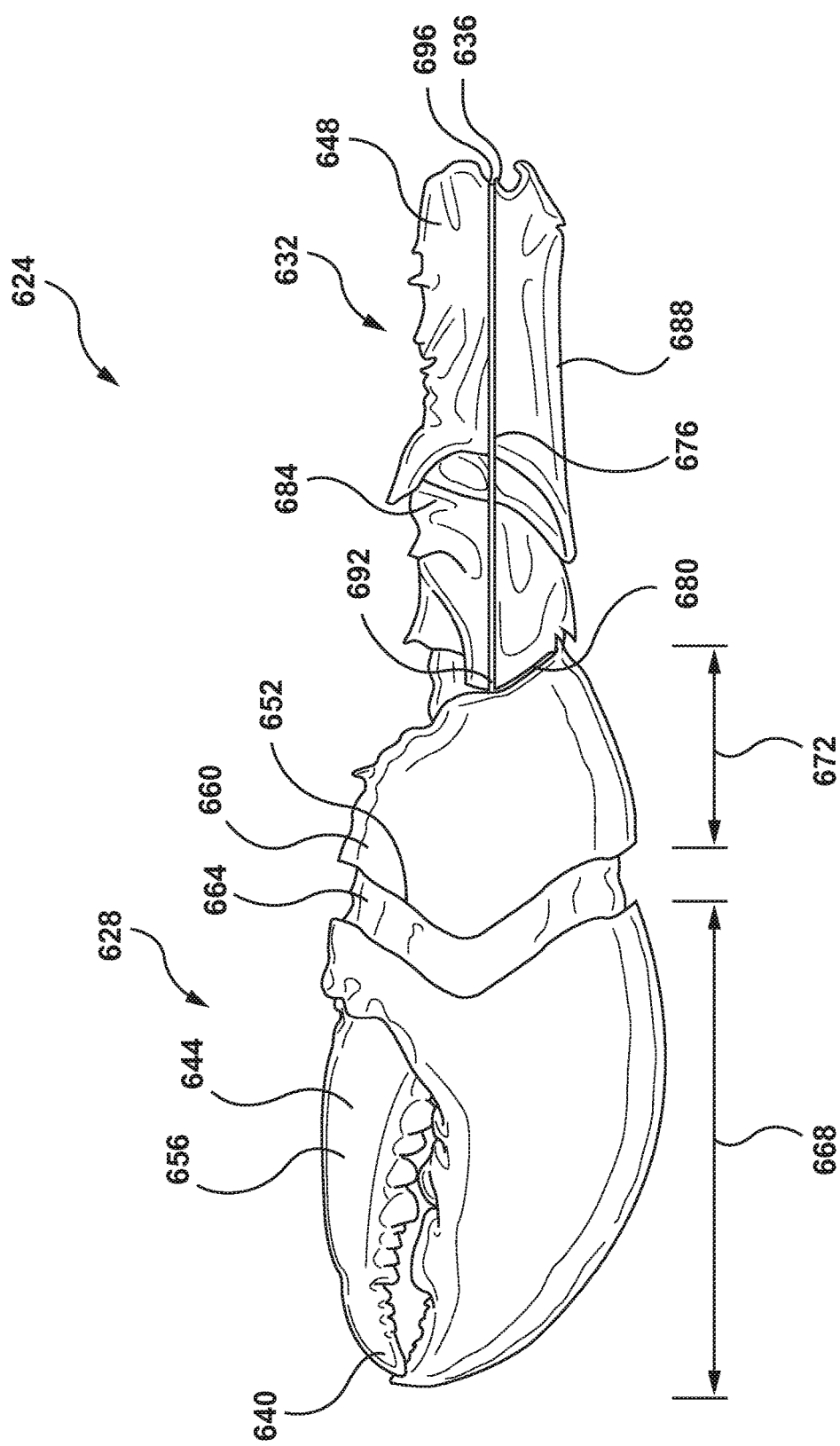
FIG. 30 is a side view of a claw and knuckle, with a crack formed in the shell of the claw, and a cut along the side of the shell of the knuckle, in accordance with at least one embodiment.
Figure 31:
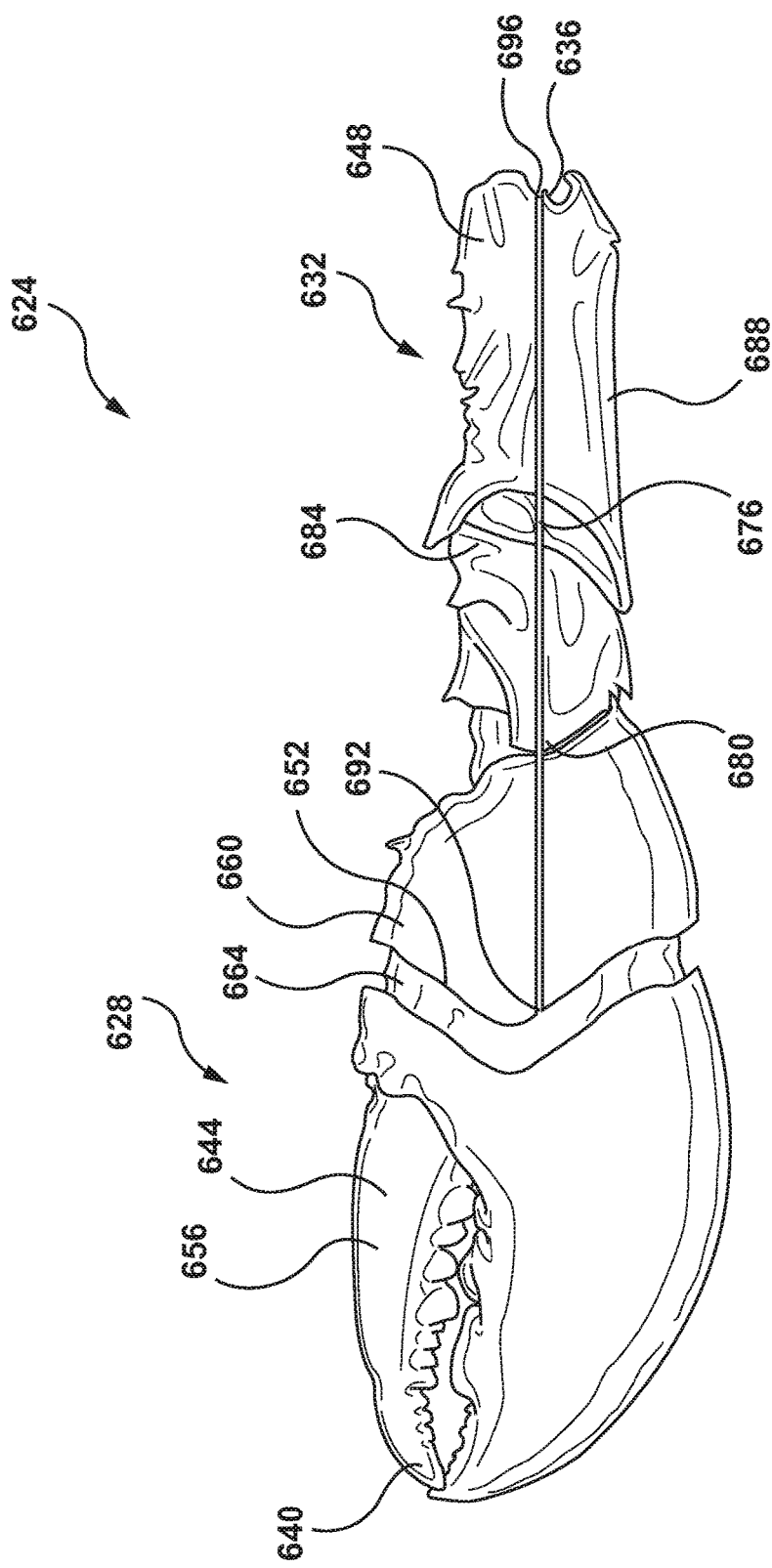
FIG. 31 is a side view of a claw and knuckle, with a crack formed in the shell of the claw, and a cut extending from the crack along the side of the shell of the knuckle.

Reference is now made to FIGS. 29-31 which illustrate exemplary crustacean body parts processed by apparatus 100. Each processed body part described or illustrated may provide convenient access to the meat inside the body parts.

FIG. 29 shows a lobster limb 624 including a claw 628 integrally connected (i.e. organically connected and never severed from) a knuckle 632. As shown, limb 624 extends in length from a proximal severed end 636 of knuckle 632 to a distal end 640 of claw 628. Claw 628 is shown including a shell 644, and knuckle 632 is shown including a shell 648. Inside each of shell 644 and 648 is meat organically connected (e.g. by natural muscular adhesion) to the shell.

In the illustrated example, a crack 652 has been formed in shell 644 by cracking assembly 112. As shown, crack 652 extends laterally about the entire circumference of shell 644, thus dividing shell 644 into a distal shell portion 656, and a proximal shell portion 660. Optionally, distal and proximal shell portions 656 and 660 may be spaced apart as shown to expose claw meat 664 inside, or they may remain in abutting relation.

As exemplified, distal shell portion 656 has a length 668, and proximal shell portion 660 has a length 672. The position of crack 652 may be expressed as a ratio of length 668 to length 672. Preferably, the ratio of lengths 668 to 672 is between 7:1 and 1:2, more preferably between 5:1 and 1:1, and most preferably 4:1 and 3:2.

FIG. 30 shows another embodiment of lobster limb 624, which has been further cut by cutting assembly 108. As illustrated, a cut 676 may be formed in a first side of shell 648. Cut 676 may extend lengthwise from distal end 680 of knuckle 632 to proximal end 636 of knuckle 632 as shown, or a portion thereof. Preferably, cut 676 is a lengthwise linear cut which penetrates through the entire thickness of shell 648 without cutting into the meat below.

Limb 624 may include one cut 676 formed along just one side of limb 624, or may include a plurality of cuts 676 (e.g. 2, 3, or 4 cuts) formed along multiple sides of limb 624. For example, limb 624 may include a second cut (not shown) parallel to cut 676 formed on an opposite second side of shell 648. In this case, cut 676 and the second cut may divide shell 648 into a first shell portion 684 and a second shell portion 688.

FIG. 31 shows another embodiment of lobster limb 624, wherein cut 676 extends from crack 652 proximally toward proximal end 636. As shown, cut 676 may extend from distal cut end 692 at crack 652 to a proximal cut end 696 at proximal end 636. In alternative embodiments, proximal cut end 696 may be spaced apart from proximal end 636. Preferably, cut 676 extends across between 25% and 100% of the length of shell 648, more preferably between 50% and 100% of the length of shell 648, and most preferably between 85% and 100% of the length of shell 648. Cut 676 may extend substantially perpendicularly to crack 652.

Figure 32:
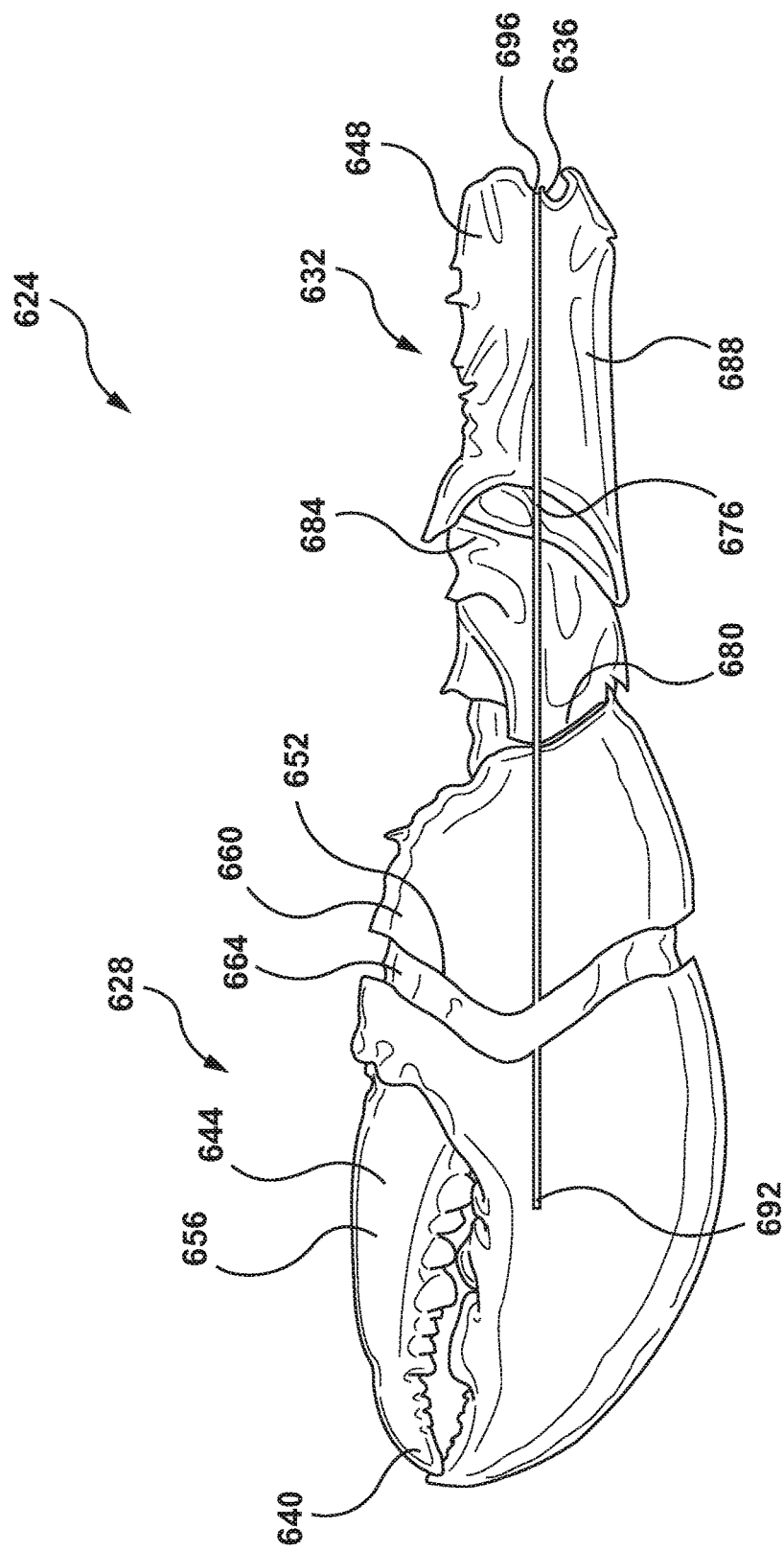
FIG. 32 is a side view of a claw and knuckle, with a crack formed in the shell of the claw, and a cut extending along the shell of the claw and shell of the knuckle.

FIG. 32 shows another embodiment of lobster limb 624, wherein cut 676 extends from a distal cut end 692 that is distal of crack 652 lengthwise to a proximal cut end 696 that is proximal of crack 652, intersecting with crack 652. As shown, cut 676 may extend from distal cut end 692 at distal end 640 of claw 628 to proximal cut end 696 at proximal end 636 of knuckle 632, crossing crack 652. In alternative embodiments, distal cut end 692 may be position at any lengthwise position between crack 652 and distal end 640. Further, proximal cut end 696 may be position at any lengthwise position between crack 652 and proximal end 636. Preferably, proximal cut end 696 is positioned in shell 648 such that cut 676 extends through at least a portion of shell 648 of knuckle 632.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

Items

Item 1. An apparatus for cracking a shell of a crustacean body part, the apparatus comprising:
a base to support a crustacean body part;
a clamp positioned to secure the body part in a region on the base; and
at least a first piercing member, the first piercing member being movable toward the region for piercing a shell of the body part, and being rotatable for cracking the pierced shell of the body part.

Item 2. The apparatus of item 1, further comprising:
a second piercing member, the second piercing member being movable toward the region for piercing the shell of the body part, and being rotatable for cracking the pierced shell of the body part.

Item 3. The apparatus of item 2, wherein:
the first and second piercing members are position at opposite sides of the region, and each of the first and second piercing members are movable toward the other of the first and second piercing members into the region for piercing the shell of the body part.

Item 4. The apparatus of any one of items 1-3, wherein:
the clamp includes a ram head spaced apart from the base and movable toward the base for clamping the crustacean body part between the ram head and the base.

Item 5. The apparatus of item 4, wherein:
the clamp includes an actuator drivingly coupled to the ram head for selectively moving the ram head toward the base.

Item 6. The apparatus of any one of items 4 or 5, when dependent on item 2 or item 3, wherein:
the first and second piercing members are laterally spaced apart and oriented in facing relation, and
the ram head is movable toward a position on base that is laterally between the first and second piercing members.

Item 7. The apparatus of item 5 or item 6, when dependent on item 5, wherein:
the actuator includes a hydraulic cylinder.

Item 8. The apparatus of any one of items 1-7, further comprising:
a piercing actuator drivingly coupled to the first piercing member for selectively moving the piercing member toward the region.

Item 9. The apparatus of any one of items 2-7 when dependent on item 2, further comprising:
a first piercing actuator drivingly coupled to the first piercing member for selectively moving the first piercing member toward the second piercing member; and
a second piercing actuator drivingly coupled to the second piercing member for selectively moving the second piercing member toward the first piercing member.

Item 10. The apparatus of any one of items 2-9 when dependent on item 2, wherein:
the first and second piercing members are laterally spaced apart,
the first and second piercing members are movable in a lateral direction, and
each of the first and second piercing member is rotatable about a twist axis substantially parallel to the lateral direction.

Item 11. The apparatus of item 10, further comprising:
a first cracking actuator drivingly coupled to the first piercing member for selectively rotating the first piercing member about the twist axis; and
a second cracking actuator drivingly coupled to the second piercing member for selectively rotating the second piercing member about the twist axis.

Item 12. The apparatus of any one of items 1-11, wherein:
each piercing member includes a substantially linear piercing edge.

Item 13. The apparatus of item 12, wherein:
the piercing edge of each piercing member is blunt.

Item 14. The apparatus of item 12, wherein:
the piercing edge of each piercing member is sharpened.

Item 15. The apparatus of item 12, wherein:
the piercing edge of each piercing member is wedge shaped.

Item 16. A method of cracking a shell of a crustacean body part, the method comprising:
piercing a shell of a crustacean body part with a first piercing member to form a first inceptive crack in the shell; and
twisting the first piercing member to propagate the first inceptive crack laterally about at least a first portion of a circumference of the shell.

Item 17. The method of item 16, further comprising:
clamping the body part in position during said piercing and twisting.

Item 18. The method of any one of items 16-17, further comprising:
conveying the body part in a downstream direction;
halting said conveying during said twisting; and
resuming said conveying after said twisting.

Item 19. The method of any one of items 16-18, further comprising:
piercing the shell with a second piercing member to form a second inceptive crack in the shell; and
twisting the second piercing member to propagate the second inceptive crack laterally about at least a second portion of the circumference of the shell.

Item 20. The method of item 19, wherein:
said twisting the first piercing member and said twisting the second piercing member propagate the first and second inceptive cracks to form a continuous crack in the shell extending about an entire circumference of the body part.

Item 21. The method of any one of items 19-20, wherein:
said piercing the shell with the first piercing member comprises piercing a first side of the shell; and
said piercing the shell with the second piercing member comprises piercing a second side of the shell opposite the first side of the shell.

Item 22. The method of any one of items 16-21, wherein:
the first piercing member comprises a substantially linear edge, and
piercing the shell with the first piercing member comprises penetrating the shell with the linear edge.

Item 23. The method of any one of items 16-22, wherein:
the first inceptive crack has a length along the shell; and
twisting the first piercing member comprises widening the first inceptive crack to propagate the length of the crack along the shell.

Item 24. A method of processing a crustacean body part, the method comprising:
actuating a first fluidic device drivingly coupled to a first blade, driving the first blade to penetrate a first shell side of a shell of a crustacean body part;
cutting a first lengthwise incision in the first shell side with the first blade;
actuating a second fluidic device drivingly coupled to a second blade, driving the second blade to penetrate a second shell side of the shell; and
cutting a second lengthwise incision in the second shell side with the second blade.

Item 25. The method of item 24, wherein:
the first fluidic device comprises a fluidic piston cylinder drivingly coupled to the first blade.

Item 26. The method of any one of items 24-25, wherein:
the first fluidic device is a pneumatic device.

Item 27. The method of any one of items 24-26, wherein:
the shell comprises a first shell portion and a second shell portion arranged lengthwise;
the first lengthwise incision comprises a first incision portion in the first shell portion and a second incision portion in the second shell portion;
said cutting the first lengthwise incision in the first side of the shell comprises cutting the first incision portion and cutting the second incision portion; and
said actuating the first fluidic device comprises
actuating the first fluidic device to apply a first blade force to the first blade against the body part during said cutting the first incision portion, and
actuating the first fluidic device to apply a second blade force to the first blade against the body part during said cutting the second incision portion,
wherein the first blade force is different from the second blade force.

Item 28. The method of item 27, wherein:
the first shell portion has a first hardness,
the second shell portion has a second hardness less than the first hardness, and
the first blade force is greater than the second blade force.

Item 29. The method of any one of items 24-28, further comprising:
conveying the limb in a lengthwise direction relative to the first and second blades.

Item 30. The method of any one of items 24-29, wherein:
said actuating the first and second fluidic devices, and said cutting the first and second sides of the shell overlap in time.

Item 31. The method of any one of items 24-30, wherein:
the first blade is a rotary blade, and
said cutting the first lengthwise incision comprising rotating the rotary blade.

Item 32. A method of processing a crustacean body part, the method comprising:
penetrating a first shell portion of a shell of a crustacean body part with a first blade to a first cutting depth;
cutting a first lengthwise incision in the first shell portion with the first blade;
penetrating a second shell portion of the shell with a second blade to a second cutting depth different from the first cutting depth; and
cutting a second lengthwise incision in the second shell portion with the second blade.

Item 33. The method of item 32, wherein:
the crustacean body part comprises a claw and a knuckle arranged lengthwise,
the claw comprises one of the first and second shell portions, and the knuckle comprises the other of the first and second shell portions.

Item 34. The method of any one of items 32-33, wherein:
the first blade comprises a first blade guard that contacts the shell when the first blade penetrates the crustacean body part by the first cutting depth, and
the second blade comprises a second blade guard that contacts the shell when the second blade penetrates the crustacean body part by the second cutting depth.

Item 35. The method of any one of items 32-34, wherein:
said cutting the first lengthwise incision comprises applying a first blade force to the first blade against the crustacean body part, and
said cutting the second lengthwise incision comprises applying a second blade force, different from the first blade force, to the second blade against the crustacean body part.

Item 36. The method of item 35, wherein:
applying the first and second blade forces comprises actuating one or more fluidic devices.

Item 37. The method of any one of items 32-36, wherein:
said cutting the second lengthwise incision begins after said cutting the first lengthwise incision ends.

Item 38. The method of any one of items 32-36, further comprising:
conveying the crustacean body part lengthwise downstream, wherein the second blade is positioned downstream the first blade.

Item 39. A method of processing a crustacean body part, the method performed by an apparatus for processing crustacean body parts, the method comprising:
conveying the crustacean body part in a downstream direction;
measuring size information of the crustacean body part; and
determining one or more operational parameters of a shell cutting assembly based at least in part on the size information.

Item 40. The method of item 39, wherein:
said measuring is performed by a sensor.

Item 41. The method of any one of items 39-40, further comprising:
receiving the size information at a controller, wherein the controller performs said determining.

Item 42. The method of any one of items 39-41, wherein:
the one or more operational parameters comprise at least one of blade speed, and blade force.

Item 43. The method of any one of items 39-42, further comprising:
cutting the crustacean body part with the shell cutting assembly according to the one or more operational parameters.

Item 44. The method of any one of items 39-43, wherein:
said conveying comprises conveying the crustacean body part downstream to the shell cutting assembly.

Item 45. The method of any one of items 39-44, further comprising:
receiving crustacean information for the crustacean body part,
wherein said determining one or more operational parameters comprises determining the one or more operational parameters based at least in part on the size information, and the crustacean information.

Item 46. The method of any one of items 45, further comprising:
storing, in a database, said one or more operational parameters in association with the size information and the crustacean information.

Item 47. The method of any one of items 46, wherein:
said determining one or more operational parameters comprises identifying the one or more operational parameters stored in the database in association with the size information and the crustacean information.

Item 48. The method of any one of items 45-47, wherein:
the crustacean information comprises one or more of: crustacean species, exoskeletal status, body part identification, season, source location, and crustacean size.

Item 49. The method of any one of items 45-47, wherein:
the crustacean information comprises body part identification.

Item 50. The method of any one of items 43-49 when dependent on item 43, further comprising:
receiving one or more processing options,
wherein said cutting the crustacean body part comprises cutting the crustacean body part according to the one or more operational parameters and the one or more processing options.

Item 51. The method of item 49, wherein:
the processing options comprise one or more of: cut length, and side(s) to cut.

Item 52. A controller for directing processing a crustacean body part by an apparatus for processing a crustacean body part, the controller comprising:
a memory storing computer readable instructions; and
one or more processors collectively configured to execute the computer readable instructions,
the computer readable instructions configuring the one or more processors to collectively:
receive size information of a crustacean body part from a sensor; and
determine one or more operational parameters of a shell cutting assembly of the apparatus based at least in part on the size information.

Item 53. The controller of items 52, wherein:
the one or more operational parameters comprise at least one of blade speed, and blade force.

Item 54. The controller of any one of items 52-53, wherein the computer readable instructions further configure the one or more processors to collectively:
direct the shell cutting assembly to cut the crustacean body part according to the one or more operational parameters.

Item 55. The controller of item 54, wherein:
said directing the shell cutting assembly comprises controlling one or more of fluid pressure and fluid volume to one or more fluidic devices of the shell cutting assembly.

Item 56. The controller of any one of items 52-55, wherein the computer readable instructions further configure the one or more processors to collectively:
control a conveyance speed of a conveyor of the apparatus for transporting the crustacean body part downstream to the shell cutting assembly.

Item 57. The controller of any one of items 52-56, wherein the computer readable instructions further configure the one or more processors to collectively:
receive crustacean information for the crustacean body part,
wherein said determining one or more operational parameters, comprises determining the one or more operational parameters based at least in part on the size information and the crustacean information.

Item 58. The controller of any one of items 57, wherein:
said determining one or more operational parameters comprises identifying the one or more operational parameters stored in a database in association with the size information and the crustacean information.

Item 59. The controller of any one of items 57-58, wherein:
the crustacean information comprises one or more of: crustacean species, exoskeletal status, body part identification, season, source location, and crustacean size.

Item 60. The controller of any one of items 57-58, wherein:
the crustacean information comprises body part identification.

Item 61. The controller of any one of items 54-60 when dependent on item 54, wherein the computer readable instructions further configure the one or more processors to collectively:
receive one or more processing options,
wherein said directing shell cutting assembly comprises directing shell cutting assembly to cut the crustacean body part according to the one or more operational parameters and the one or more processing options.

Item 62. The controller of item 61, wherein:
the one or more processing options comprise one or more of: cut length, and side(s) to cut.

Item 63. The controller of item 52, wherein:
the shell cutting assembly comprises an upstream cutting subassembly and a downstream cutting subassembly; and
the one or more operational parameters comprises whether to cut the crustacean body part with the upstream cutting subassembly, the downstream cutting subassembly, or both.

Item 64. The controller of item 63, wherein:
the upstream cutting subassembly comprises at least one blade having a blade guard defining a first cutting depth; and
the downstream cutting subassembly comprises at least one blade having a blade guard defining a second cutting depth different from the first cutting depth.

Item 65. An apparatus for processing a crustacean body part, the apparatus comprising:
a conveyor having a downstream direction and a first region for supporting a crustacean body part;
a first blade; and
a first fluidic device drivingly coupled to the first blade, actuation of the first fluidic device moving the first blade into the first region.

Item 66. The apparatus of item 65, further comprising:
a controller communicatively coupled to at least the first fluidic device for sequentially directing actuation of the first pneumatic device with a first fluid pressure and then actuation of the first fluidic device with a second fluid pressure different from the first fluid pressure.

Item 67. The apparatus of item 66, wherein the controller is configured to:
direct actuation of the first fluidic device with the first fluid pressure for a first predetermined time period, and
after the first time period, direct actuation of the first fluidic device with the second fluid pressure for a second predetermined time period.

Item 68. The apparatus of item 65, further comprising:
a controller configured to send one or more control signals to sequentially direct actuation of the first fluidic device with a first fluid pressure and afterwards direct actuation of the first fluidic device with a second fluid pressure different from the first fluid pressure.

Item 69. The apparatus of item 65, further comprising:
a second blade; and
a second fluidic device drivingly coupled to the second blade, actuation of the second fluidic device moving the second blade into the first region.

Item 70. The apparatus of item 69, wherein:
the first blade has a first blade guard defining a first cutting depth for the first blade;
the second blade has a second blade guard defining a second cutting depth for the second blade; and
the first cutting depth is different from the second cutting depth.

Item 71. The apparatus of any one of items 69-70, wherein:
the second blade is positioned downstream the first blade.

Item 72. The apparatus of item 71, further comprising:
a third blade movable into the first region opposite the first blade, and
a fourth blade movable into the first region opposite the second blade.

Item 73. A pre-cut seafood item comprising:
a crustacean limb, the limb including an organically connected claw and knuckle, an exterior shell, and meat inside the shell,
the limb extending in length from a proximal severed end of the knuckle to a distal end of the claw;
a crack in the shell circumscribing the claw, the crack dividing the shell into a distal shell portion and a proximal shell portion;
at least a first cut in the proximal shell portion, the first cut extending lengthwise from the crack toward the proximal end of the knuckle.

Item 74. The pre-cut seafood item of item 71, wherein:
the first cut extends from the crack to the proximal end of the knuckle.

Item 75. The pre-cut seafood item of any one of items 71-72, further comprising:
a second cut in the proximal shell portion, the second cut extending lengthwise from the crack toward the proximal end of the knuckle.

Item 76. The pre-cut seafood item of item 73, wherein:
each of the first and second cuts extends from the crack to the proximal end of the knuckle, and
the first and second cuts divide the proximal shell portion into first and second shell portions.

Item 77. The pre-cut seafood item of item 73, wherein:
the first cut is formed in a first side of the proximal shell portion, and
the second cut is formed in a second side of the proximal shell portion opposite the first side.

Item 78. The pre-cut seafood item of item 73, wherein:
the first and second cuts are formed in a same side of the proximal shell portion.

The invention claimed is:

1. A method of processing a crustacean body part, the method comprising:
actuating a first fluidic device drivingly coupled to a first blade, driving the first blade to penetrate a first shell side of a shell of a crustacean body part; and
cutting a first lengthwise incision in the first shell side with the first blade,
wherein:
the shell comprises a first shell portion and a second shell portion arranged lengthwise,
the first lengthwise incision comprises a first incision portion in the first shell portion and a second incision portion in the second shell portion,
said cutting the first lengthwise incision in the first side of the shell comprises cutting the first incision portion and cutting the second incision portion,
said actuating the first fluidic device comprises
actuating the first fluidic device to apply a first blade force to the first blade against the body part during said cutting the first incision portion, and
actuating the first fluidic device to apply a second blade force to the first blade against the body part during said cutting the second incision portion, and
the first blade force is different from the second blade force.

2. The method of claim 1, further comprising:
actuating a second fluidic device drivingly coupled to a second blade, driving the second blade to penetrate a second shell side of the shell; and
cutting a second lengthwise incision in the second shell side with the second blade.

3. The method of claim 2, further comprising:
conveying the crustacean body part in a lengthwise direction relative to the first and second blades.

4. The method of claim 2, wherein:
said actuating the first and second fluidic devices, and said cutting the first and second sides of the shell overlap in time.

5. The method of claim 1, wherein:
the first fluidic device comprises a fluidic piston cylinder drivingly coupled to the first blade.

6. The method of claim 1, wherein:
the first fluidic device is a pneumatic device.

7. The method of claim 1, wherein:
the first shell portion has a first hardness,
the second shell portion has a second hardness less than the first hardness, and
the first blade force is greater than the second blade force.

8. The method of claim 1, wherein:
the first blade is a rotary blade, and
said cutting the first lengthwise incision comprising rotating the rotary blade.

9. A method of processing a crustacean body part, the method comprising:
penetrating a first shell portion of a shell of a crustacean body part with a first blade to a first cutting depth;
cutting a first lengthwise incision in the first shell portion with the first blade;
penetrating a second shell portion of the shell with a second blade to a second cutting depth different from the first cutting depth; and
cutting a second lengthwise incision in the second shell portion with the second blade.

10. The method of claim 9, wherein:
the crustacean body part comprises a claw and a knuckle arranged lengthwise,
the claw comprises one of the first and second shell portions, and the knuckle comprises the other of the first and second shell portions.

11. The method of claim 9, wherein:
the first blade comprises a first blade guard that contacts the shell when the first blade penetrates the crustacean body part by the first cutting depth, and
the second blade comprises a second blade guard that contacts the shell when the second blade penetrates the crustacean body part by the second cutting depth.

12. The method of claim 9, wherein:
said cutting the first lengthwise incision comprises applying a first blade force to the first blade against the crustacean body part, and
said cutting the second lengthwise incision comprises applying a second blade force, different from the first blade force, to the second blade against the crustacean body part.

13. The method of claim 12, wherein:
applying the first and second blade forces comprises actuating one or more fluidic devices.

14. The method of claim 9, wherein:
said cutting the second lengthwise incision begins after said cutting the first lengthwise incision ends.

15. The method of claim 9, further comprising:
conveying the crustacean body part lengthwise downstream,
wherein the second blade is positioned downstream the first blade.

16. An apparatus for processing a crustacean body part, the apparatus comprising:
a conveyor having a downstream direction and a first region for supporting a crustacean body part;
a first blade;
a first fluidic device drivingly coupled to the first blade, actuation of the first fluidic device moving the first blade into the first region;
a second blade; and
a second fluidic device drivingly coupled to the second blade, actuation of the second fluidic device moving the second blade into the first region,
wherein the second blade is positioned downstream the first blade.

17. The apparatus of claim 16, further comprising:
a controller configured to send one or more control signals to sequentially direct actuation of the first fluidic device with a first fluid pressure and afterwards direct actuation of the first fluidic device with a second fluid pressure different from the first fluid pressure.

18. The apparatus of claim 16, further comprising:
a third blade movable into the first region opposite the first blade, and
a fourth blade movable into the first region opposite the second blade.

19. An apparatus for processing a crustacean body part, the apparatus comprising:
a conveyor having a downstream direction and a first region for supporting a crustacean body part;
a first blade;
a first fluidic device drivingly coupled to the first blade, actuation of the first fluidic device moving the first blade into the first region; and
a controller communicatively coupled to at least the first fluidic device for sequentially directing actuation of the first pneumatic device with a first fluid pressure and then actuation of the first fluidic device with a second fluid pressure different from the first fluid pressure.

20. The apparatus of claim 19, wherein the controller is configured to:
   direct actuation of the first fluidic device with the first fluid pressure for a first predetermined time period, and
   after the first time period, direct actuation of the first fluidic device with the second fluid pressure for a second predetermined time period.

21. The apparatus of claim 19, further comprising:
   a second blade; and
   a second fluidic device drivingly coupled to the second blade, actuation of the second fluidic device moving the second blade into the first region.

22. An apparatus for processing a crustacean body part, the apparatus comprising:
   a conveyor having a downstream direction and a first region for supporting a crustacean body part;
   a first blade;
   a first fluidic device drivingly coupled to the first blade, actuation of the first fluidic device moving the first blade into the first region;
   a second blade; and
   a second fluidic device drivingly coupled to the second blade, actuation of the second fluidic device moving the second blade into the first region,
   wherein:
      the first blade has a first blade guard defining a first cutting depth for the first blade;
      the second blade has a second blade guard defining a second cutting depth for the second blade; and
      the first cutting depth is different from the second cutting depth.

23. The apparatus of claim 21, wherein:
   the second blade is positioned downstream the first blade.

* * * * *